US008906156B2

(12) United States Patent
Constantz et al.

(10) Patent No.: US 8,906,156 B2
(45) Date of Patent: Dec. 9, 2014

(54) CEMENT AND CONCRETE WITH REINFORCED MATERIAL

(75) Inventors: Brent R. Constantz, Portola Valley, CA (US); Paulo J. M. Monteiro, El Cerrito, CA (US); Kyle Self, San Jose, CA (US); Irvin Chen, Santa Clara, CA (US)

(73) Assignee: Calera Corporation, Los Gatos, CA (US)

( * ) Notice: Subject to any disclaimer, the term of this patent is extended or adjusted under 35 U.S.C. 154(b) by 66 days.

(21) Appl. No.: 13/560,246

(22) Filed: Jul. 27, 2012
(Under 37 CFR 1.47)

(65) Prior Publication Data

US 2013/0139727 A1   Jun. 6, 2013

Related U.S. Application Data

(60) Continuation-in-part of application No. 13/350,199, filed on Jan. 13, 2012, now abandoned, which is a division of application No. 12/857,267, filed on Aug. 16, 2010, now Pat. No. 8,114,214.

(60) Provisional application No. 61/513,367, filed on Jul. 29, 2011, provisional application No. 61/541,735, filed on Sep. 30, 2011, provisional application No. 61/291,811, filed on Dec. 31, 2009, provisional application No. 61/360,829, filed on Jul. 1, 2010, provisional application No. 61/371,606, filed on Aug. 6, 2010.

(51) Int. Cl.
| | |
|---|---|
| *C04B 7/00* | (2006.01) |
| *C04B 24/14* | (2006.01) |
| *C04B 14/00* | (2006.01) |
| *C09C 1/02* | (2006.01) |
| *C04B 11/00* | (2006.01) |
| *C04B 28/02* | (2006.01) |

(52) U.S. Cl.
CPC ............... *C04B 11/00* (2013.01); *C04B 28/02* (2013.01); *Y10S 264/43* (2013.01)
USPC ..... 106/817; 106/463; 106/656; 264/DIG. 43

(58) Field of Classification Search
CPC ........ C04B 28/02; C04B 14/28; C04B 14/26; C04B 14/386; C04B 14/42; C04B 16/06; C04B 2111/1037; C01B 31/24; C08K 3/26; B01J 20/043
USPC .......... 106/738, 463, 817; 423/232, 220, 165, 423/430
See application file for complete search history.

(56) References Cited

U.S. PATENT DOCUMENTS

| | | | |
|---|---|---|---|
| 1,415,206 A | 5/1922 | Stevenson | |
| 3,373,134 A | 3/1968 | Yasui et al. | |

(Continued)

FOREIGN PATENT DOCUMENTS

| | | |
|---|---|---|
| EP | 0558275 A1 | 9/1993 |
| EP | 2253600 A1 | 11/2010 |

(Continued)

OTHER PUBLICATIONS

ACI Manual of Concrete Practice. Part 3—2010. Building Code Requirements for Structural Concrete (ACI 318-08) and Commentary, Chapter 4—Durability Requirements. American Concrete Institute, Farmington Hills, MI. pp. 318-55 to 318-61.

(Continued)

*Primary Examiner* — Kaj K Olsen
*Assistant Examiner* — Karam Hijji
(74) *Attorney, Agent, or Firm* — Vandana Bansal; Calera Corporation

(57) ABSTRACT

Provided are compositions, methods and systems including cementitious compositions and reinforcing materials wherein the cementitious composition comprises a metastable component.

11 Claims, 10 Drawing Sheets

(56) References Cited

U.S. PATENT DOCUMENTS

| | | |
|---|---|---|
| 6,036,933 A | 3/2000 | Ramsay |
| 6,264,736 B1 | 7/2001 | Knopf et al. |
| 6,387,174 B2 | 5/2002 | Knopf et al. |
| 7,735,274 B2 | 6/2010 | Constantz et al. |
| 7,736,430 B2 | 6/2010 | Barron et al. |
| 7,744,761 B2 | 6/2010 | Constantz et al. |
| 7,749,476 B2 | 7/2010 | Constantz et al. |
| 7,753,618 B2 | 7/2010 | Constantz et al. |
| 7,754,169 B2 | 7/2010 | Constantz et al. |
| 7,771,684 B2 | 8/2010 | Constantz et al. |
| 7,790,012 B2 | 9/2010 | Kirk et al. |
| 7,815,880 B2 | 10/2010 | Constantz et al. |
| 7,829,053 B2 | 11/2010 | Constantz et al. |
| 7,875,163 B2 | 1/2011 | Gilliam et al. |
| 7,887,694 B2 | 2/2011 | Constantz et al. |
| 7,906,028 B2 | 3/2011 | Constantz et al. |
| 7,914,685 B2 | 3/2011 | Constantz et al. |
| 7,922,809 B1 | 4/2011 | Constantz et al. |
| 7,931,809 B2 | 4/2011 | Constantz et al. |
| 7,939,336 B2 | 5/2011 | Constantz et al. |
| 7,966,250 B2 | 6/2011 | Constantz et al. |
| 7,993,500 B2 | 8/2011 | Gilliam et al. |
| 7,993,511 B2 | 8/2011 | Gilliam et al. |
| 8,006,446 B2 | 8/2011 | Constantz et al. |
| 8,062,418 B2 | 11/2011 | Constantz et al. |
| 8,114,214 B2 | 2/2012 | Constantz et al. |
| 8,137,455 B1 | 3/2012 | Constantz et al. |
| 8,177,909 B2 | 5/2012 | Constantz et al. |
| 2009/0001020 A1 | 1/2009 | Constantz et al. |
| 2009/0020044 A1 | 1/2009 | Constantz et al. |
| 2009/0169452 A1 | 7/2009 | Constantz et al. |
| 2009/0202410 A1 | 8/2009 | Kawatra et al. |
| 2009/0283016 A1 | 11/2009 | Mohamed et al. |
| 2009/0301352 A1 | 12/2009 | Constantz et al. |
| 2010/0000444 A1 | 1/2010 | Constantz et al. |
| 2010/0024686 A1 | 2/2010 | Constantz et al. |
| 2010/0051859 A1 | 3/2010 | House et al. |
| 2010/0063902 A1 | 3/2010 | Constantz et al. |
| 2010/0077691 A1 | 4/2010 | Constantz et al. |
| 2010/0077922 A1 | 4/2010 | Constantz et al. |
| 2010/0083880 A1 | 4/2010 | Constantz et al. |
| 2010/0084280 A1 | 4/2010 | Gilliam et al. |
| 2010/0111810 A1 | 5/2010 | Constantz et al. |
| 2010/0116683 A1 | 5/2010 | Gilliam et al. |
| 2010/0132556 A1 | 6/2010 | Constantz et al. |
| 2010/0132591 A1 | 6/2010 | Constantz et al. |
| 2010/0135865 A1 | 6/2010 | Constantz et al. |
| 2010/0135882 A1 | 6/2010 | Constantz et al. |
| 2010/0140103 A1 | 6/2010 | Gilliam et al. |
| 2010/0144521 A1 | 6/2010 | Constantz et al. |
| 2010/0150802 A1 | 6/2010 | Gilliam et al. |
| 2010/0154679 A1 | 6/2010 | Constantz et al. |
| 2010/0155258 A1 | 6/2010 | Kirk et al. |
| 2010/0158786 A1 | 6/2010 | Constantz et al. |
| 2010/0196104 A1 | 8/2010 | Constantz et al. |
| 2010/0200419 A1 | 8/2010 | Gilliam et al. |
| 2010/0219373 A1 | 9/2010 | Seeker et al. |
| 2010/0224503 A1 | 9/2010 | Kirk et al. |
| 2010/0229725 A1 | 9/2010 | Farsad et al. |
| 2010/0230293 A1 | 9/2010 | Gilliam et al. |
| 2010/0230830 A1 | 9/2010 | Farsad et al. |
| 2010/0236242 A1 | 9/2010 | Farsad et al. |
| 2010/0239467 A1 | 9/2010 | Constantz et al. |
| 2010/0239487 A1 | 9/2010 | Constantz et al. |
| 2010/0247410 A1 | 9/2010 | Constantz et al. |
| 2010/0258035 A1 | 10/2010 | Constantz et al. |
| 2010/0258506 A1 | 10/2010 | Berkowitz et al. |
| 2010/0276299 A1 | 11/2010 | Kelly et al. |
| 2010/0290967 A1 | 11/2010 | Detournay et al. |
| 2010/0313793 A1 | 12/2010 | Constantz et al. |
| 2010/0313794 A1 | 12/2010 | Constantz et al. |
| 2010/0319586 A1 | 12/2010 | Blount et al. |
| 2010/0326328 A1 | 12/2010 | Constantz et al. |
| 2011/0030586 A1 | 2/2011 | Constantz et al. |
| 2011/0030957 A1 | 2/2011 | Constantz et al. |
| 2011/0033239 A1 | 2/2011 | Constantz et al. |
| 2011/0035154 A1 | 2/2011 | Kendall et al. |
| 2011/0036728 A1 | 2/2011 | Farsad |
| 2011/0042230 A1 | 2/2011 | Gilliam et al. |
| 2011/0054084 A1 | 3/2011 | Constantz et al. |
| 2011/0059000 A1 | 3/2011 | Constantz et al. |
| 2011/0067600 A1 | 3/2011 | Constantz et al. |
| 2011/0067603 A1 | 3/2011 | Constantz et al. |
| 2011/0067605 A1 | 3/2011 | Constantz et al. |
| 2011/0071309 A1 | 3/2011 | Constantz et al. |
| 2011/0079515 A1 | 4/2011 | Gilliam et al. |
| 2011/0083968 A1 | 4/2011 | Gilliam et al. |
| 2011/0091366 A1 | 4/2011 | Kendall et al. |
| 2011/0091955 A1 | 4/2011 | Constantz et al. |
| 2011/0132234 A1 | 6/2011 | Constantz et al. |
| 2011/0147227 A1 | 6/2011 | Gilliam et al. |
| 2011/0226989 A9 | 9/2011 | Seeker et al. |
| 2011/0240916 A1 | 10/2011 | Constantz et al. |
| 2011/0247336 A9 | 10/2011 | Farsad et al. |
| 2011/0277474 A1 | 11/2011 | Constantz et al. |
| 2011/0277670 A1 | 11/2011 | Self et al. |
| 2012/0031303 A1 | 2/2012 | Constantz et al. |
| 2012/0145047 A1 | 6/2012 | Constantz et al. |
| 2013/0008354 A1 | 1/2013 | Constantz et al. |

FOREIGN PATENT DOCUMENTS

| | | |
|---|---|---|
| JP | 2000302500 A2 | 10/2000 |
| WO | WO 2008/018928 A2 | 2/2008 |
| WO | WO 2008/148055 A1 | 12/2008 |
| WO | WO 2009/006295 A2 | 1/2009 |
| WO | WO 2009/086460 A1 | 7/2009 |
| WO | WO 2009/146436 A1 | 12/2009 |
| WO | WO 2009/152615 A1 | 12/2009 |
| WO | WO 2009/155378 A1 | 12/2009 |
| WO | WO 2010/006242 A1 | 1/2010 |
| WO | WO 2010/008896 A1 | 1/2010 |
| WO | WO 2010/009273 A1 | 1/2010 |
| WO | WO 2010/030826 A1 | 3/2010 |
| WO | WO 2010/039903 A1 | 4/2010 |
| WO | WO 2010/039909 A1 | 4/2010 |
| WO | WO 2010/048457 A1 | 4/2010 |
| WO | WO 2010/051458 A1 | 5/2010 |
| WO | WO 2010/068924 A1 | 6/2010 |
| WO | WO 2010/074686 A1 | 7/2010 |
| WO | WO 2010/074687 A1 | 7/2010 |
| WO | WO 2010/087823 A1 | 8/2010 |
| WO | WO 2010/091029 A1 | 8/2010 |
| WO | WO 2010/093713 A1 | 8/2010 |
| WO | WO 2010/093716 A1 | 8/2010 |
| WO | WO 2010/101953 A1 | 9/2010 |
| WO | WO 2010/104989 A1 | 9/2010 |
| WO | WO 2010/132863 A1 | 11/2010 |
| WO | WO 2010/136744 A1 | 12/2010 |
| WO | WO 2011/008223 A1 | 1/2011 |
| WO | WO 2011/017609 A1 | 2/2011 |
| WO | WO 2011/038076 A1 | 3/2011 |
| WO | WO 2011/049996 A1 | 4/2011 |
| WO | WO 2011/066293 A1 | 6/2011 |
| WO | WO 2011/075680 A1 | 6/2011 |
| WO | WO 2011/081681 A1 | 7/2011 |
| WO | WO 2011/097468 A2 | 8/2011 |
| WO | WO 2011/102868 A1 | 8/2011 |

OTHER PUBLICATIONS

Ajikumar, P.K. et al. 2005. Synthesis and Characterization of Monodispersed Spheres of Amorphous Calcium Carbonate and Calcite Spherules. *Crystal Growth & Design.* 5(3): 1129-1134.

Architecture 2030 Ad Campaign. Think You're Making a Difference? Think Again. Issued by: 2030, Inc. / Architecture 2030 /The 2030 Research Center, http://www.architecture2030.org/news/multimedia.html. Accessed on Mar. 2, 2010.

ASTM C1437-01, 2001, "Standard Test Method for Flow of Hydraulic Cement Mortar," ASTM International, West Conshohocken, PA, 2001, www.astm.org.

ASTM Standard C 109/C 109 M-5 "Standard Test Method for Compressive Strength of Hydraulic Cement Mortars (Using 2-in. or

(56) References Cited

OTHER PUBLICATIONS

[50-mm] Cube Specimens)" ASTM International, West Conshohocken, PA, (2005), www.astm.org.

ASTM Standard C 1609/C 1609 M-5 "Standard Test Method for Flexural Performance of Fiber-Reinforced Concrete (Using Beam with Third-Point Loading)" ASTM International, West Conshohocken, PA, (2006), www.astm.org.

ASTM Standard C191-04b, 2004, "Standard Test Methods for Time of Setting of Hydraulic Cement by Vicat Needle," ASTM International, West Conshohocken, PA, (2004) www.astm.org.

ASTM Standard C305-99, (1999) "Standard Practice for Mechanical Mixing of Hydraulic Cement Pastes and Mortars of Plastic Consistency," ASTM International, West Conshohocken, PA, 1999, www.astm.org.

Boerner, B.J. et al. 1987. Trona and Sodium Bicarbonate in Beef Cattle Diets: Effects on pH and Volatile Fatty Acid Concentrations. *Journal of Animal Science.* 65: 309-316.

Cement Association of Canada. 2009. Portland-Limestone Cement. *Backgrounder*, Aug. 2009. www.cement.ca.

Chloride and Salinity. Water quality and vernier. Retrieved Aug. 8, 2012 http://www.tvdsb.ca/uploads/ScienceProbeware/chloride.pdf.

Combes, C., et al. 2005. Preparation, physical-chemical characterisation and cytocompatibility of calcium carbonate cements. *Biomaterials.* 27(9): 1945-1954.

Constantz, B. (2009) "The Risk of Implementing New Regulations on Game-Changing Technology: Sequestering CO2 in the Built Environment" AGU, 90(22), Jt. Assem, Suppl., Abstract.

Dandeu, A. et al. 2006. Raman Spectroscopy—A Powerful Tool for the Quantitative Determination of the Composition of Polymorph Mixtures: Application to CaCO$_3$ Polymorph Mixtures. *Chem. Eng. Technol.* 29(2): 221-225.

Feldman, R.F. et al. 1965. Influence of CaCO$_3$ on the Hydration of 3CaO.Al$_2$O$_3$, *Journal of the American Ceramic Society.* 48(1): 25-30.

Hawkins, P. et al. 2003. The Use of Limestone in Portland Cement: A State-of-the-art Review, EB227, Portland Cement Association, Skokie, Illinois, USA, 44 pages.

Hooton, R.D. et al. 2007. Portland-Limestone Cement: State-of-the-Art Report and Gap Analysis for CSA A 3000. Cement Association of Canada. University of Toronto.

International search report and written opinion dated Oct. 1, 2010 for PCT/US2010/045620.

International search report and written opnion dated Mar. 4, 2013 for PCT/US2012/048609.

Kontoyannis, C.G. et al. 2000. Calcium carbonate phase analysis using XRD and FT-Raman spectroscopy. *Analyst.* 125: 251-255.

Kralj, D. et al. 1997. Vaterite growth and dissolution in aqueous solution III. Kinetics of transformation. *Journal of Crystal Growth.* 177: 248-257.

Lam, R.S.K. et al. 2007. Synthesis-dependant structural variations in amorphous calcium carbonate. *CrystEngComm.* 9: 1226-1236.

Loste, E. et al. 2003. The role of magnesium in stabilising amorphous calcium carbonate and controlling calcite morphologies. *Journal of Crystal Growth.* 254: 206-218.

Lothenbach, B. et al. 2008. Influence of limestone on the hydration of Portland cements. *Cement and Concrete Research.* 38: 848-860.

Matschei, T. et al. 2007. The role of calcium carbonate in cement hydration. *Cement and Concrete Research.* 37: 551-558.

Metz, B. et al. Intergovernmental Panel on Climate Change, 2005—Carbon Dioxide Capture and Storage, IPCC Special Report. Bert Metz, Ogunlade Davidson, Heleen de Coninck, Manuela Loos and Leo Meyer (Eds.) Cambridge University Press, UK. pp. 431. http://www.ipcc.ch/publications_and_data/publications_and_data_reports.htm. Accessed on Mar. 2, 2010.

Mook, W.G. et al. 1986. $^{13}$C in Atmospheric CO$_2$. *Netherlands Journal of Sea Research.* 20(2/3): 211-223.

Ogino, T. et al. 1987. The formation and transformation mechanism of calcium carbonate in water. *Geochimica et Cosmochimica Acta.* 51: 2757-2767.

Raz, S. et al. 2002. Stable Amorphous Calcium Carbonate Is the Main Component of the Calcium Storage Structures of the Crustacean *Orchestia cavimana. Biol. Bull.* 203: 269-274.

Shen, Q. et al. 2006. Properties of Amorphous Calcium Carbonate and the Template Action of Vaterite Spheres. *J Phys. Chem. B.* 110: 2994-3000.

Spanos, N. et al. 1998. The transformation of vaterite to calcite: effect of the conditions of the solutions in contact with the mineral phase. *Journal of Crystal Growth.* 191: 783-790.

Tang, H. et al. 2008. Creation of calcite hollow microspheres with attached bundles of aragonite needles. *Cryst. Res. Technol.* 43(5): 473-478.

Turnbull, A.G. 1973. A thermochemical study of vaterite. *Geochimica et Cosmochimica Acta.* 37: 1593-1601.

U.S. Energy Information Administration, Emissions of Greenhouse Gases in the United States 2008, Report #: DOE/EIA-0573(2008), Release on Dec. 3, 2009. http://www.eia.doe.gov/oiaf/1605/ggrpt/carbon.html . Accessed on Feb. 27, 2010.

Voglis, N. et al. 2005. Portland-limestone cements. Their properties and hydration compared to those of other composite cements. *Cement & Concrete Composites.* 27: 191-196.

Weiner, S. et al. 2003. Biologically Formed Amorphous Calcium Carbonate. *Connective Tissue Research.* 44(Suppl. 1): 214-218.

Winn, R.T. 2003. Stable Isotope Geochemistry of Aeolian Sediment at Owens Lake, California. A thesis in Geoscience. Submitted to the Graduate Faculty of Texas Tech University.

Wolf et. al. 2001. Thermophysical Investigations of the Polymorphous Phases of Calcium Carbonate. *Journal of Thermal Analysis and Calorimetry*, 65: 687-698.

Wolf, G. et al. 2000. Thermodynamic Aspects of the Vaterite-Calcite Phase Transition. *Journal of Thermal Analysis and Calorimetry.* 60: 463-472.

Yang, et al. Tailoring engineered cementitious composites for impact resistance. Cement and Concrete Research. 2012; 42:1066-1071.

U.S. Appl. No. 14/155,700, filed Jan. 15, 2014, Chen et al.

International search report and written opinion dated Nov. 28, 2011 for PCT/US2011/039748.

Biello, et al. Cement from C02: a concrete cure for global warming. Aug. 7, 2008.URL:http://www.scientificamerican.comjarticle.cfm?id=cement-from-carbon-dioxide. Retrieved on Dec. 14, 2010.

European search report and opinion dated Feb. 11, 2014 for EP Application No. 10841411.1.

Huntzinger, et al. Carbon Dioxide Sequestration in Cement Kiln Dust Through Mineral Carbonation. Environ. Sci. Technol. 2009; 43(6):1986-1992.

Skrzypek, et al. d13C analyses of calcium carbonate: comparison between the GasBench and elemental analyzer techniques. Rapid Communications in Mass Spectrometry. Jul. 2006; 20: 2915-2920.

U.S. Appl. No. 14/506,953, filed Oct. 6, 2014, Constantz et al.

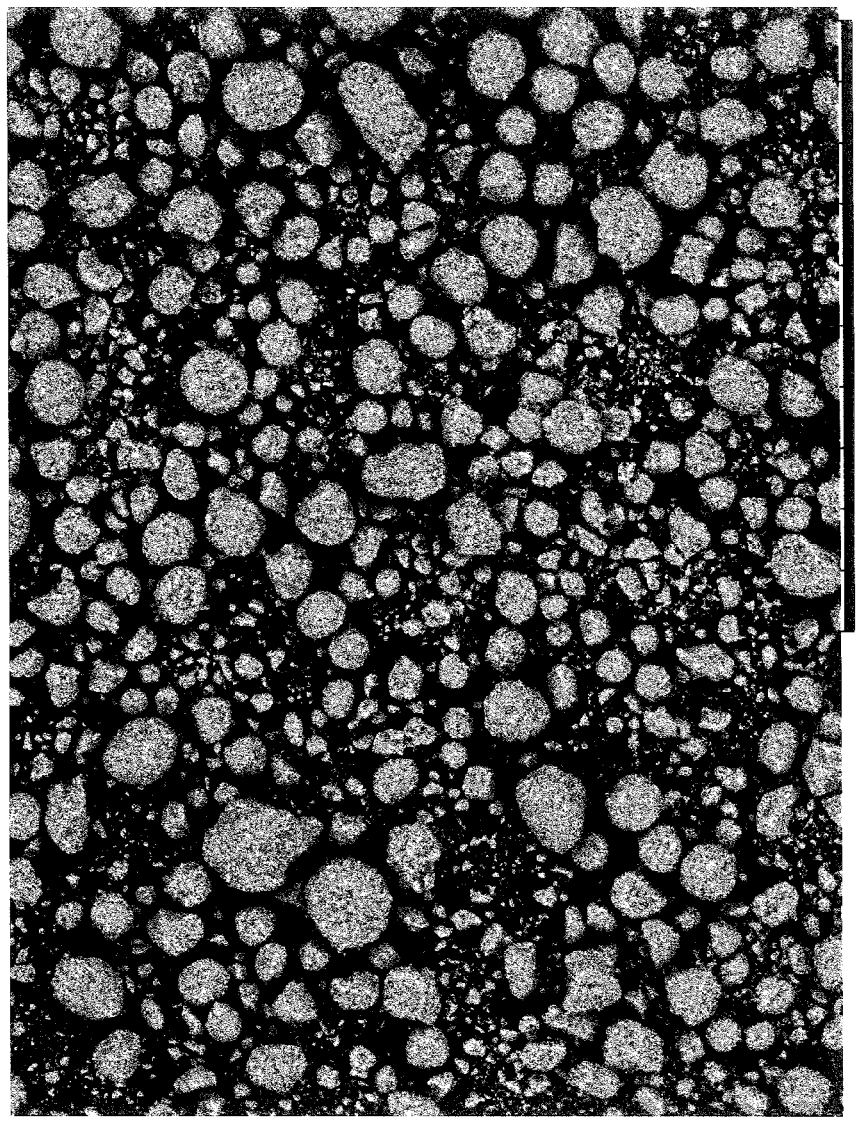

CEMENT AND CONCRETE WITH REINFORCED MATERIAL

CROSS-REFERENCE TO RELATED APPLICATIONS

This application is a continuation-in-part of U.S. application Ser. No. 13/350,199, filed Jan. 13, 2012 now abandoned which is a divisional of U.S. application Ser. No. 12/857,267, filed Aug. 16, 2010, issued as U.S. Pat. No. 8,114,214 which in turn claims priority to U.S. Provisional Application No. 61/291,811, filed Dec. 31, 2009; U.S. Provisional Application No. 61/360,829, filed Jul. 1, 2010; and U.S. Provisional Application No. 61/371,606, filed Aug. 6, 2010; and this application claims priority to U.S. Provisional Patent Application No. 61/513,367, filed Jul. 29, 2011, and U.S. Provisional Patent Application No. 61/541,735, filed Sep. 30, 2011, all of which are incorporated herein by reference in their entireties in the present disclosure.

BACKGROUND OF THE INVENTION

Plain concrete may have compressive strength, i.e., its ability to resist crushing loads; however, its tensile strength may be only about 10% of its compressive strength. Its tensile strength may be so low that it may be nearly disregarded in design of most concrete structures. Reinforced concrete may be a combination of adequate reinforcement (such as steel bars with raised lugs called deformations) and concrete designed to work together to resist applied loads. Properly placed reinforcement in concrete may improve its compressive and tensile strength.

SUMMARY OF THE INVENTION

Provided herein are compositions, methods, and systems that combine cementitious composition and reinforcing materials. Such compositions may be environment friendly as they contain sequestered carbon dioxide.

In one aspect, there is provided a composition comprising a cementitious composition wherein the cementitious composition comprises a metastable component selected from the group consisting of vaterite, amorphous calcium carbonate, and combination thereof, and a reinforcing material. In some embodiments, the cement has a wet paste pH of less than 12. In some embodiments, the cementitious composition includes at least 80 wt % synthetic calcium and/or magnesium carbonate mineral. In some embodiments, the cementitious composition has a $\delta^{13}C$ value less than −12‰. In some embodiments, the cementitious composition comprises at least 50 wt % vaterite or between 50 wt %-99 wt % vaterite. In some embodiments, the composition includes more than 0.15% water-soluble chloride ion by weight of cement in the composition. In some embodiments, there is provided a composition comprising a cementitious composition wherein the cementitious composition comprises a metastable component selected from the group consisting of vaterite, amorphous calcium carbonate, and combination thereof, and a reinforcing material in which the reinforcing material does not exhibit changes in mechanical properties including, but not limited to, elastic modulus, tensile strength, and yield strength, when exposed to water-soluble chloride repeatedly or for an extended period of time.

In some embodiments, the reinforcing material in the compositions of the invention is selected from the group consisting of aluminum, glass fiber, carbon fiber, ceramics, polymer, grass, grass product, wood product, and combination thereof. In some embodiments, the reinforcing material includes a metal. In some embodiments, the reinforcing material includes stainless steel cladding treated rebar, galvanized rebar, stainless steel rebar, fiber-reinforced plastic, epoxy coated rebar, titanium cladding treated rebar, chrome plated/coated rebar, nickel plated/coated rebar, cobalt-chromium coated rebar, or any combination thereof. In some embodiments, the reinforcing material includes a polymer. In some such embodiments, the reinforcing material may include fiber-reinforced plastic, epoxy coated rebar, polycarbonate reinforcing members, polycarbonate fiber, poly(vinyl chloride) (PVC) reinforcing members, PVC fiber, polypropylene, cellulose, polyvinyl alcohol, or any combination thereof. In some embodiments, the reinforcing material includes a grass, a grass product, a wood product, or any combination thereof. In some such embodiments, the reinforcing material includes bamboo.

In some embodiments, the invention provides a composition as described above, in which at least 1% by volume of the reinforcing material is aligned in the same direction. In some embodiments of the invention, the aligned reinforcing material is held in compression to yield a pre-stressed concrete element (part) or body. In some such embodiments, the invention provides a composition in which the extreme fiber stress in the composition does not exceed 0.60 of the specified compressive strength of concrete in pounds per square inch (psi), nor does the extreme fiber stress in compression at ends of simply supported members does not exceed 0.70 of the specified compressive strength of concrete in pounds per square inch (psi).

In some embodiments, the invention provides a composition as described above, in which the cementitious composition comprises at least 80 wt % carbonate mineral. In some embodiments, the carbon in the carbonate mineral is derived in whole or in part from carbon dioxide removed from an industrial waste stream. In some embodiments, the composition provided herein meets the requirements for durability, strength and serviceability, flexure and axial loads, shear and torsion, and the rest of the structural concrete building code, e.g. as described in ACI-318-08 and ACI-201.2R-01. In some embodiments, in the composition provided herein, the reinforcing material has a yield strength of at least 420 MPa. In some embodiments, in the composition provided herein, the reinforcing material has an elastic modulus of 25 GPa to 250 GPa. In some embodiments of the invention, the compositions provided herein are suitable for use in structural building applications. In some embodiments, the compositions described above further includes aggregate.

In one aspect, there is provided a method for forming a cement or concrete composition that includes combining a cementitious composition wherein the cementitious composition comprises a metastable component selected from the group consisting of vaterite, amorphous calcium carbonate, and combination thereof, with a reinforcing material, and forming a cement or concrete composition. In some embodiments, the method includes forming the cementitious composition with a wet paste pH of 12 or less. In some embodiments, the method includes making the cementitious composition by contacting an industrial waste gas stream comprising carbon dioxide with an alkaline solution to form a carbon dioxide charged water; and contacting the carbon dioxide charged water with divalent cations to form the cementitious composition. In some embodiments, the method includes contacting the carbon dioxide charged water with the divalent cations under one or more precipitation conditions that favor the formation of the cementitious composition comprising a metastable component selected from the group consisting of vaterite, amorphous calcium carbonate, and combination thereof. In some embodiments, the one or more precipitation conditions favor the formation of more than 50 wt % vaterite in the cementitious composition. In some embodiments, the one or more precipitation conditions that favor the formation of the cementitious composition comprising a metastable component selected from the group consisting of vaterite, amorphous calcium carbonate, and combination thereof or that favor the formation of more than 50 wt % vaterite in the cementitious composition include, temperature, pH, residence time, proton removing agent, additive, ion ratio, rate of precipitation, mixing rate, form of agitation, presence of seed crystal, catalyst, membrane, or substrate, separation, drying, refining, or combination thereof. In some embodiments, the method further includes contacting the cement or the concrete composition with water and converting the vaterite to aragonite. In some embodiments, the method provided herein includes forming the aragonite crystals on the reinforced material. In some embodiments, in the method provided herein, the reinforcing material includes, but not limited to, aluminum, glass fiber, carbon fiber, ceramics, polymer, grass, grass product, wood product, and combination thereof. In some embodiments, in the method provided herein, the reinforcing material includes, but not limited to, stainless steel cladding treated rebar, galvanized rebar, stainless steel rebar, fiber-reinforced plastic, epoxy coated rebar, titanium cladding treated rebar, chrome plated/coated rebar, nickel plated/coated rebar, cobalt-chromium coated rebar, or any combination thereof. In some embodiments, in the method provided herein, the reinforcing material includes, but not limited to, polycarbonate reinforcing members, polycarbonate fiber, poly(vinyl chloride) (PVC) reinforcing members, PVC fiber, polypropylene, cellulose, polyvinyl alcohol, or any combination thereof. In some embodiments, the reinforcing material in the methods of the invention includes a grass, a grass product, a wood product, or any combination thereof. In some embodiments, the method further includes obtaining the alkaline solution using an electrochemical method. In some embodiments, in the method provided herein, the alkaline solution is sodium hydroxide solution or sodium carbonate solution, or combination thereof. In some method embodiments, an aggregate is combined with the cementitious composition and reinforcing material. In some embodiments, the method further includes aligning a portion of the reinforcing material and holding the aligned portion of the reinforcing material in compression to yield a pre-stressed concrete element or body.

In some embodiments, the method may further include obtaining the reinforcing material in a manner including utilizing chlorine, hydrochloric acid, or another species produced in the electrochemical method to make vinyl chloride monomers, and further including polymerizing the vinyl chloride monomers to yield poly (vinyl chloride); in some such embodiments, the method may also include further processing of the poly (vinyl chloride) by casting, extrusion, spinning, or any combination thereof. In some embodiments, the invention provides a method that includes combining a cementitious composition and a reinforcing material that includes a polymer, in which reactants to form monomers of the polymer are derived at least partially from an electrochemical process that also provides proton removal agents or means for a gaseous carbon dioxide removal process, that further includes obtaining the reinforcing material. In some such embodiments, obtaining the reinforcing material may include the steps of: i) applying a potential measured in volts across an anode and a cathode in an electrochemical system, in which the electrochemical system is configured to either: produce hydroxide or remove protons from a solution that includes dissolved carbon dioxide, and in which the electrochemical system also produces by-products comprising chlorine, hydrogen, hydrochloric acid, or any combination thereof; ii) producing vinyl chloride monomer from the by-products of the electrochemical system; and iii) producing a polymer reinforcing material comprising the vinyl chloride monomer. In some embodiments, the invention provides a method in which obtaining the reinforcing material includes the steps of: i) applying a potential measured in volts across an anode and a cathode in an electrochemical system, in which the electrochemical system is configured to remove protons from a solution that includes dissolved carbon dioxide and produce a monomer by-product; and ii) producing a polymer reinforcing material that includes the monomer by-product. In some such embodiments, the monomer by-product comprises vinyl chloride, ethylene, styrene, propylene, methyl methacrylate, condensation polymer monomers, olefins, acrylates, or any combination thereof.

In one aspect, there is provided a system that includes a concrete producing station operably connected to a cement producing station configured to combine a cementitious composition comprising a metastable component selected from the group consisting of vaterite, amorphous calcium carbonate, and combination thereof obtained from the cement producing station with a reinforcing material from a reinforcing material source to produce a concrete composition. In some embodiments, the cement producing station is configured to produce the cementitious composition using carbon dioxide from a carbon dioxide source, alkaline solution from an alkali source, and divalent cations from a divalent cation source. In some embodiments, the system further includes an alkali source operably connected to the cement producing station configured to electrochemically produce the alkaline solution. In some embodiments, the system further includes an aggregate source, in which the aggregate source is operably connected to the cement producing station and is configured to provide aggregate to the cement producing station. In some embodiments, the In some embodiments, the invention provides a system configured to perform the methods described in this application.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 10 illustrates SEM image of the calcium carbonate cement, as described in Example 2.

DETAILED DESCRIPTION OF THE INVENTION

Figure 1:
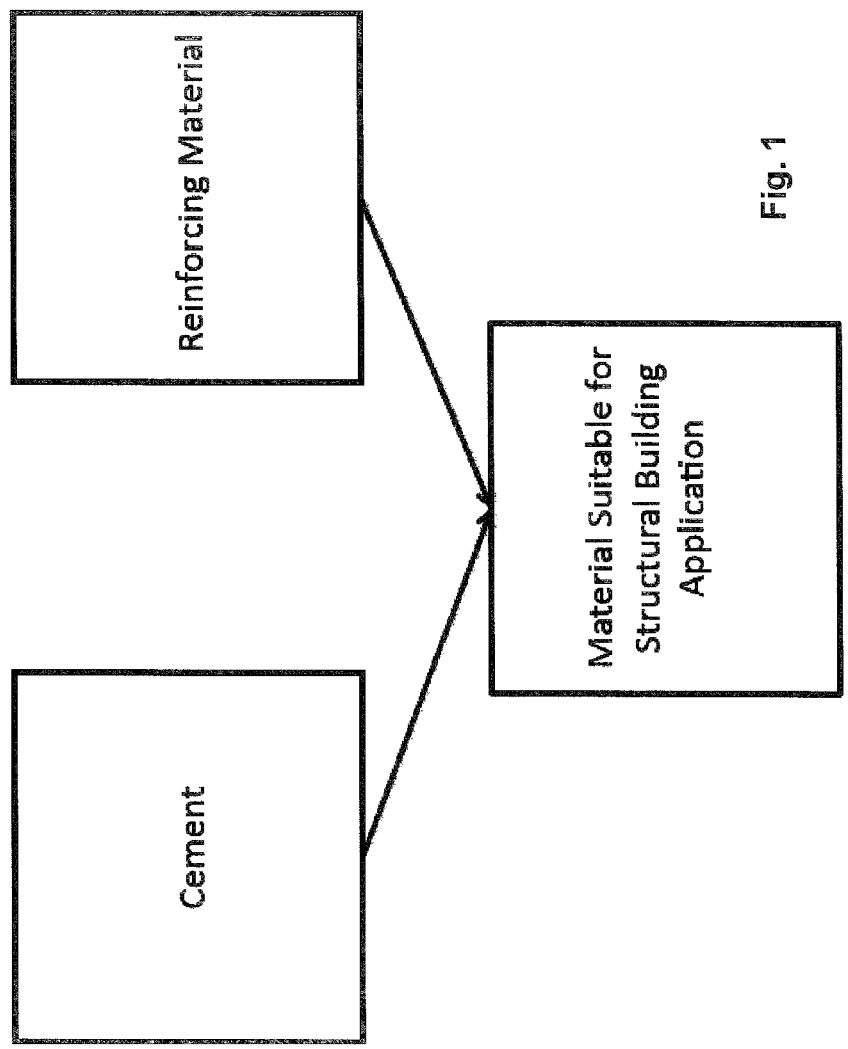
FIG. 1 illustrates a flow diagram for some embodiments of the invention.

Provided herein are compositions, methods and systems containing a cementitious composition reinforced with a reinforcing material. In some embodiments, the cementitious composition of the invention includes a metastable component such as, but not limited to, vaterite, amorphous calcium carbonate, or combination thereof. The cementitious composition may further include stable forms of calcium carbonate such as, but not limited to, aragonite and calcite and optionally magnesium carbonate forms. Applicants unexpectedly and surprisingly found that the metastable forms of calcium carbonate impart properties to the cementitious composition that are not present in the cementitious compositions that lack the metastable forms. For example, in some embodiments, the cementitious composition with metastable forms after mixing with reinforced material and further mixing with water, sets and hardens where vaterite converts to aragonite on and/or around the surface of the reinforced material. The transformation of vaterite to aragonite during and/or after dissolution-re-precipitation process may lead to better linkage or bonding between the cementitious composition and the reinforced material. The cementitious composition of the invention containing the metastable component may be equal to or better than the cementitious composition without the metastable component, in building structures with durability, strength, serviceability, tensile strength, flexural and axial strength, impact properties, resistance to cracking, resistance to bursting stress, and/or shear and torsion.

In some embodiments, the cementitious composition is a synthetic cement and not a naturally occurring cement. In some embodiments, the cementitious composition is a synthetic carbonate, such as synthetic calcium carbonate and not a naturally occurring carbonate. In some embodiments, the cementitious composition has a wet paste pH value of less than 12. In some embodiments, the cementitious composition is a synthetic cement which has a wet paste pH value of less than 12. In some embodiments, the compositions provided herein are suitable for building structural applications. In some embodiments, the cementitious composition of the invention provide a pH of lower than 12 to the reinforced material as compared to the convention cement that typically has a pH of greater than 12. The conventional concrete may have to be formulated to enhance the corrosion resistance of the reinforcing materials, such as mild steel. As such, the water-soluble chloride content of conventional concrete may have to be strictly monitored and controlled. The pH of lower than 12, in the cementitious composition of the invention, may reduce corrosion of the reinforced material, such as steel.

The "reinforcing material" or its grammatical equivalent as used herein, includes materials that are incorporated into the cementitious composition to impart physical and/or mechanical properties to it. The reinforced material may be in a shape of bars, wire, threads, grids, plates, fibers, etc. The reinforced material may be any material known in the art including, but not limited to, organic, inorganic, metallic, synthetic, or naturally occurring. In some embodiments, the reinforcing material as disclosed herein, increases the strength in tensile, flexural, and/or impact properties in the cementitious composition. In some embodiments, the reinforcing material does not undergo corrosion and is suitable for building structural applications. In some embodiments, the reinforcing material may be a composite material, i.e. a combination of two or more constituent materials with different properties. For example, straw and mud may be combined to form bricks or building construction.

Before the invention is described in greater detail, it is to be understood that the invention is not limited to particular embodiments described herein as such embodiments may vary. It is also to be understood that the terminology used herein is for the purpose of describing particular embodiments only, and is not intended to be limiting, since the scope of the invention will be limited only by the appended claims. Unless defined otherwise, all technical and scientific terms used herein have the same meaning as commonly understood by one of ordinary skill in the art to which this invention belongs.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number, which, in the context in which it is presented, provides the substantial equivalent of the specifically recited number.

All publications, patents, and patent applications cited in this specification are incorporated herein by reference to the same extent as if each individual publication, patent, or patent application were specifically and individually indicated to be incorporated by reference. Furthermore, each cited publication, patent, or patent application is incorporated herein by reference to disclose and describe the subject matter in connection with which the publications are cited. The citation of any publication is for its disclosure prior to the filing date and should not be construed as an admission that the invention described herein is not entitled to antedate such publication by virtue of prior invention. Further, the dates of publication provided may be different from the actual publication dates, which may need to be independently confirmed.

It is noted that, as used herein and in the appended claims, the singular forms "a", "an", and "the" include plural references unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the invention. Any recited method can be carried out in the order of events recited or in any other order, which is logically possible. Although any methods and materials similar or equivalent to those described herein may also be used in the practice or testing of the invention, representative illustrative methods and materials are now described.

In further describing the subject invention, the compositions of reinforced cement and concrete according to embodiments of the invention are described. Methods of producing and using various embodiments of the compositions of the invention are described, followed by systems that may be used to practice various methods of the invention.

A. Compositions

Figure 2:
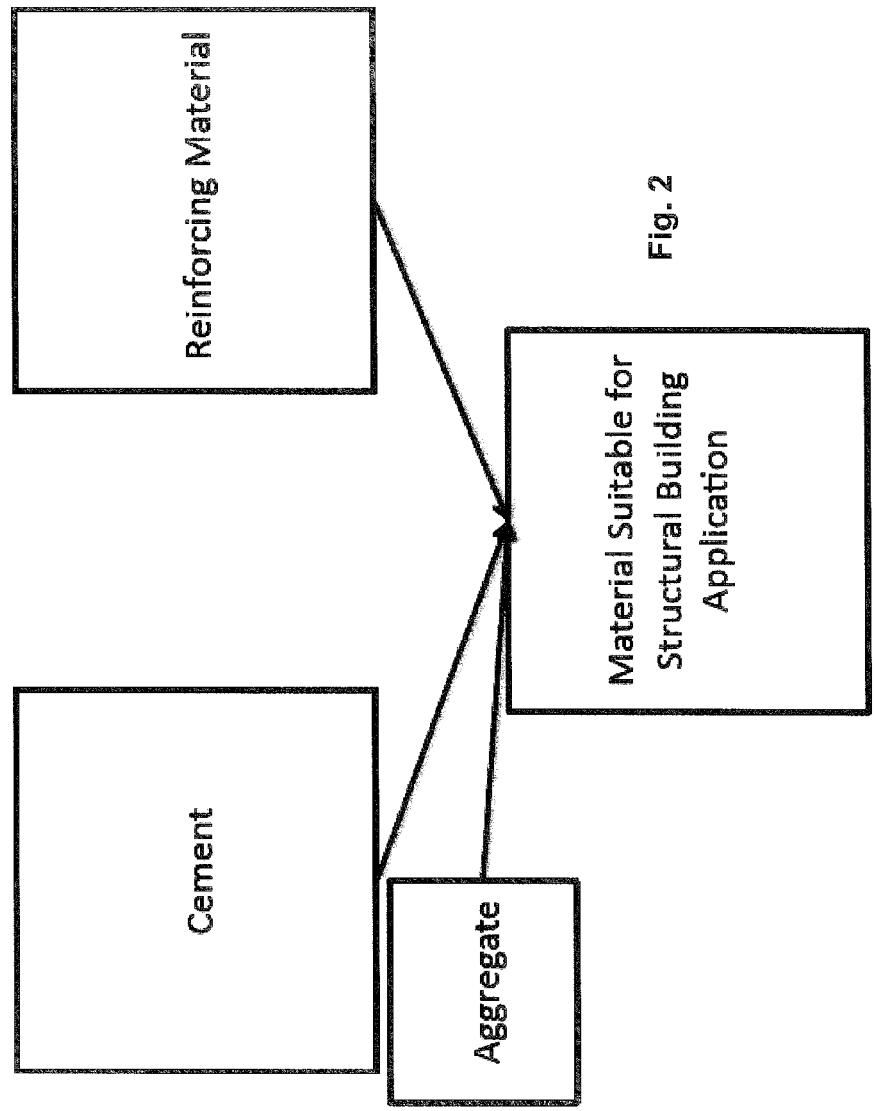
FIG. 2 illustrates a flow diagram for some embodiments of the invention.

In one aspect, there are provided compositions including a cementitious composition and the reinforcing material. In some embodiments, the cementitious composition comprises a metastable component selected from the group consisting of vaterite, amorphous calcium carbonate, and combination thereof. FIG. 1 illustrates a flow diagram where the cementitious composition is combined with a reinforcing material to yield a material suitable for a structural building application. FIG. 2 illustrates a flow diagram where a cementitious composition is combined with a reinforcing material and an aggregate to yield a concrete material suitable for a structural building application. The aggregate may be synthetic or naturally occurring. In some embodiments, the aggregate is calcium carbonate made from the methods described herein. It is to be understood that other components such as sand to make mortar and other supplementary cementitious materials may be added to the cementitious composition of the invention.

The cementitious compositions and the reinforcing material are described in detail herein.

Cementitious Compositions

The "cementitious composition" as used herein includes calcium carbonate containing compositions. In some embodiments, the cementitious compositions after combination with water set and harden into cement. The cementitious compositions may be a self-cement or hydraulic cement composition, a supplementary cementitious material (SCM), an aggregate, or combination thereof. The self-cementing composition may be chopped up to form aggregates.

As used herein, "hydraulic cement" or "self-cement" includes a composition which sets and hardens after combining with water or a solution where the solvent is water, e.g., an admixture solution. After hardening, the compositions retain strength and stability even under water. As a result of the immediately starting reactions, stiffening can be observed which may increase with time. After reaching a certain level, this point in time may be referred to as the start of setting. The consecutive further consolidation may be called setting, after which the phase of hardening begins. The compressive strength of the material may then grow steadily, over a period which ranges from a few days in the case of "ultra-rapid-hardening" cements, to several months or years in the case of other cements. Setting and hardening of the product produced by combination of the composition of the invention with an aqueous liquid may or may not result from the production of hydrates that may be formed from the composition upon reaction with water, where the hydrates are essentially insoluble in water. Cements may be employed by themselves or in combination with aggregates, both coarse and fine, in which case the compositions may be referred to as concretes or mortars. Cements may also be cut and chopped to form aggregates.

In some embodiments, the cementitious composition of the invention has a wet paste pH of less than 12; or less than 11; or less than 10; or less than 9; or less than 8; or less than 7; or between 7-12; or between 7-11. In some embodiments, there is provided a composition comprising a cementitious composition and a reinforcing material wherein the cementitious composition comprises a metastable component selected from the group consisting of vaterite, amorphous calcium carbonate, and combination thereof and wherein the cementitious composition has a wet paste pH of less than 12. Typically, the higher pH value of the cement may cause corrosion of the reinforced material. For example, in some embodiments, conventional cements such as Portland cement, that has a pH value of greater than 12, may form a passive layer on the reinforced material which may prevent corrosion of the reinforced material. However, the cementitious compositions provided herein have a pH value of less than 12.5 or 12, for example, the pH is neutral in some embodiments, such that such preventative passivation of the metal may not take place. In some embodiments, the cemenetitious compositions provided herein have a pH value of 12.5 or less. In some embodiments, the cementitious compositions provided herein have a fresh paste value of 12.5 or less. The "fresh paste" as used herein includes the paste formed after mixing the cementitious composition with water. In some embodiments, the cementitious compositions provided herein have a pH value of or fresh paste value of 12.5 or less, or 12 or less, or 11 or less, or 10 or less, or 9 or less, or 8 or less, or 7.5 or less, or between 7.5-12.5, or between 7.5-12, or between 7.5-11, or between 7.5-10, or between 7.5-9, or between 7.5-8, or between 8-12.5, or between 8-12, or between 8-11, or between 8-10, or between 8-9, or between 9-12.5, or between 9-12, or between 9-11, or between 9-10, or between 10-12.5, or between 10-12, or between 10-11, or between 11-12.5, or between 11-12, or 7.5, or 8, or 9, or 10, or 11, or 12, or 12.5. The lower pH of the cementitious composition of the invention makes it suitable for variety of applications including, but not limited to, artificial reefs, which are described in U.S. application Ser. No. 13/462,569, filed May 2, 2012, which is incorporated herein by reference in its entirety.

Chlorides, including sodium chloride, may promote the corrosion of reinforced material, such as embedded steel rebar. Chloride anions may induce both localized corrosion (pitting corrosion) and generalized corrosion of steel reinforcements. In some embodiments, the cementitious compositions provided herein may be made from processes which may cause the composition to contain water soluble chloride. In some embodiments, the cementitious composition may contribute substantially to the water soluble chloride content of the composition. In embodiments, where the cementitious compositions may contain sufficiently high amount of chloride, a reinforced material that can withstand higher content of chloride is needed. In some embodiments, the water soluble chloride content in the composition may be determined when the composition is between 28 and 42 days old (e.g., for a concrete between 28 and 42 days after mixing and forming) and as outlined in ASTM C1218. For example, if the material as a whole is a concrete, the water soluble chloride from the cement and the aggregate, sand, and any other material in the concrete may be measured by methods outlined in ASTM C1218. In some embodiments, the composition comprises more than 0.06%, or more than 0.1%, or more than 0.15%, or more than 0.2%, or more than 0.3%, or more than 1%, or between 0.05-5%, or between 0.05-4%, or between 0.05-3%, or between 0.05-2%, or between 0.05-1%, water-soluble chloride ion by weight of the cement in the composition.

Provided below are methods to make and use the cementitious composition of the invention. More detailed description for making and using such materials may be found in commonly assigned U.S. Pat. Nos. 7,735,274 and 8,062,418, both of which are herein incorporated by reference in their entirety.

The cementitious compositions of the invention are formed by sequestering carbon dioxide from a carbon dioxide source such as waste streams, such as, but not limited to flue gases from power plants or carbon dioxide emitted by cement plants and the like. In some embodiments, the cementitious composition contains carbon derived from a fuel used by humans, e.g., carbon having a fossil fuel origin. For example, in some embodiments, the cementitious compositions of the invention contain carbon that was released in the form of $CO_2$ from the combustion of fuel. In certain embodiments, the carbon sequestered in the cementitious composition is in the form of a carbonate compound. Therefore, in certain embodiments, the cementitious compositions provided herein contain carbonate compounds where at least part of the carbon in the carbonate compounds is derived from a fuel used by humans, e.g., a fossil fuel. As such, production of the compositions of the invention results in the placement of $CO_2$ into a storage stable form in the cementitious composition. Production of the cementitious compositions of the invention thus results in the prevention of $CO_2$ gas from entering the atmosphere. The compositions of the invention provide for storage of $CO_2$ in a manner such that $CO_2$ sequestered (i.e., fixed) in the composition does not become part of the atmosphere. As such, where the compositions are consumable compositions, the $CO_2$ fixed therein remains fixed for the life of the consumable, if not longer.

The cementitious compositions of the invention include compositions that contain carbonates and/or bicarbonates, which may be in combination with a divalent cation such as calcium and/or magnesium, or with a monovalent cation such as sodium. The carbonates and/or bicarbonates may be in solution, in solid form, or a combination of solution and solid form, e.g., a slurry. The carbonates and/or bicarbonates may contain carbon dioxide from a source of carbon dioxide; in some embodiments the carbon dioxide originates from the burning of fossil fuel, and thus some (e.g., at least 10, 50, 60, 70, 80, 90, 95%) or substantially all (e.g., at least 99, 99.5, or 99.9%) of the carbon in the carbonates and/or bicarbonates is of fossil fuel origin, i.e., of plant origin. As is known, carbon of plant origin has a different ratio of stable isotopes ($^{13}C$ and $^{12}C$) than carbon of inorganic origin, and thus the carbon in the carbonates and/or bicarbonates, in some embodiments, has a $\delta^{13}C$ of less than, e.g., −10‰, or less than −15‰, or less than −20‰, or less than −35‰, or less than −30‰, or less than −35‰.

In some embodiments, compositions provided herein contain carbon from fossil fuel; because of its fossil fuel origin, the carbon isotopic fractionation ($\delta^{13}C$) value of such compositions may be different from that of compositions containing inorganic carbon, e.g., limestone. Typically, the plants from which fossil fuels are derived may preferentially utilize $^{12}C$ over $^{13}C$, thus fractionating the carbon isotopes so that the value of their ratio differs from that in the atmosphere in general; this value, when compared to a standard value (PeeDee Belemnite, or PDB, standard), is termed the carbon isotopic fractionation ($\delta^{13}C$) value. $\delta^{13}C$ values for coal are generally in the range −30 to −20‰ and $\delta^{13}C$ values for methane may be as low as −20‰ to −40‰ or even −40‰ to −80‰. $\delta^{13}C$ values for atmospheric $CO_2$ are −10‰ to −7‰, for limestone +3‰ to −3‰, and for marine bicarbonate, 0‰.

Precipitation material, which comprises one or more synthetic carbonates derived from industrial $CO_2$, reflects the relative carbon isotope composition ($\delta^{13}C$) of the fossil fuel (e.g., coal, oil, natural gas, or flue gas) from which the industrial $CO_2$ (from combustion of the fossil fuel) was derived. The relative carbon isotope composition ($\delta^{13}C$) value with units of ‰ (per mil) is a measure of the ratio of the concentration of two stable isotopes of carbon, namely $^{12}C$ and $^{13}C$, relative to a standard of fossilized belemnite (the PDB standard).

$$\delta^{13}C‰ = [(C^{13}/^{12}C_{sample} - ^{13}C/^{12}C_{PDB\ standard})/(^{13}C/^{12}C_{PDB\ standard})] \times 1000$$

$^{12}C$ is preferentially taken up by plants during photosynthesis and in other biological processes that use inorganic carbon because of its lower mass. The lower mass of $^{12}C$ allows for kinetically limited reactions to proceed more efficiently than with $^{13}C$. Thus, materials that are derived from plant material, e.g., fossil fuels, have relative carbon isotope composition values that are less than those derived from inorganic sources. The carbon dioxide in flue gas produced from burning fossil fuels reflects the relative carbon isotope composition values of the organic material that was fossilized. Table I lists relative carbon isotope composition value ranges for relevant carbon sources for comparison.

Composition incorporating carbon from burning fossil fuels may reflect $\delta^{13}C$ values that are like those of plant derived material, i.e. less, than that which incorporates carbon from atmospheric or non-plant marine sources. Verification that the material produced by a carbon dioxide sequestering process is composed of carbon from burning fossil fuels can include measuring the $\delta^{13}C$ value of the resultant material and confirming that it is not similar to the values for atmospheric carbon dioxide, nor marine sources of carbon.

TABLE I

Relative carbon isotope composition ($\delta^{13}C$) values for carbon sources of interest.

| Carbon Source | $\delta^{13}C$ Range [‰] | $\delta^{13}C$ Average value [‰] |
|---|---|---|
| C3 Plants (most higher plants) | −23 to −33 | −27 |
| C4 Plants (most tropical and marsh plants) | −9 to −16 | −13 |
| Atmosphere | −6 to −7 | −6 |
| Marine Carbonate ($CO_3$) | −2 to +2 | 0 |
| Marine Bicarbonate ($HCO_3$) | −3 to +1 | −1 |
| Coal from Yallourn Seam in Australia[1] | −27.1 to −23.2 | −25.5 |
| Coal from Dean Coal Bed in Kentucky, USA[2] | −24.47 to −25.14 | −24.805 |

[1]Holdgate, G. R. et al., *Global and Planetary Change*, 65 (2009) pp. 89-103.
[2]Elswick, E. R. et al., *Applied Geochemistry*, 22 (2007) pp. 2065-2077.

As such, the $\delta^{13}C$ value of the cementitious composition of the invention may serve as a fingerprint for a $CO_2$ gas source. The $\delta^{13}C$ value may vary from source to source (i.e., fossil fuel source), but the $\delta^{13}C$ value for composition provided herein may range between −9‰ to −35‰. In some embodiments, the $\delta^{13}C$ value for the cementitious composition is between −9‰ and −50‰, or between −15‰ and −40‰, or between −15‰ and −35‰, or between −15‰ and −25‰. In some embodiments, the $\delta^{13}C$ value for the cementitious composition is less than (i.e., more negative than) −9‰, −10‰, −11‰, −12‰, −13‰, −14‰, −15‰, −16‰, −17‰, −18‰, −19‰, −20‰, −21‰, −22‰, −23‰, −24‰, −25‰, −26‰, −27‰, −28‰, −29‰, −30‰, −31‰, −32‰, −33‰, −34‰, −35‰, −36‰, −37‰, −38‰, −39‰, −40‰, −41‰, −42‰, −43‰, −44‰, or −45‰. Any suitable method may be used for measuring the $\delta^{13}C$ value, methods including, but not limited to, mass spectrometry or off-axis integrated-cavity output spectroscopy (off-axis ICOS). One difference between the carbon isotopes is in their mass. Any mass-discerning technique sensitive enough to measure the amounts of carbon we have can be used to find ratios of the $^{13}C$ to $^{12}C$ isotope concentrations. Mass spectrometry is commonly used to find $\delta^{13}C$ values. Commercially available are bench-top off-axis integrated-cavity output spectroscopy (off-axis ICOS) instruments that are able to determine $\delta^{13}C$ values as well. These values are obtained by the differences in the energies in the carbon-oxygen double bonds made by the $^{12}C$ and $^{13}C$ isotopes in carbon dioxide.

In some embodiments, the cementitious composition is a composition that contains carbonates, e.g., magnesium and/or calcium carbonates that are characterized by having a $\delta^{13}C$ value less than −10‰. In some embodiments, the cementitious composition is a composition that contains carbonates, e.g., magnesium and/or calcium carbonates that are characterized by having a $\delta^{13}C$ value less than −15‰, such as −16‰, such as less than −20‰, such as −21‰, such as −22‰, such as −23‰, such as −24‰, such as less than −25‰. In some embodiments, the cementitious composition is a composition that contains organic matter or fossil fuel burning originated carbonates, that are characterized by having a $\delta^{13}C$ value less than −10‰, such as less than −15‰, such as −16‰, such as less than −20‰, such as −21‰, such as −22‰, such as −23‰, such as −24‰, such as less than −25‰. In some embodiments, the cementitious composition is a composition that contains organic matter or fossil fuel burning originated carbonates, e.g., calcium carbonates that are characterized by having a $\delta^{13}C$ value less than −10‰. In some embodiments, the cementitious composition is a composition that contains organic matter or fossil fuel burning originated carbon, e.g., poly(vinyl chloride) that is characterized by having a $\delta^{13}C$ value less than −10‰.

In some embodiments, there is provided a composition comprising a cementitious composition and a reinforcing material wherein the cementitious composition comprises a metastable component selected from the group consisting of vaterite, amorphous calcium carbonate, and combination thereof and wherein the cementitious composition has a $\delta^{13}C$ value less than −12.0‰ or between −12‰ to −40‰. In some embodiments, there is provided a composition comprising a cementitious composition and a reinforcing material wherein the cementitious composition comprises a metastable component selected from the group consisting of vaterite, amorphous calcium carbonate, and combination thereof, wherein the cementitious composition a $\delta^{13}C$ value less than −12.0‰ or between −12‰ to −40‰, and wherein the cementitious composition has a wet paste pH of less than 12.

In some embodiments, the ratio of the calcium to carbonate ions may be varied to form the cementitious composition with desired surface charge. In some embodiments, the ratio of calcium or calcium ion with the carbonate or the carbonate ion in the cementitious composition (calcium:carbonate) is greater than 1:1; or greater than 1.5:1; or greater than 2:1; or greater than 2.5:1; or greater than 3:1; or greater than 3.5:1; or greater than 4:1; or greater than 4.5:1; or greater than 5:1; or is in a range of 1:1 to 5:1; or is in a range of 1.5:1 to 5:1; or is in a range of 2:1 to 5:1; or is in a range of 3:1 to 5:1; or is in a range of 4:1 to 5:1; or is in a range of 1:1 to 4:1; or is in a range of 1.5:1 to 4:1; or is in a range of 2:1 to 4:1; or is in a range of 3:1 to 4:1; or is in a range of 1:1 to 3:1; or is in a range of 1.5:1 to 3:1; or is in a range of 2:1 to 3:1; or is in a range of 1:1 to 2:1; or is in a range of 1.5:1 to 2:1; or is in a range of 1.5:1 to 1:1; or is in a range of 1.2:1 to 1.8:1; or is 1:1; or is 1.5:1; or is 2:1; or is 2.5:1; or is 3:1; or is 3.5:1; or is 4:1; or is 4.5:1; or is 5:1. In some embodiments, the ratio of calcium:carbonate in the cementitious composition is 1.5:1, or 1:1, or 2:1.

In some embodiments, the cementitious composition provided herein may further include nitrogen oxide, sulfur oxide, mercury, metal, derivative of any of nitrogen oxide, sulfur oxide, mercury, and/or metal, or combination thereof. The derivatives of nitrogen oxide and sulfur oxide include, but not limited to, nitrates, nitrites, sulfates, and sulfites, etc. The mercury and/or the metal may be present in their derivatized form, such as, oxides and/or hydroxides, or the mercury and/or the metal may be encapsulated or present in the cementitious composition of the invention in un-derivatized form. In some embodiments, the cementitious composition provided herein may further include one or more additional components including, but are not limited to, blast furnace slag, fly ash, diatomaceous earth, and other natural or artificial pozzolans, silica fumes, limestone, gypsum, hydrated lime, air entrainers, retarders, waterproofers and coloring agents. These components may be added to modify the properties of the cement, e.g., to provide desired strength attainment, to provide desired setting times, etc. The amount of such components present in a given composition of the invention may vary, and in certain embodiments the amounts of these components range from 0.1 to 1% w/w; or 1 to 50% w/w, or 10% w/w to 50% w/w, such as 2 to 10% w/w.

In some embodiments, there is provided a composition comprising a cementitious composition and a reinforcing material wherein the cementitious composition comprises a metastable component selected from the group consisting of vaterite, amorphous calcium carbonate, and combination thereof. The carbonate compounds of the cementitious composition may be metastable carbonate compounds including, but not limited to, vaterite and/or amorphous calcium carbonate. The carbonate compound containing cementitious compositions of the invention may include precipitated crystalline and/or amorphous carbonate compounds. Specific carbonate minerals of interest include, but are not limited to: calcium carbonate minerals, magnesium carbonate minerals and calcium magnesium carbonate minerals. Calcium carbonate minerals of interest include, but are not limited to: calcite ($CaCO_3$), aragonite ($CaCO_3$), vaterite ($CaCO_3$), ikaite ($CaCO_3 \cdot 6H_2O$), and amorphous calcium carbonate ($CaCO_3 \cdot nH_2O$). Magnesium carbonate minerals of interest include, but are not limited to: magnesite ($MgCO_3$), barringtonite ($MgCO_3 \cdot 2H_2O$), nesquehonite ($MgCO_3 \cdot 3H_2O$), lanfordite ($MgCO_3 \cdot 5H_2O$) and amorphous magnesium calcium carbonate ($MgCO_3 \cdot nH_2O$). Calcium magnesium carbonate minerals of interest include, but are not limited to dolomite ($CaMgCO_3$), huntite ($CaMg_3(CO_3)_4$) and sergeevite ($Ca_2Mg_{11}(CO_3)_{13} \cdot H_2O$). In certain embodiments, non-carbonate compounds like brucite ($Mg(OH)_2$) may also form in combination with the minerals listed above. As indicated above, the compounds of the carbonate compound compositions are metastable carbonate compounds (and may include one or more metastable hydroxide compounds) that are more stable in saltwater than in freshwater, such that upon contact with fresh water of any pH they dissolve and re-precipitate into other fresh water stable compounds, e.g., minerals such as low-Mg calcite.

Calcium carbonate in the cementitious composition in addition to vaterite may include, but not limited to: a precursor phase of vaterite, a precursor phase of aragonite, an intermediary phase that is less stable than calcite, polymorphic forms in between these polymorphs, and combination thereof. Vaterite may be present in the cementitious composition in a monodisperse or agglomerated form, and may be in spherical, ellipsoidal, plate like shape, or hexagonal system. Vaterite typically has a hexagonal crystal structure and forms polycrystalline spherical particles upon growth. The precursor form of vaterite may comprise nanoclusters of vaterite and the precursor form of aragonite may comprise sub-micron to nanoclusters of aragonite needles. Aragonite, if present in the composition, may be needle shaped, columnar, or crystals of the rhombic system. Calcite, if present, may be cubic, spindle, or crystals of hexagonal system. An intermediary phase that is less stable than calcite may be a phase that is between vaterite and calcite, a phase between precursor of vaterite and calcite, a phase between aragonite and calcite, and/or a phase between precursor of aragonite and calcite.

The compositions provided herein show unexpected properties, such as, high compressive strength, high durability, and less maintenance costs. In addition, in some embodiments, when the $CO_2$ is sequestered from flue gas or from carbonated brines into the calcium carbonate forms of the invention, it reduces carbon footprint and provides cleaner environment. In some embodiments, the compositions upon combination with water, setting, and hardening, have a compressive strength of at least 14 MPa (megapascal) or in some embodiments, between 14-80 MPa or 14-35 MPa. In some embodiments, the vaterite containing compositions provided herein are formed from $CO_2$ source that has a fossil fuel origin. Accordingly, in some embodiments, the compositions provided herein have a carbon isotopic fractionation value ($\delta^{13}C$) of less than −12‰. In some embodiments, the compositions of the invention are non-medical or are not for medical procedures. In some embodiments, the compositions of the invention are synthetic compositions and are not naturally occurring.

In some embodiments of the aspects and embodiments described herein, the cementitious compositions provided herein includes at least 10% w/w vaterite; or at least 20% w/w vaterite; or at least 30% w/w vaterite; or at least 40% w/w vaterite; or at least 50% w/w vaterite; or at least 60% w/w vaterite; or at least 70% w/w vaterite; or at least 80% w/w vaterite; or at least 90% w/w vaterite; or at least 95% w/w vaterite; or at least 99% w/w vaterite; or from 10% w/w to 99% w/w vaterite; or from 10% w/w to 95% w/w vaterite; or from 10% w/w to 90% w/w vaterite; or from 10% w/w to 80% w/w vaterite; or from 10% w/w to 70% w/w vaterite; or from 10% w/w to 60% w/w vaterite; or from 10% w/w to 50% w/w vaterite; or from 10% w/w to 40% w/w vaterite; or from 10% w/w to 30% w/w vaterite; or from 10% w/w to 20% w/w vaterite; or from 30% w/w to 99% w/w vaterite; or from 30% w/w to 95% w/w vaterite; or from 30% w/w to 90% w/w vaterite; or from 30% w/w to 80% w/w vaterite; or from 30% w/w to 70% w/w vaterite; or from 30% w/w to 60% w/w vaterite; or from 30% w/w to 50% w/w vaterite; or from 30% w/w to 40% w/w vaterite; or from 50% w/w to 99% w/w vaterite; or from 50% w/w to 95% w/w vaterite; or from 50% w/w to 90% w/w vaterite; or from 50% w/w to 80% w/w vaterite; or from 50% w/w to 70% w/w vaterite; or from 50% w/w to 60% w/w vaterite; or from 70% w/w to 99% w/w vaterite; or from 70% w/w to 95% w/w vaterite; or from 70% w/w to 90% w/w vaterite; or from 70% w/w to 80% w/w vaterite; or from 80% w/w to 99% w/w vaterite; or from 80% w/w to 95% w/w vaterite; or from 80% w/w to 90% w/w vaterite; or from 90% w/w to 99% w/w vaterite; or from 90% w/w to 95% w/w vaterite; or 10% w/w vaterite; or 20% w/w vaterite; or 30% w/w vaterite; or 40% w/w vaterite; or 50% w/w vaterite; or 60% w/w vaterite; or 70% w/w vaterite; or 75% w/w vaterite; or 80% w/w vaterite; or 85% w/w vaterite; or 90% w/w vaterite; or 95% w/w vaterite; or 99% w/w vaterite.

In some embodiments, there is provided a composition comprising a cementitious composition and a reinforcing material wherein the cementitious composition comprises a metastable component selected from the group consisting of vaterite, amorphous calcium carbonate, and combination thereof wherein the cementitious composition comprises at least 50 wt % (or w/w %) vaterite or between 50-99 wt % vaterite. In some embodiments, there is provided a composition comprising a cementitious composition and a reinforcing material wherein the cementitious composition comprises a metastable component selected from the group consisting of vaterite, amorphous calcium carbonate, and combination thereof, wherein the cementitious composition comprises at least 50 wt % (or w/w %) vaterite or between 50-99 wt % vaterite and wherein the cementitious composition has a $\delta^{13}C$ value less than −12.0‰ or between −12‰ to −40‰. In some embodiments, there is provided a composition comprising a cementitious composition and a reinforcing material wherein the cementitious composition comprises a metastable component selected from the group consisting of vaterite, amorphous calcium carbonate, and combination thereof, wherein the cementitious composition comprises at least 50 wt % (or w/w %) vaterite or between 50-99 wt % vaterite, wherein the cementitious composition a $\delta^{13}C$ value less than −12.0‰ or between −12‰ to −40‰, and wherein the cementitious composition has a wet paste pH of less than 12. In some embodiments, there is provided a composition comprising a cementitious composition and a reinforcing material wherein the cementitious composition comprises a metastable component selected from the group consisting of vaterite, amorphous calcium carbonate, and combination thereof, wherein the cementitious composition comprises at least 50 wt % (or w/w %) vaterite or between 50-99 wt % vaterite, and wherein the cementitious composition has a wet paste pH of less than 12.

In some embodiments of the aspects and the embodiments described herein and above, the cementitious composition includes at least 1% w/w amorphous calcium carbonate (ACC); or at least 2% w/w ACC; or at least 5% w/w ACC; or at least 10% w/w ACC; or at least 50% w/w ACC; or at least 80% w/w ACC; or at least 90% w/w ACC; or from 1% w/w to 90% w/w ACC; or from 1% w/w to 80% w/w ACC; or from 1% w/w to 70% w/w ACC; or from 1% w/w to 60% w/w ACC; or from 1% w/w to 50% w/w ACC; or from 1% w/w to 40% w/w ACC; or from 1% w/w to 30% w/w ACC; or from 1% w/w to 20% w/w ACC; or from 1% w/w to 10% w/w ACC; or from 5% w/w to 90% w/w ACC; or from 5% w/w to 80% w/w ACC; or from 5% w/w to 70% w/w ACC; or from 5% w/w to 60% w/w ACC; or from 5% w/w to 50% w/w ACC; or from 5% w/w to 40% w/w ACC; or from 5% w/w to 30% w/w ACC; or from 5% w/w to 20% w/w ACC; or from 5% w/w to 10% w/w ACC; or from 10% w/w to 90% w/w ACC; or from 10% w/w to 80% w/w ACC; or from 10% w/w to 70% w/w ACC; or from 10% w/w to 60% w/w ACC; or from 10% w/w to 50% w/w ACC; or from 10% w/w to 40% w/w ACC; or from 10% w/w to 30% w/w ACC; or from 10% w/w to 20% w/w ACC; or from 30% w/w to 90% w/w ACC; or from 30% w/w to 80% w/w ACC; or from 30% w/w to 70% w/w ACC; or from 30% w/w to 60% w/w ACC; or from 30% w/w to 50% w/w ACC; or from 30% w/w to 40% w/w ACC; or from 50% w/w to 90% w/w ACC; or from 50% w/w to 80% w/w ACC; or from 50% w/w to 70% w/w ACC; or from 50% w/w to 60% w/w ACC;

or from 70% w/w to 90% w/w ACC; or from 70% w/w to 80% w/w ACC; or from 70% w/w to 75% w/w ACC; or 1% w/w ACC; or 2% w/w ACC; or 5% w/w ACC; or 10% w/w ACC; or 20% w/w ACC; or 30% w/w ACC; or 40% w/w ACC; or 50% w/w ACC; or 60% w/w ACC; or 70% w/w ACC; or 80% w/w ACC; or 90% w/w ACC.

In some embodiments of the aspects and the embodiments described herein, the cementitious composition includes the vaterite in a range of 10% w/w to 99% w/w and the ACC in a range of 1% w/w to 90% w/w; or the vaterite is in a range of 10% w/w to 90% w/w and the ACC is in a range of 10% w/w to 90% w/w; or the vaterite is in a range of 10% w/w to 80% w/w and the ACC is in a range of 20% w/w to 90% w/w; or the vaterite is in a range of 10% w/w to 70% w/w and the ACC is in a range of 30% w/w to 90% w/w; or the vaterite is in a range of 10% w/w to 60% w/w and the ACC is in a range of 40% w/w to 90% w/w; or the vaterite is in a range of 10% w/w to 50% w/w and the ACC is in a range of 50% w/w to 90% w/w; or the vaterite is in a range of 10% w/w to 40% w/w and the ACC is in a range of 60% w/w to 90% w/w; or the vaterite is in a range of 10% w/w to 30% w/w and the ACC is in a range of 70% w/w to 90% w/w; or the vaterite is in a range of 10% w/w to 20% w/w and the ACC is in a range of 80% w/w to 90% w/w. It is to be understood that the percentage of each of the components in the composition will be in such a way that the total percentage of the components in the composition may not exceed a total of 100% by wt.

In some embodiments of the aspects and the embodiments described herein, the compositions of the invention after setting, and hardening have a compressive strength of at least 14 MPa; or at least 16 MPa; or at least 18 MPa; or at least 20 MPa; or at least 25 MPa; or at least 30 MPa; or at least 35 MPa; or at least 40 MPa; or at least 50 MPa; or at least 60 MPa; or at least 70 MPa; or at least 80 MPa; or at least 90 MPa; or at least 100 MPa; or from 14-100 MPa; or from 14-80 MPa; or from 14-75 MPa; or from 14-70 MPa; or from 14-65 MPa; or from 14-60 MPa; or from 14-55 MPa; or from 14-50 MPa; or from 14-45 MPa; or from 14-40 MPa; or from 14-35 MPa; or from 14-30 MPa; or from 14-25 MPa; or from 14-20 MPa; or from 14-18 MPa; or from 14-16 MPa; or from 20-100 MPa; or from 20-90 MPa; or from 20-80 MPa; or from 20-75 MPa; or from 20-70 MPa; or from 20-65 MPa; or from 20-60 MPa; or from 20-55 MPa; or from 20-50 MPa; or from 20-45 MPa; or from 20-40 MPa; or from 20-35 MPa; or from 20-30 MPa; or from 20-25 MPa; or from 30-100 MPa; or from 30-75 MPa; or from 30-50 MPa; or from 50-100 MPa; or from 50-75 MPa; or from 60-90 MPa; or from 70-100 MPa; or from 80-90 MPa; or 14 MPa; or 16 MPa; or 18 MPa; or 20 MPa; or 25 MPa; or 30 MPa; or 35 MPa; or 40 MPa; or 45 MPa. For example, in some embodiments of the foregoing aspects and the foregoing embodiments, the composition after setting, and hardening has a compressive strength of 14 MPa to 40 MPa; or 17 MPa to 40 MPa; or 20 MPa to 40 MPa; or 30 MPa to 40 MPa; or 35 MPa to 40 MPa. In some embodiments, the compressive strengths described herein are the compressive strengths after 1 day, or 3 days, or 7 days, or 28 days, or 56 days, or longer. For example, in some embodiments, the cementitious composition or the composition containing the cementitious composition of the invention and the reinforcing material, after setting, and hardening have a compressive strength between 14-55 MPa after 1 day. In some embodiments, the cementitious composition or the composition containing the cementitious composition of the invention and the reinforcing material, after setting, and hardening have a compressive strength between 14-55 MPa after 7 days. In some embodiments, the cementitious composition or the composition containing the cementitious composition of the invention and the reinforcing material, after setting, and hardening have a compressive strength between 14-55 MPa after 28 days.

In some embodiments of the aspects and the embodiments, the cementitious composition has a $\delta^{13}C$ of less than −12‰; or less than −13‰; or less than −14‰; or less than −15‰; or less than −16‰; or less than −17‰; or less than −18‰; or less than −19‰; or less than −20‰; or less than −21‰; or less than −22‰; or less than −25‰; or less than −30‰; or less than −40‰; or less than −50‰; or less than −60‰; or less than −70‰; or less than −80‰; or less than −90‰; or less than −100‰; or from −12‰ to −80‰; or from −12‰ to −70‰; or from −12‰ to −60‰; or from −12‰ to −50‰; or from −12‰ to −45‰; or from −12‰ to −40‰; or from −12‰ to −35‰; or from −12‰ to −30‰; or from −12‰ to −25‰; or from −12‰ to −20‰; or from −12‰ to −15‰; or from −13‰ to −80‰; or from −13‰ to −70‰; or from −13‰ to −60‰; or from −13‰ to −50‰; or from −13‰ to −45‰; or from −13‰ to −40‰; or from −13‰ to −35‰; or from −13‰ to −30‰; or from −13‰ to −25‰; or from −13‰ to −20‰; or from −13‰ to −15‰; from −14‰ to −80‰; or from −14‰ to −70‰; or from −14‰ to −60‰; or from −14‰ to −50‰; or from −14‰ to −45‰; or from −14‰ to −40‰; or from −14‰ to −35‰; or from −14‰ to −30‰; or from −14‰ to −25‰; or from −14‰ to −20‰; or from −14‰ to −15‰; or from −15‰ to −80‰; or from −15‰ to −70‰; or from −15‰ to −60‰; or from −15‰ to −50‰; or from −15‰ to −45‰; or from −15‰ to −40‰; or from −15‰ to −35‰; or from −15‰ to −30‰; or from −15‰ to −25‰; or from −15‰ to −20‰; or from −16‰ to −80‰; or from −16‰ to −70‰; or from −16‰ to −60‰; or from −16‰ to −50‰; or from −16‰ to −45‰; or from −16‰ to −40‰; or from −16‰ to −35‰; or from −16‰ to −30‰; or from −16‰ to −25‰; or from −16‰ to −20‰; or from −20‰ to −80‰; or from −20‰ to −70‰; or from −20‰ to −60‰; or from −20‰ to −50‰; or from −20‰ to −40‰; or from −20‰ to −35‰; or from −20‰ to −30‰; or from −20‰ to −25‰; or from −30‰ to −80‰; or from −30‰ to −70‰; or from −30‰ to −60‰; or from −30‰ to −50‰; or from −30‰ to −40‰; or from −40‰ to −80‰; or from −40‰ to −70‰; or from −40‰ to −60‰; or from −40‰ to −50‰; or from −50‰ to −80‰; or from −50‰ to −70‰; or from −50‰ to −60‰; or from −60‰ to −80‰; or from −60‰ to −70‰; or from −70‰ to −80‰; or −12‰; or −13‰; or −14‰; or −15‰; or −16‰; or −17‰; or −18‰; or −19‰; or −20‰; or −21‰; or −22‰; or −25‰; or −30‰; or −40‰; or −50‰; or −60‰; or −70‰; or −80‰; or −90‰; or −100‰.

In some embodiments, there is provided a composition comprising a cementitious composition and a reinforcing material wherein the cementitious composition comprises a metastable component selected from the group consisting of vaterite, amorphous calcium carbonate, and combination thereof and wherein the composition after combination with water, setting, and hardening has a compressive strength of at least 14 MPa or between 14-55 MPa.

In some embodiments, there is provided a composition comprising a cementitious composition and a reinforcing material wherein the cementitious composition comprises a metastable component selected from the group consisting of vaterite, amorphous calcium carbonate, and combination thereof wherein the cementitious composition comprises at least 50 wt % (or w/w %) vaterite or between 50-99 wt % vaterite and wherein the composition after combination with water, setting, and hardening has a compressive strength of at least 14 MPa or between 14-55 MPa.

In some embodiments, there is provided a composition comprising a cementitious composition and a reinforcing material wherein the cementitious composition comprises a metastable component selected from the group consisting of vaterite, amorphous calcium carbonate, and combination thereof, wherein the cementitious composition comprises at least 50 wt % (or w/w %) vaterite or between 50-99 wt % vaterite, wherein the cementitious composition has a $\delta^{13}C$ value less than −12.0‰ or between −12‰ to −40‰, and wherein the composition after combination with water, setting, and hardening has a compressive strength of at least 14 MPa or between 14-55 MPa.

In some embodiments, there is provided a composition comprising a cementitious composition and a reinforcing material wherein the cementitious composition comprises a metastable component selected from the group consisting of vaterite, amorphous calcium carbonate, and combination thereof, wherein the cementitious composition has a $\delta^{13}C$ value less than −12.0‰ or between −12‰ to −40‰, and wherein the composition after combination with water, setting, and hardening has a compressive strength of at least 14 MPa or between 14-55 MPa.

In some embodiments, there is provided a composition comprising a cementitious composition and a reinforcing material wherein the cementitious composition comprises a metastable component selected from the group consisting of vaterite, amorphous calcium carbonate, and combination thereof, wherein the cementitious composition comprises at least 50 wt % (or w/w %) vaterite or between 50-99 wt % vaterite, wherein the cementitious composition a $\delta^{13}C$ value less than −12.0‰ or between −12‰ to −40‰, wherein the cementitious composition has a wet paste pH of less than 12, and wherein the composition after combination with water, setting, and hardening has a compressive strength of at least 14 MPa or between 14-55 MPa.

In some embodiments, there is provided a composition comprising a cementitious composition and a reinforcing material wherein the cementitious composition comprises a metastable component selected from the group consisting of vaterite, amorphous calcium carbonate, and combination thereof, wherein the cementitious composition a $\delta^{13}C$ value less than −12.0‰ or between −12‰ to −40‰, wherein the cementitious composition has a wet paste pH of less than 12, and wherein the composition after combination with water, setting, and hardening has a compressive strength of at least 14 MPa or between 14-55 MPa.

In some embodiments, there is provided a composition comprising a cementitious composition and a reinforcing material wherein the cementitious composition comprises a metastable component selected from the group consisting of vaterite, amorphous calcium carbonate, and combination thereof, and wherein the cementitious composition comprises at least one of the following:

a) at least 50 wt % (or w/w %) vaterite or between 50-99 wt % vaterite;

b) a $\delta^{13}C$ value less than −12.0‰ or between −12‰ to −40‰;

c) a wet paste pH of less than 12; and d) the composition after combination with water, setting, and hardening has a compressive strength of at least 14 MPa or between 14-55 MPa.

In some embodiments, the cementitious composition of the invention is at least one of the composition shown in Table II below.

TABLE II

| Cementitious composition | Metastable component | a) | b) | c) | d) |
|---|---|---|---|---|---|
| 1 | x | x | | | |
| 2 | x | | x | | |
| 3 | x | | | x | |
| 4 | x | | | | x |
| 5 | x | x | x | | |
| 6 | x | x | | x | |
| 7 | x | x | | | x |
| 8 | x | x | x | x | |
| 9 | x | x | x | x | x |
| 10 | x | | x | x | |
| 11 | x | | x | | x |
| 12 | x | | x | x | x |
| 13 | x | | | x | x |
| 14 | x | x | | x | x |
| 15 | x | x | x | | x |

In some embodiments, the cementitious composition provided herein is a particulate composition with an average particle size of 0.1-100 microns. The average particle size may be determined using any conventional particle size determination method, such as, but is not limited to, multi-detector laser scattering or sieving (i.e. <38 microns). In certain embodiments, unimodel or multimodal, e.g., bimodal or other, distributions are present. Bimodal distributions allow the surface area to be minimized, thus allowing a lower liquids/solids mass ratio for the cement yet providing smaller reactive particles for early reaction. In such instances, the average particle size of the larger size class can be upwards of 1000 microns (1 mm). In some embodiments, the cementitious composition provided herein is a particulate composition with an average particle size of 0.1-1000 microns; or 0.1-500 microns; or 0.1-200 microns; or 0.1-100 microns; or 0.1-80 microns; or 0.1-50 microns; or 0.1-40 microns; or 0.1-30 microns; or 0.1-20 microns; or 0.1-10 microns; or 0.1-5 microns; or 0.5-100 microns; or 0.5-70 microns; or 0.5-50 microns; or 0.5-10 microns; or 0.5-5 microns; or 1-100 microns; or 1-70 microns; or 1-50 microns; or 1-10 microns; or 1-5 microns; or 3-100 microns; or 3-50 microns; or 3-10 microns; or 3-8 microns; or 5-100 microns; or 5-50 microns; or 5-10 microns; or 5-8 microns; or 8-100 microns; or 8-50 microns; or 8-30 microns; or 8-20 microns; or 8-10 microns; or 10-100 microns; or 10-50 microns; or 10-30 microns; or 20-100 microns; or 20-50 microns; or 20-40 microns; or 40-100 microns; or 40-50 microns; or 50-100 microns; or 50-70 microns; or 60-100 microns; or 60-70 microns; or 70-100 microns; or 80-100 microns; or 0.1 microns; or 0.5 microns; or 1 microns; or 2 microns; or 3 microns; or 4 microns; or 5 microns; or 8 microns; or 10 microns; or 15 microns; or 20 microns; or 30 microns; or 40 microns; or 50 microns; or 60 microns; or 70 microns; or 80 microns; or 100 microns. For example, in some embodiments, the composition provided herein is a particulate composition with an average particle size of 0.1-30 micron; 0.1-20 micron; or 0.1-15 micron; or 0.1-10 micron; or 0.1-8 micron; or 0.1-5 micron; or 1-5 micron; or 5-10 micron.

In certain embodiments, the composition provided herein may further include an aggregate. Aggregate may be included in the composition to provide for mortars which include fine aggregate and concretes which also include coarse aggregate. The fine aggregates are materials that almost entirely pass through a Number 4 sieve (ASTM C 125 and ASTM C 33), such as silica sand. The coarse aggregate are materials that are predominantly retained on a Number 4 sieve (ASTM C 125 and ASTM C 33), such as silica, quartz, crushed round marble, glass spheres, granite, limestone, calcite, feldspar, alluvial sands, sands or any other durable aggregate, and mixtures thereof. As such, the term "aggregate" is used broadly to refer to a number of different types of both coarse and fine particulate material, including, but are not limited to, sand, gravel, crushed stone, slag, and recycled concrete. The amount and nature of the aggregate may vary widely. In some embodiments, the amount of aggregate may range from 25 to 80%, such as 40 to 70% and including 50 to 70% w/w of the total composition made up of both the composition and the aggregate.

In some embodiments, the compositions provided herein include 5-99.9 wt % or 5-99 wt % or 5-90 wt % or 5-75 wt % or 5-50 wt % or 5-25 wt % of the cementitious composition and 0.1-95 wt % or 1-95 wt % or 5-75 wt % or 5-50 wt % or 5-25 wt % of the reinforced material. In some embodiments, the compositions provided herein include 5-99.9 wt % or 5-90 wt % or 5-75 wt % or 5-50 wt % or 5-25 wt % of the cementitious composition, 5-90 wt % or 5-75 wt % or 5-50 wt % or 5-25 wt % of sand, and 0.1-10 wt % of the reinforced material. In some embodiments, the compositions provided herein include 5-99.9 wt % or 5-90 wt % or 5-75 wt % or 5-50 wt % or 5-25 wt % of the cementitious composition, 5-90 wt % or 5-75 wt % or 5-50 wt % or 5-25 wt % of aggregate, and 0.1-10 wt % of the reinforced material. In some embodiments, the compositions provided herein include 5-99.9 wt % or 5-90 wt % or 5-75 wt % or 5-50 wt % or 5-25 wt % of the cementitious composition; 5-90 wt % or 5-75 wt % or 5-50 wt % or 5-25 wt % of sand; 5-90 wt % or 5-75 wt % or 5-50 wt % or 5-25 wt % of aggregate; and 0.1-10 wt % of the reinforced material.

In some embodiments, the compositions provided herein include up to 99.9 vol %, or between 5-99.9 vol %, or between 5-99.5 vol %, or between 5-99 vol %, or between 5-98 vol %, or between 5-95 vol %, or between 5-80 vol %, or between 5-75 vol %, or between 5-50 vol %, of the cementitious composition and up to 5 vol %, or between 0.1-5 vol %, or between 0.5-5 vol %, or between 1-5 vol %, or between 1.5-5 vol %, or between 0.1-0.5 vol %, or between 0.1-1 vol %, of the reinforced material. The remaining percentages in the compositions may be sand or aggregates.

It is to be understood that all the wt % s or vol % s in the compositions do not exceed 100 wt % or vol % of the total composition.

In some embodiments, the cementitious composition of the invention may further include Ordinary Portland Cement (OPC) or Portland cement clinker. The amount of Portland cement component may vary and range from 10 to 95% w/w; or 10 to 90% w/w; or 10 to 80% w/w; or 10 to 70% w/w; or 10 to 60% w/w; or 10 to 50% w/w; or 10 to 40% w/w; or 10 to 30% w/w; or 10 to 20% w/w; or 20 to 90% w/w; or 20 to 80% w/w; or 20 to 70% w/w; or 20 to 60% w/w; or 20 to 50% w/w; or 20 to 40% w/w; or 20 to 30% w/w; or 30 to 90% w/w; or 30 to 80% w/w; or 30 to 70% w/w; or 30 to 60% w/w; or 30 to 50% w/w; or 30 to 40% w/w; or 40 to 90% w/w; or 40 to 80% w/w; or 40 to 70% w/w; or 40 to 60% w/w; or 40 to 50% w/w; or 50 to 90% w/w; or 50 to 80% w/w; or 50 to 70% w/w; or 50 to 60% w/w; or 60 to 90% w/w; or 60 to 80% w/w; or 60 to 70% w/w; or 70 to 90% w/w; or 70 to 80% w/w. For example, the composition may include a blend of 75% OPC and 25% composition of the invention; or 80% OPC and 20% composition of the invention; or 85% OPC and 15% composition of the invention; or 90% OPC and 10% composition of the invention; or 95% OPC and 5% composition of the invention.

The cementitious composition of the invention may be derived from, e.g., precipitated from, absorbing solution and/or water. As the $CO_2$ sequestering products are precipitated from water, they may include one or more additives that are present in the water from which they are derived. For example, where the water is salt water, the cementitious composition may include one or more compounds found in the salt water source. These compounds may be used to identify the solid precipitations of the compositions that come from the salt water source, where these identifying components and the amounts thereof are collectively referred to herein as a saltwater source identifier. For example, if the saltwater source is sea water, identifying compounds that may be present in the precipitated solids of the compositions include, but are not limited to: chloride, sodium, sulfur, potassium, bromide, silicon, strontium and the like. Any such source-identifying or "marker" elements would generally be present in small amounts, e.g., in amounts of 20,000 ppm or less, such as amounts of 2000 ppm or less. In certain embodiments, the "marker" compound is strontium, which may be present in the precipitated incorporated into the aragonite lattice, and make up 10,000 ppm or less, ranging in certain embodiments from 3 to 10,000 ppm, such as from 5 to 5000 ppm, including 5 to 1000 ppm, e.g., 5 to 500 ppm, including 5 to 100 ppm. Another "marker" compound of interest is magnesium, which may be present in amounts of up to 20% mole substitution for calcium in carbonate compounds. The saltwater source identifier of the compositions may vary depending on the particular saltwater source employed to produce the saltwater-derived carbonate composition. Also of interest are isotopic markers that identify the water source.

The cementitious composition of the invention may be viewed as low-carbon footprint compositions. Low-carbon footprint compositions have a reduced carbon footprint as compared to corresponding compositions that lack the $CO_2$ sequestering (where "corresponding" herein means the identical composition but for the presence of the $CO_2$ sequestering as in the cementitious composition of the invention). Using any convenient carbon footprint calculator, the magnitude of carbon footprint reduction of the compositions of the invention as compared to corresponding compositions that lack the $CO_2$ sequestering may be 5% or more, such as 10% or more, including 25%, 50%, 75% or even 100% or more. In certain embodiments, the low-carbon footprint cementitious compositions of the invention are carbon neutral, in that they have substantially no, if any, calculated carbon footprint, e.g., as determined using any convenient carbon footprint calculator that is relevant for a particular composition of interest. Carbon neutral compositions of the invention include those compositions that exhibit a carbon footprint of 50 lbs $CO_2$/cu yd material or less, such as 10 lbs $CO_2$/cu yd material or less, including 5 lbs $CO_2$/cu yd material or less, where in certain embodiments the carbon neutral compositions have 0 or negative lbs $CO_2$/cu yd material, such as negative 1 or more, e.g., negative 3 or more lbs $CO_2$/cu yd material. In some instances, the low carbon footprint compositions have a significantly negative carbon footprint, e.g., −100 or more lbs $CO_2$/cu yd or less.

Reinforcing Material

The reinforced material may be added to the cementitious compositions of the invention, as described herein, to strengthen the cement and/or concrete in one or more properties, including, but not limited to, durability, strength, serviceability, tensile strength, flexural and axial strength, impact properties, resistance to cracking, resistance to bursting stress, and/or shear and torsion. The reinforced material may be in a shape of bars or rebars, wire, threads, grids, plates, fibers, metal meshes, cages, and/or whiskers etc. The reinforced material may be any material known in the art including, but not limited to, organic, inorganic, metallic, composite, synthetic, or naturally occurring. In some embodiments, the reinforced material may be hydrophilic or hydrophobic. In some embodiments, the reinforced material includes, but is not limited to, steel, aluminum, glass fiber, carbon fiber, ceramics, polymeric fiber, grass, grass product, wood product, and combination thereof. In some embodiments, the reinforced material includes aluminum. In some embodiments, the reinforced material can withstand the low pH, such as, lower than 12, of the cementitious compositions of the invention in dry or wet paste form. In some embodiments, the reinforced material can withstand the chloride content of the cementitious compositions of the invention. In some embodiments, the addition of reinforced material may increase the strength in the tensile, flexural, and impact properties of the cement and/or concrete. In some embodiments, the failure strain of concrete in tension is so low that the reinforcement holds the cracked sections together. For a strong, ductile and durable construction, the reinforced material as used in the compositions and methods of the invention, may have one or more of properties, such as, but not limited to, high compressive strength, high flexural strength, high tensile strength, high fracture/impact toughness, sufficiently good bond to the cement or concrete, thermal compatibility, acid/abrasion resistance, and durability in the cement or concrete environment. In some embodiments, the reinforcing material in the compositions of the invention, may be able to perform suitably for use in a structural building application when used in combination with such cement that may have water soluble chloride, may have a wet paste pH value of less than 12.0, or may have both water-soluble chloride and a wet paste pH of less than 12.0.

In some embodiments, the reinforced material is a composite material. Composite materials are materials that may be composed of two or more distinct materials that remain distinct at length scales ranging from microns to greater than a meter. In some embodiments, the composite materials are composed of a matrix and at least one other material, a secondary material. In some embodiments, the reinforcing material may be used as the secondary material, as opposed to the matrix material, and may be a more ductile material if the matrix is brittle. The secondary material may be filler or reinforced material. The filler may be a material that confers volume but may not detract from other physical, mechanical, or chemical characteristics.

Reinforcing materials may be used to improve properties of the cement and/or concrete such as fracture toughness, ultimate tensile strength, compressive strength, shear strength, fatigue performance, and torsion performance. Examples of composite materials include, but are not limited to: concrete, fiber reinforced polymers, cermets (ceramic matrix materials with metal reinforcement), mud bricks reinforced with straw, latex coatings with metal oxide particles, and bone (collagen and calcium phosphate mineral).

In some embodiments, the reinforced material is a reinforcing bar such as steel reinforcing bar. The high pH environment of Portland cement, may facilitate the passivation of steel, lowering the probability for corrosion of the rebar. In order for rebar to perform suitably in cement that may have water soluble chloride, may have a wet paste pH value of less than 12.0, or may have both water-soluble chloride and a wet paste pH of less than 12.0, the rebar may be coated or surface treated, such as with a cladding. In some embodiments, the composition of the invention includes a cementitious composition that may have water soluble chloride, may have a wet paste pH value of less than 12.0, or may have both water-soluble chloride and a wet paste pH of less than 12.0 and the rebar that may include, but not limited to, aluminum, glass fiber, carbon fiber, ceramics, stainless steel cladding treated rebar, galvanized rebar, epoxy coated rebar, titanium cladding treated rebar, chrome plated/coated rebar, nickel plated/coated rebar, cobalt-chromium coated rebar, or any combination thereof.

In some embodiments, the reinforced material is a polymer, such as, but not limited to, fiber-reinforced plastic. In some embodiments, the reinforced material is PVC from electrochemical processes by-products. The poly(vinyl chloride), PVC, is a polymer that may be versatile in terms of the types of structures that may be formed from it. It is a ductile and tough material. PVC may be produced from the products of electrochemical processes, as described in detail herein below and in commonly assigned patent application Ser. No. 12/541,055, filed Aug. 13, 2009, which is incorporated herein by reference in its entirety. In some embodiments, the reinforcing material includes, but not limited to, grass, grass product, wood product, or any combination thereof. In some embodiments, the reinforcing material includes bamboo.

In some embodiments, the reinforced material is a polycarbonate with sequestered $CO_2$. The polycarbonate may be an impact resistant material and may also be made in part by using an electrochemical process as described in detail herein below and in commonly assigned patent application Ser. No. 12/541,055, filed Aug. 13, 2009.

In some embodiments, the reinforced material is polyvinyl alcohol or hybrid polyvinyl alcohol. In some embodiments, the reinforced material is cellulose. In some embodiments, the reinforced material is fiber glass. In some embodiments, the reinforced material is polypropylene. In some embodiments, the polyvinyl alcohol, hybrid polyvinyl alcohol, the cellulose, or the polypropylene are in the form of fibers or are in the form of bars. In some embodiments, the reinforced material is polycarbonate reinforcing members, polycarbonate fiber, poly(vinyl chloride) (PVC) reinforcing members, PVC fiber, polypropylene, cellulose, polyvinyl alcohol, or any combination thereof.

Such reinforced materials are readily available commercially.

Examples of other reinforced materials include other polymers including, but not limited to: monomers of condensation polymers, olefins, acrylates, vinyl chloride, vinyl alcohol, cellulose (corn fiber), ethylene, styrene, propylene, methyl methacrylate, or any combination thereof. The polymers may be made in whole or in part by using electrochemical methods described in detail herein below and in commonly assigned patent application Ser. No. 12/541,055, filed Aug. 13, 2009.

In some embodiments, the composition comprising the cementitious composition and the reinforcing material is a concrete composition. The use of concrete is regulated by various municipalities and organizations. Among the more recognized organizations that publish tests for strength and durability of concrete are the ACI (American Concrete Institute) and ASTM (American Society for Testing and Materials) International. The quality and testing of materials used in construction may be encompassed by referral to the appropriate ASTM standard specifications. In addition to the Code, a good resource for information regarding currently accepted polymer reinforcement as of 2007 would be ACI-440R-07, which is ACI Committee 440's "Report on Fiber-Reinforced Polymer 9FRP) Reinforcement for Concrete Structures." Also useful, is AC1-201.2R-01, "Guide to Durable Concrete," reported by ACI Committee 201 and ACI-222R-01, "Protection of Metals in Concrete Against Corrosion," reported by ACI Committee 222. ASTM tests of interest include: ASTM A615, ASTM A706, ASTM A955, ASTM A996, ASTM A496, ASTM A185, ASTM A497, ASTM A767, ASTM A884, ASTM A1022, ASTM A82, ASTM D3916, ASTM A944.

In some embodiments, the composition of the invention is such that the reinforcing material does not pull away from the cement when exposed to the conditions outlined in ASTM A944. In some embodiments, the composition of the invention is such that the reinforcing material has a longitudinal tensile strength and modulus that conforms to ASTM D3916. In some embodiments, the composition of the invention is such that the reinforcing material has a yield strength that conforms to any of ASTM A615, ASTM A706, ASTM A955, ASTM A996, ASTM A496, ASTM A185, ASTM A497, ASTM A767, ASTM A884, ASTM A1022, and ASTM A82. In some embodiments, the composition of the invention is a prestressed concrete element (part) or body in which the extreme fiber stress in the composition does not exceed 0.60 of the specified compressive strength of concrete in pounds per square inch (psi), and/or the extreme fiber stress in compression at ends of simply supported members does not exceed 0.70 of the specified compressive strength of concrete in pounds per square inch (psi). In some embodiments, the composition of the invention is a prestressed concrete element (part) or body in which the extreme fiber stress in compression due to prestress plus sustained load does not exceed 0.45 of the specified compressive strength of concrete in pounds per square inch (psi), or wherein the extreme fiber stress in compression due to prestress plus total load does not exceed 0.60 of the specified compressive strength of concrete in pounds per square inch (psi).

In some embodiments, the flexural strength of the composition containing the cementitious composition of the invention and the reinforcing material is between 5-40% or between 5-35% or between 5-30%, or between 5-25%, or between 5-10% of the compressive strength of the cement or the concrete formed from it.

In some embodiments, the length of the reinforcing material, such as, wire, threads, fibers, and/or whiskers is between 3-60 mm, or between 3-55 mm, or between 3-50 mm, or between 3-40 mm, or between 3-30 mm, or between 3-20 mm, or between 3-10 mm, in the compositions of the invention. In some embodiments, the length of the reinforcing material is a hybrid of various lengths of the material, such as the combination of two different lengths, e.g. 30 mm fiber with 20 mm fiber or the combination of three different lengths, e.g. 30 mm fiber with 20 mm fiber and 8 mm fiber.

In some embodiments, the thickness of the reinforcing material is between 30-300 µm, or between 30-250 µm, or between 30-200 µm, or between 30-150 µm, or between 30-100 µm, or between 30-50 µm, or between 50-300 µm, or between 50-200 µm, or between 50-100 µm, or between 100-300 µm, or between 100-200 µm, or between 200-300 µm, in the compositions of the invention. In some embodiments, the thickness of the reinforcing material is a hybrid of various thicknesses of the material, such as the combination of two different thicknesses, e.g. 30 µm fiber with 200 µm fiber or the combination of three different thicknesses, e.g. 30 µm fiber with 100 µm fiber and 300 µm fiber.

In some embodiments, the amount of the reinforcing material present in the composition of the invention is greater than 0.1%; or greater than 0.5%; or greater than 1% w/w; or greater than 5% w/w; or greater than 10% w/w; or greater than 20% w/w; or between 0.1-50% w/w; or between 0.1-25% w/w; or between 0.1-10% w/w; or between 0.1-5% w/w; or between 0.1-2% w/w; or between 0.1-1% w/w; or between 0.1-0.5% w/w; or between 1-50% w/w; or between 1-25% w/w; or between 1-10% w/w; or between 1-5% w/w; or between 1-2% w/w; or 0.5%; or 1%. Accordingly, there is provided a composition comprising a cementitious composition wherein the cementitious composition comprises a metastable component selected from the group consisting of vaterite, amorphous calcium carbonate, and combination thereof, and 0.1-5% w/w reinforcing material.

In some embodiments, at least 1% by volume; or at least 5% by volume; or at least 10% by volume; or at least 15% by volume; or at least 20% by volume; or at least 25% by volume; or between 1-50% by volume; or between 1-25% by volume, of the reinforcing material is aligned in the same direction in the compositions provided herein. In some embodiments, the aligned reinforcing material is held in compression to yield a pre-stressed concrete element (part) or body. In some embodiments, the extreme fiber stress in the composition does not exceed 0.60 of the specified compressive strength of concrete in pounds per square inch (psi), or the extreme fiber stress in compression at ends of simply supported members does not exceed 0.70 of the specified compressive strength of concrete in pounds per square inch (psi). In some embodiments, the extreme fiber stress in compression due to prestress plus sustained load does not exceed 0.45 of the specified compressive strength of concrete in pounds per square inch (psi), or wherein the extreme fiber stress in compression due to prestress plus total load does not exceed 0.60 of the specified compressive strength of concrete in pounds per square inch (psi).

In some embodiments, the reinforcing material has a yield strength of at least 420 MPa; or at least 500 MPa; or at least 1000 MPa; or between 420-500 MPa; or between 420-1000 MPa.

In some embodiments, the reinforcing material has an elastic modulus of 25 GPa to 250 GPa; or between 25-200 GPa; or between 25-100 GPa; or between 25-50 GPa; or between 100-250 GPa.

Methods of making and using the reinforcing materials of the invention are encompassed by the methods of the invention. There are various types of commercially available reinforcing materials, where each may have methods of fabrication and use.

B. Methods

Provided herein is a method for forming a cement or concrete composition, by combining the cementitious composition of the invention wherein the cementitious composition comprises a metastable component selected from the group consisting of vaterite, amorphous calcium carbonate, and combination thereof, with the reinforcing material, and forming the cement or concrete composition. Some examples of the methods to prepare the cementitious composition and the reinforcing material are described herein. The reinforcing material may also be obtained commercially.

Making the Reinforcing Material

Rebar

Rebar may be made with a cladding, coating, or be otherwise treated. In some embodiments, a reinforcing material is made by applying a cladding to conventional rebar. In some embodiments, the compositions of the invention are made by combining the cementitious composition of the invention with the reinforcing material, in which the reinforcing material is made by applying a cladding to conventional rebar, to obtain the cement or the concrete composition suitable for use in structural building applications. In some embodiments, the reinforcing material is made by applying a plating or coating to conventional rebar. In some embodiments, the compositions of the invention are made by combining the cementitious composition of the invention with the reinforcing material, in which the reinforcing material is made by applying a plating of coating to conventional rebar, to obtain the cement or the concrete composition suitable for use in structural building applications. In some embodiments, the cementitious composition of the invention is combined with the reinforcing material, in which the reinforcing material is stainless steel cladding treated rebar, galvanized rebar, stainless steel rebar, epoxy-coated rebar, titanium cladding treated rebar, chrome plated/coated rebar, nickel plated/coated rebar, cobalt-chromium coated rebar, or any combination thereof, to obtain the cement or the concrete composition suitable for use in structural building applications.

Metal Meshes, Cages, Fibers, Whiskers

In some embodiments, the reinforcing material of the invention may be formed in shapes other than rods, such as, but not limited to, mesh, cage, fibers, whiskers, or any combination thereof. In some embodiments, the reinforcing material is made from steel with a suitable cladding, coating or other surface treatment that is formed into a mesh, cage, fibers, whiskers, or any combination thereof. In some embodiments, the reinforcing material is made from fiber reinforced polymer material that is formed into a mesh, cage, fibers, whiskers, or any combination thereof. In some embodiments, the reinforcing material is made from a polymer that is formed into a mesh, cage, fibers, whiskers, or any combination thereof. In some embodiments, the reinforcing material is made from a metal, such as, but not limited to, aluminum, that is formed into a mesh, cage, fibers, whiskers, or any combination thereof. In some embodiments, the reinforcing material is made from a grass, a grass product, a wood product, or any combination thereof that is formed into a mesh, cage, fibers, whiskers, or any combination thereof. In some embodiments, the reinforcing material is made from bamboo that is formed into a mesh, cage, fibers, whiskers, or any combination thereof. In some embodiments of the invention, the composition is made by combining the cementitious composition of the invention with a reinforcing material, wherein the reinforcing material is formed into a mesh, cage, fibers, whiskers, or any combination thereof, to obtain the cement or the concrete composition. In some embodiments of the invention, the composition is made by combining the cementitious composition of the invention with the reinforcing material, wherein the reinforcing material is made from steel with suitable cladding, coating, or other surface treatment and is formed into a mesh, cage, fibers, whiskers, or any combination thereof, to obtain the cement or the concrete composition. In some embodiments of the invention, a composition is made by combining the cementitious composition of the invention with a reinforcing material, wherein the reinforcing material is made from a metal, a polymer, a fiber reinforced polymer, a grass, a grass product, a wood product, or any combination thereof, and is formed into a mesh, cage, fibers, whiskers, or any combination thereof, to obtain the cement or the concrete composition. In some embodiments of the invention, the composition is made by combining the cementitious composition of the invention with the reinforcing material, wherein the reinforcing material is made from bamboo and is formed into a mesh, cage, fibers, whiskers, or any combination thereof, to obtain the cement or the concrete composition. In some embodiments, the composition described above, are suitable for use in structural building applications.

Polymers

In some embodiments, the reinforcing material of the invention may be made from polymers. In some embodiments, the polymer reinforcing material of the invention includes, but not limited to, fiber reinforced plastic, epoxy coated rebar, polycarbonate reinforcing members, polycarbonate fiber, poly(vinyl chloride) (PVC) reinforcing members, PVC fiber, polypropylene, cellulose, polyvinyl alcohol, or any combination thereof. In some embodiments, the polymer reinforcing material is formed by molding, casting, extrusion, spinning, or any combination thereof PVC from By-Products of Electrochemical Processes In some embodiments, the reinforcing material is a polymer, such as, poly(vinyl chloride) (PVC). In some embodiments, PVC is made from by products of an electrochemical process. In some embodiments, the electrochemical process that is used to make PVC is also used to make the alkaline solution or hydroxide species which is then used in making the cementitious composition of the invention, described further. In some embodiments, in the electrochemical process, while the hydroxide species or alkaline solution are withdrawn for use to make the cement, the by-products of the electrochemical system are withdrawn and used to produce vinyl chloride monomer, and subsequently a polymer reinforcing material that includes the vinyl chloride monomer.

Polycarbonate with Sequestered $CO_2$

In some embodiments, the reinforcing material includes a polycarbonate material that includes sequestered carbon dioxide. In some embodiments, the invention further includes method of making the reinforcing material that includes making the polycarbonate material from sequestered carbon dioxide using methods of making polycarbonates known in the art. In some embodiments, making the reinforcing material encompasses shaping the polycarbonates into rebar, mesh, fiber, cage, whiskers, or any combination thereof. In some embodiments, making the reinforcing material also includes combining the polycarbonates with other polymers. In some embodiments, the invention includes a method of making a cement or concrete composition, obtained by combining the cementitious composition of the invention and the reinforcing material that includes a polycarbonate material.

Other Polymers

In some embodiments, the invention provides a method of making a composition, the method comprising combining the cementitious composition of the invention and the reinforcing material that includes a polymer. In some embodiments, the reactants that form monomers of the polymer, are derived at least partially from an electrochemical process. In some embodiments, the monomer by-product in the electrochemical process may include: vinyl chloride, ethylene, styrene, propylene, methyl methacrylate, condensation polymer monomers, olefins, acrylates, or any combination thereof.

Making the Cementitious Composition

In one aspect, there is provide a method for forming a cement or concrete composition, by a) making the cementitious composition by contacting an industrial waste gas stream comprising carbon dioxide with a proton removing agent or an alkali to form a carbon dioxide charged water;

b) contacting the carbon dioxide charged water with divalent cations to form the cementitious composition comprising a metastable component selected from the group consisting of vaterite, amorphous calcium carbonate, and combination thereof; and c) combining the cementitious composition with a reinforcing material, to form a cement or concrete composition.

In some embodiments, the above method further includes contacting the carbon dioxide charged water with the divalent cations under precipitation conditions that favor the formation of the cementitious composition comprising a metastable component selected from the group consisting of vaterite, amorphous calcium carbonate, and combination thereof. In some embodiments, the precipitation conditions favor the formation of more than 50 wt % vaterite or between 50-99 wt % vaterite in the cementitious composition. Some examples of such precipitation conditions have been described herein.

Figure 3:
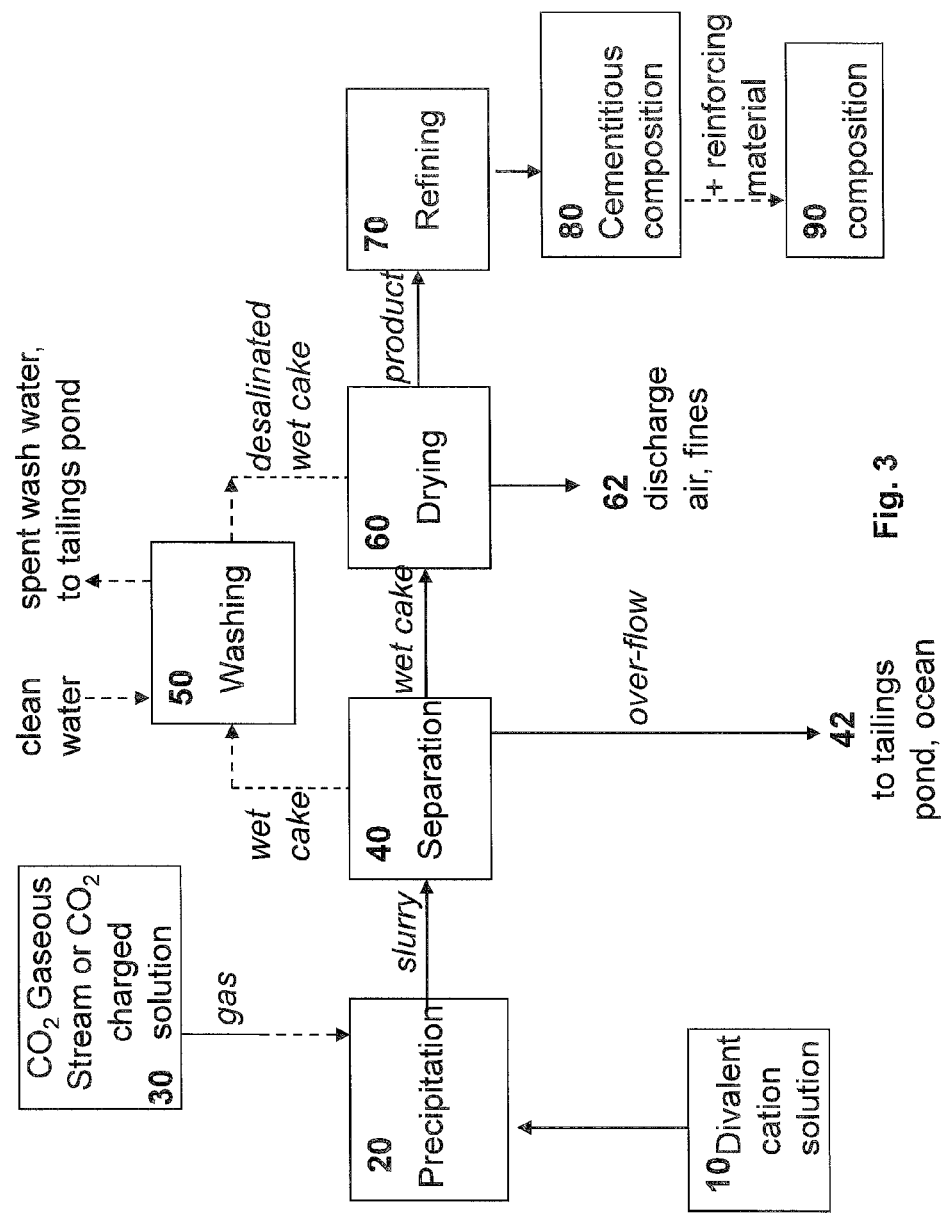
FIG. 3 illustrates a flow diagram for some embodiments of the invention.

An illustration of the process to make the cementitious composition is depicted in FIG. 3. In some embodiments, an absorbing solution, e.g., an alkaline solution is charged with $CO_2$ to produce $CO_2$ charged solution 30, which $CO_2$ charged solution is then subjected to carbonate compound precipitation conditions at step 20. In some embodiments, the divalent cation solution 10 is contacted with the $CO_2$ charged solution containing bicarbonate/carbonate ions, which solution is then subjected to carbonate compound precipitation conditions to form the carbonate composition. The divalent cation solution may contain calcium (such as in hydrated lime or carbide lime or any solution containing calcium ions) optionally containing magnesium to precipitate calcium carbonate optionally containing magnesium carbonate. As illustrated in FIG. 3, a $CO_2$ gaseous stream 30 may also be contacted with the divalent cation solution at precipitation step 20. The "$CO_2$ charged water" or "$CO_2$ charged solution" includes water that has had $CO_2$ gas contacted with it to produce, e.g., carbonic acid, bicarbonate and/or carbonate ion.

Below are provided various components that may be used in making the cementitious compositions of the invention.

$CO_2$

The source of $CO_2$ that is used in the embodiments provided herein may be any convenient $CO_2$ source. The $CO_2$ source may be a liquid, solid (e.g., dry ice) or gaseous $CO_2$ source. In certain embodiments, the $CO_2$ source is a gaseous $CO_2$ source. This gaseous $CO_2$ is, in some embodiments, a waste stream or product from an industrial plant. The nature of the industrial plant may vary in these embodiments, where industrial plants of interest include power plants, chemical processing plants, steel mills, paper mills, cement plants, and other industrial plants that produce $CO_2$ as a byproduct. The industrial waste gas stream includes a stream of gas (or analogous stream) that is produced as a byproduct of an active process of the industrial plant. The gaseous stream may be substantially pure $CO_2$ or a multi-component gaseous stream that includes $CO_2$ and one or more additional gases. Multi-component gaseous streams (containing $CO_2$) that may be employed as a $CO_2$ source in embodiments of the methods include both reducing, e.g., syngas, shifted syngas, natural gas, and hydrogen and the like, and oxidizing condition streams, e.g., flue gases from combustion. Particular multi-component gaseous streams of interest that may be treated according to the invention include: oxygen containing combustion power plant flue gas, turbo charged boiler product gas, coal gasification product gas, shifted coal gasification product gas, anaerobic digester product gas, wellhead natural gas stream, reformed natural gas or methane hydrates, and the like.

Thus, the waste streams may be produced from a variety of different types of industrial plants. Suitable waste streams for the invention include waste streams, such as, flue gas, produced by industrial plants that combust fossil fuels (e.g., coal, oil, natural gas) or anthropogenic fuel products of naturally occurring organic fuel deposits (e.g., tar sands, heavy oil, oil shale, etc.). In some embodiments, a waste stream suitable for systems and methods of the invention is sourced from a coal-fired power plant, such as a pulverized coal power plant, a supercritical coal power plant, a mass burn coal power plant, a fluidized bed coal power plant. In some embodiments, the waste stream is sourced from gas or oil-fired boiler and steam turbine power plants, gas or oil-fired boiler simple cycle gas turbine power plants, or gas or oil-fired boiler combined cycle gas turbine power plants. In some embodiments, waste streams produced by power plants that combust syngas (i.e., gas that is produced by the gasification of organic matter, for example, coal, biomass, etc.) are used. In some embodiments, waste streams from integrated gasification combined cycle (IGCC) plants are used. In some embodiments, waste streams produced by Heat Recovery Steam Generator (HRSG) plants are used to produce compositions in accordance with systems and methods of the invention.

Waste streams produced by cement plants are also suitable for systems and methods of the invention. Cement plant waste streams include waste streams from both wet process and dry process plants, which plants may employ shaft kilns or rotary kilns, and may include pre-calciners. These industrial plants may each burn a single fuel, or may burn two or more fuels sequentially or simultaneously.

Contact protocols for absorbing $CO_2$, include, but are not limited to: direct contacting protocols, e.g., bubbling the gas through the volume of water, concurrent contacting means, i.e., contact between unidirectionally flowing gaseous and liquid phase streams, countercurrent means, i.e., contact between oppositely flowing gaseous and liquid phase streams, and the like. Thus, contact may be accomplished through use of infusers, bubblers, fluidic Venturi reactor, sparger, gas filter, spray, tray, or packed column reactors, and the like, as may be convenient.

A variety of different methods may be employed to prepare the cementitious compositions of the invention. $CO_2$ sequestration protocols of interest include, but are not limited to, those disclosed in U.S. patent application Ser. No. 12/126,776, filed 23 May 2008; Ser. No. 12/163,205, filed 27 Jun. 2008; Ser. No. 12/486,692, filed 17 Jun. 2009; Ser. No. 12/501,217, filed 10 Jul. 2009; and Ser. No. 12/557,492, filed 10 Sep. 2009; as well as International Application No. PCT/US08/88318, filed 24 Dec. 2008; and PCT/US09/45722, filed 29 May 2009; the disclosures of which are herein incorporated by reference in their entireties.

In some embodiments, the absorbing solution charged with the partially or fully dissolved $CO_2$ is made by parging or diffusing the $CO_2$ gaseous stream through a solution to make a $CO_2$ charged water. In some embodiments, the solution with $CO_2$ includes an alkaline agent or a proton removing agent or a pH raising agent. In some embodiments, the $CO_2$ gas is bubbled or parged through a solution containing alkali, such as sodium or potassium hydroxide or sodium or potassium carbonate, in an absorber. In some embodiments, the absorber may include a bubble chamber where the $CO_2$ gas is bubbled through the solution containing the alkali. In some embodiments, the absorber may include a spray tower where the solution containing the alkali is sprayed or circulated through the $CO_2$ gas. In some embodiments, the absorber may include a pack bed to increase the surface area of contact between the $CO_2$ gas and the solution containing the alkali. In some embodiments, a typical absorber fluid temperature is 32-37° C. The absorber for absorbing $CO_2$ in the solution is described in U.S. application Ser. No. 12/721,549, filed on Mar. 10, 2010, which is incorporated herein by reference in its entirety. The $CO_2$ charged water may be then contacted with the divalent cation i.e. alkaline earth metal containing water to form the carbonate composition.

Absorbing Solution

In some embodiments, the absorbing solution that comes into contact with the $CO_2$ source is an alkaline solution. An "alkaline solution" or "alkali" or "proton removing agent" or "pH raising agent", as used herein, includes solutions of pH greater than 8, e.g. 8-14, such as, but not limited to, NaOH, Na$_2$CO$_3$, KOH, K$_2$CO$_3$, NH$_4$OH, Ca(OH)$_2$, Mg(OH)$_2$, or combinations thereof. In some embodiments, the hydrated lime or the carbide lime that is being used as a source of divalent cations also acts as a source of proton removing agents due to the presence of CaO/Ca(OH)$_2$. In some embodiments, the absorbing solution is a saltwater solution comprising the alkali. A saltwater, as used herein, includes, but is not limited to, sea water, brackish water, brines, and salt containing solutions, such as, sodium chloride solutions. Other absorbing solutions that may be used in methods of the invention to contact the CO$_2$ from the CO$_2$ source include, but are not limited to, water, municipal water, surface water, amine solutions, non-aqueous solutions, organic solvent solutions, or any combination thereof. Absorbing solution may be used to remove gaseous carbon dioxide from a gaseous source of carbon dioxide in a gaseous carbon dioxide removal process. The alkali such as NaOH, KOH, Na$_2$CO$_3$, etc. may be made using any electrochemical method known in the art. Some examples of the electrochemical methods are described herein below.

Electrochemical Methods

Electrochemical methods may be used to produce alkalinity, such as hydroxide species (e.g. NaOH, KOH, OH$^-$) or carbonate species (e.g. Na$_2$CO$_3$, K$_2$CO$_3$, H$_2$CO$_3$, CO$_3^{2-}$). Electrochemical methods may be used to produce alkalinity at a cathode, such as hydroxide species (e.g. NaOH, KOH, OH$^-$) or carbonate species (e.g. Na$_2$CO$_3$, K$_2$CO$_3$, H$_2$CO$_3$, CO$_3^{2-}$). The electrochemical methods of the invention are described in more detail in commonly assigned applications with application Ser. No. 12/541,055, filed Aug. 13, 2009; Ser. No. 12/503,557, filed Jul. 15, 2009; and Ser. No. 13/474,598, filed May 17, 2012, and commonly assigned U.S. Pat. Nos. 7,875,163 and 7,790,012, each of which are incorporated by reference herein in their entirety.

Figure 4:
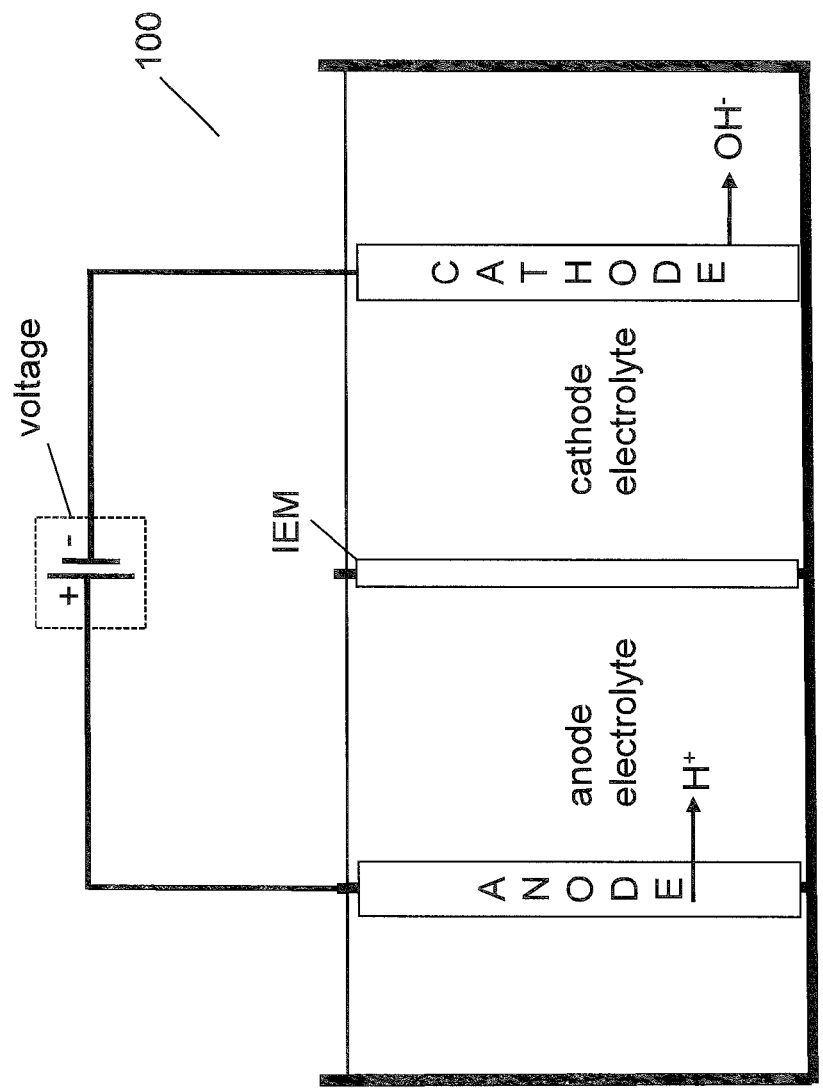
FIG. 4 illustrates an embodiment of the electrochemical system of the invention.
Figure 5:
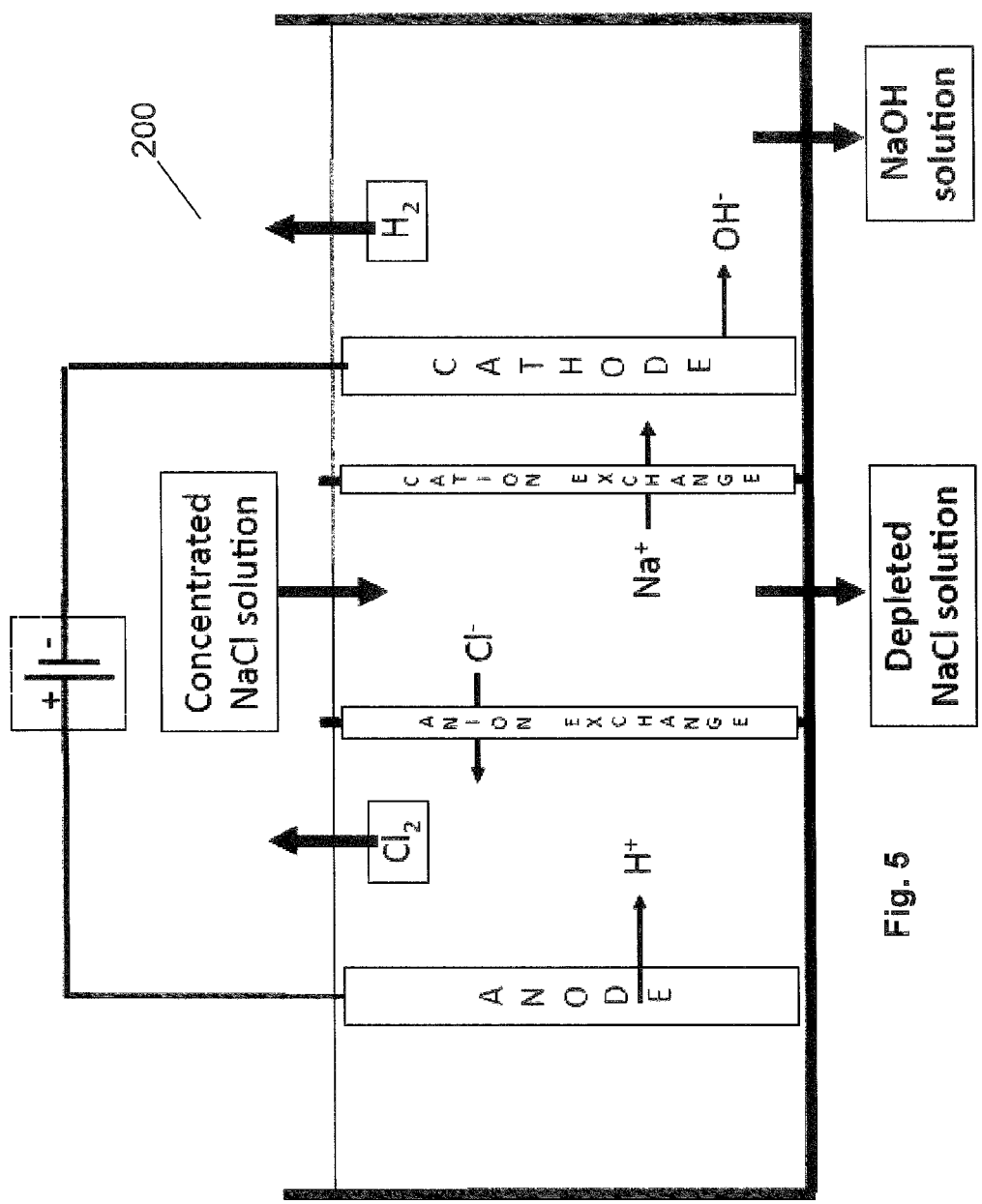
FIG. 5 illustrates an embodiment of the electrochemical system of the invention.

In some embodiments, the electrochemical cell includes at least one unit cell, the unit cell including at least a cathode, an anode, at least one ion exchange membrane, electrolytes, and a potentiostat device for applying a voltage across the anode and cathode of such a unit cell or a collection of units cells that could be in stacked in a larger electrochemical cell. An example of the electrochemical cell is illustrated in FIG. 4 where the electrochemical cell 100 has a cathode chamber containing the cathode and the cathode electrolyte; an anode chamber containing the anode and the anode electrolyte; and an ion exchange membrane between the cathode chamber and the anode chamber. The hydroxide is formed in the cathode electrolyte and depending on the electrolyte used an acid is formed in the anode electrolyte. For example, if sodium chloride is used as the anode electrolyte, then chloride ions may combine with the hydrogen ions formed at the anode to form acid in the anode electrolyte. The sodium ions may pass through the ion exchange membrane to the cathode electrolyte to form sodium hydroxide. It is to be understood that FIG. 3 is for illustration purposes only and deviations from the electrochemical cell are well within the scope of the invention as long as an alkali is formed in the cathode electrolyte. For example, the cell may contain an anion exchange membrane and a cation exchange membrane as illustrated in the electrochemical cell 200 in FIG. 5. As illustrated in FIG. 5, the hydrogen gas is formed at the cathode which is then transferred to the anode to form hydrogen ions.

In some embodiments, a potentiostat device is used to apply a voltage of 2.0V or less across the anode and the cathode of the electrochemical cell, resulting in production of alkalinity at the cathode without production of any gas at the anode. The alkaline solution may be withdrawn from the electrochemical cell to be used in the absorption of carbon dioxide to form the cementitious composition of the invention. In some embodiments, a potentiostat device is used to apply a voltage of 1.9V or less across an anode and a cathode of an electrochemical cell, resulting in production of alkalinity at the cathode without production of any gas at the anode, such as 1.8V or less, such as 1.7V or less, such as 1.6V or less, such as 1.5V or less, such as 1.4V or less, such as 1.3V or less, such as 1.2V or less, such as 1.1V or less, such as 1.0V or less, such as 0.9V or less, such as 0.8V or less, such as 0.7V or less, such as 0.6V or less, such as 0.5V or less resulting in the production of alkalinity at the cathode. In some embodiments, a potentiostat device is used to apply a voltage of 0.5V or less across an anode and a cathode of an electrochemical cell, resulting in production of alkalinity at the cathode without production of any gas at the anode.

In some embodiments, the acid formed in the anode electrolyte may be used for chlorination. In some embodiments, the acid may be used to chlorinate unsaturated hydrocarbons such as, but not limited to, ethylene, styrene etc. to form chlorinated products, such as, but not limited to, styrene chloride, vinyl chloride, etc. The chlorinated products may be then used as monomers (e.g. chlorinated products of olefins, acrylates, monomers of condensation polymers, ethylene, styrene, propylene, methyl methacrylate) to form polymers, such as but not limited to, poly(vinyl chloride) etc. The polymers may then be used as reinforcing materials in the compositions of the invention. In some embodiments, the unsaturated hydrocarbon may be added to the anode electrolyte where the acid formed in the anode electrolyte reacts with the unsaturated hydrocarbon to form chlorinated products. In some embodiments, the unsaturated hydrocarbon is treated with the acid outside the anode chamber to form the chlorinated products.

In some embodiments, the anode oxidizes metals to form metal chlorides in higher oxidation state which may be used to chlorinate the unsaturated or saturated hydrocarbons to form chlorinated hydrocarbons. The chlorinated hydrocarbons may be used to form vinyl chloride monomer and then PVC. The cathode in such systems forms hydroxides which may be used to form absorbing solution for absorbing carbon dioxide gas to form the cementitious compositions of the invention. Such electrochemical systems and methods are described in more detail in commonly assigned application with application Ser. No. 13/474,598, filed May 17, 2012, which is incorporated by reference herein in its entirety.

Figure 6:
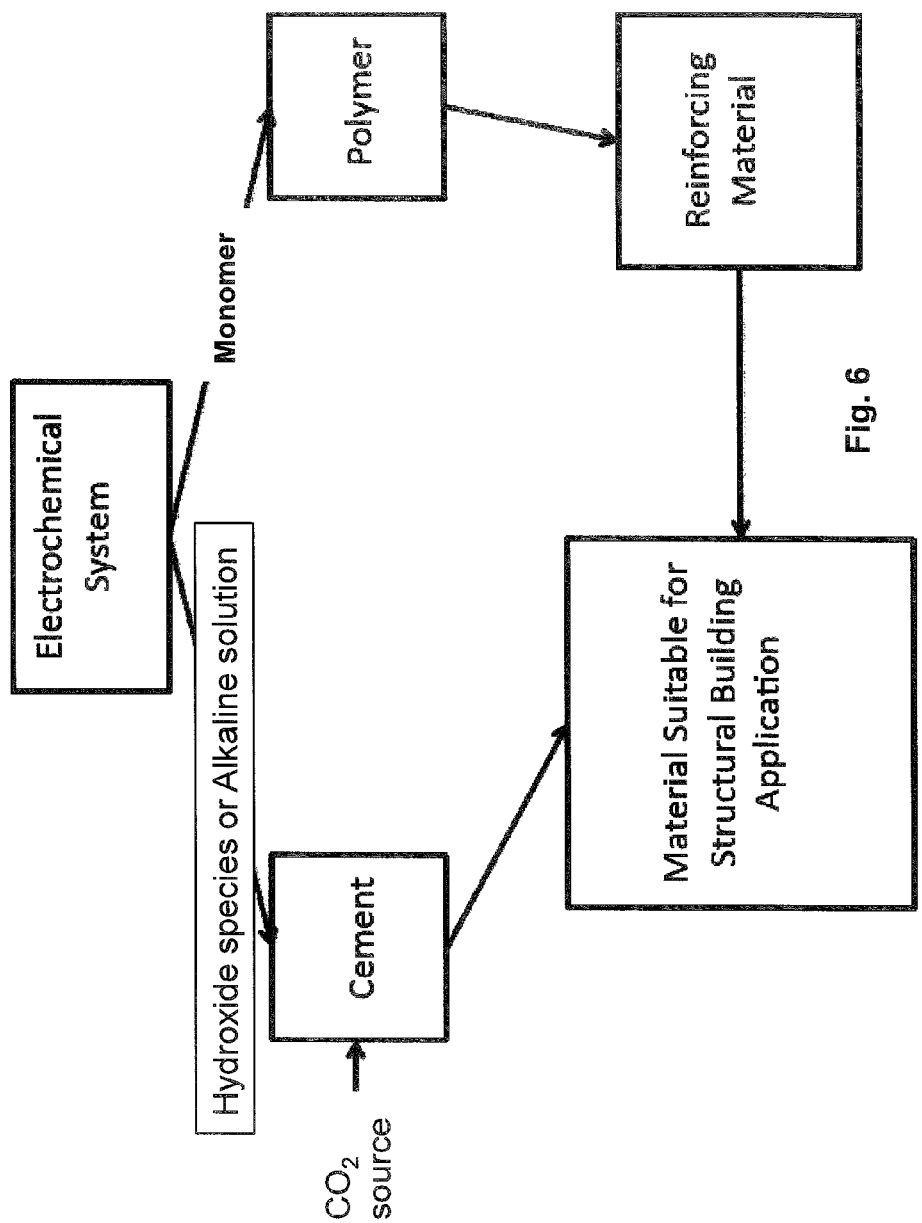
FIG. 6 illustrates a flow diagram for some embodiments of the electrochemical system of the invention.
Figure 7:
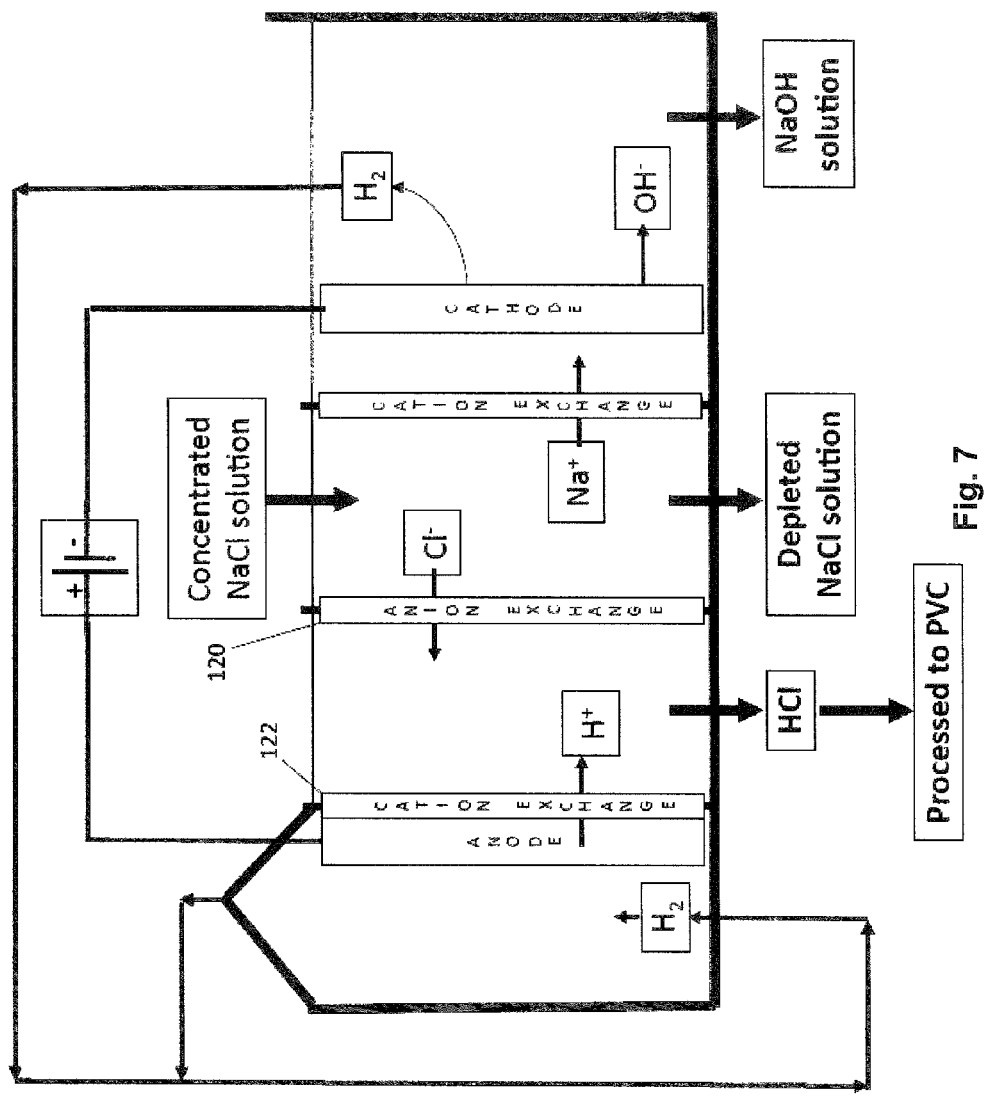
FIG. 7 illustrates an embodiment of the electrochemical system of the invention.

FIG. 6 illustrates a flow diagram for some embodiments of the invention where an electrochemical system is used to execute an electrochemical process that produces both: a monomer, such as, vinyl chloride, that is used to make the reinforcing material, such as PVC; and a hydroxide species, or an alkaline solution that may be involved in the making of the cementitious composition of the invention. An example of an electrochemical system used to process the alkali from the cathode electrolyte and acid from the anode electrolyte, is as illustrated in FIG. 7. As illustrated in FIG. 7, the electrochemical system is used to produce a hydroxide species (e.g. NaOH) and the byproducts of the electrochemical system (e.g. HCl) may be used to make vinyl chloride monomer that is used to make a reinforcing material. In this electrochemical system, no gas is produced at the anode. The reinforcing material is then used in compositions of the invention.

In some embodiments, the carbon dioxide may be passed into the cathode electrolyte where the hydroxide dissolves the carbon dioxide to form carbonate/bicarbonate species. This cathode electrolyte containing the carbonate/bicarbonate species may be withdrawn from the cathode chamber and reacted with cations from the cation source to form the cementitious compositions of the invention. In some embodiments, the cathode electrolyte may be withdrawn and transferred to a contactor which is also connected to the source of carbon dioxide. The contactor containing the alkaline cathode electrolyte may then absorb the carbon dioxide to form carbonate/bicarbonate species in the solution. The carbonate/bicarbonate species containing solution may be contacted with the cations to form cementitious compositions of the invention or the carbonate/bicarbonate species containing solution is recirculated back to the cathode chamber where the bicarbonate may be converted to the carbonate and the carbonate solution is withdrawn from the cathode chamber. Such electrochemical systems and methods are described in more detail in commonly assigned application with application Ser. No. 12/503,557, filed Jul. 15, 2009, which is incorporated by reference herein in its entirety.

Cation Source

The absorbing alkaline solution after being contacted with carbon dioxide may result in a $CO_2$ charged solution or $CO_2$ charged water containing carbonic acid, bicarbonate, carbonate, or combination thereof. The solution may be then treated with divalent cations from a source of cations to form carbonate/bicarbonates containing products such as but not limited to, calcium carbonate, calcium bicarbonate, magnesium carbonate, magnesium bicarbonate, or combination thereof.

In some embodiments, an order for the addition of the $CO_2$ or the $CO_2$ charged water and the divalent cation containing water to the reactor for the precipitation, may be varied. In some embodiments, the $CO_2$ gaseous stream or the solution containing the partially or fully dissolved $CO_2$ or the affluent from the absorber containing an alkaline solution of $CO_2$ is added to the reactor containing the divalent cation containing water for precipitation of the carbonate precipitate in the precipitation step 20 (illustrated in FIG. 3). In some embodiments, the divalent cation containing water is added to the reactor containing the $CO_2$ gaseous stream or the solution containing the partially or fully dissolved $CO_2$ or the affluent from the absorber containing an alkaline solution of $CO_2$ or the $CO_2$ charged water for precipitation of the carbonate precipitate in the precipitation step 20. In some embodiments, the divalent cation containing water is added to the reactor containing less than 20%, or less than 15%, or less than 10%, or less than 5% of the $CO_2$ gaseous stream or the solution containing the partially or fully dissolved $CO_2$ or the affluent from the absorber containing an alkaline solution of $CO_2$ for precipitation of the carbonate precipitate in the precipitation step 20.

The source of cations, such as sodium, potassium, or divalent cation etc., is any aqueous medium containing alkaline earth metals, such as, but are not limited to, calcium, magnesium, strontium, barium, etc. or combination thereof. The "divalent cation" and "alkaline earth metal ion" are used interchangeably herein. In some embodiments, the divalent cation is calcium, magnesium, or combination thereof and the source of divalent cation is any aqueous medium containing calcium, magnesium or combination thereof. In some embodiments, the divalent cation source is also the source of water and/or source of alkalinity, as described herein. For example, the aqueous solution of divalent cations may comprise cations derived from freshwater, brackish water, seawater, or brine (e.g., naturally occurring subterranean brines or anthropogenic subterranean brines such as geothermal plant wastewaters, desalination plant waste waters), as well as other salines having a salinity that is greater than that of freshwater, any of which may be naturally occurring or anthropogenic.

In some embodiments, the divalent cations such as, alkaline earth-metal containing water such as hydrated lime or carbide lime is contacted with a solution charged with the partially or fully dissolved $CO_2$, which $CO_2$ solution is then subjected to one or more carbonate compound precipitation conditions. In such embodiments, the hydrated lime or the carbide lime also provides proton removing agents or alkalinity sufficient to precipitate calcium and/or magnesium carbonates. Such use of carbide lime in sequestering $CO_2$ to form cementitious compositions is being described in U.S. Provisional Application No. 61/617,243, filed Mar. 29, 2012, titled "Methods and systems for utilizing carbide lime," which is incorporated herein by reference in its entirety.

Divalent cations (e.g., alkaline earth metal cations such as $Ca^{2+}$ and $Mg^{2+}$), which are useful for producing cementitious composition of the invention, may be found in industrial wastes, seawater, brines, hard water, minerals, and many other suitable sources. In some embodiments, the commercially available divalent cations, such as, but not limited to, calcium chloride dissolved in water, may be used as the divalent cation solution for the precipitation of the cementitious composition.

In some locations, industrial waste streams from various industrial processes provide for convenient sources of cations (as well as in some cases other materials useful in the process, e.g., metal hydroxide). Such waste streams include, but are not limited to, mining wastes; fossil fuel burning ash (e.g., fly ash, bottom ash, boiler slag); slag (e.g., iron slag, phosphorous slag); cement kiln waste (e.g., cement kiln dust); oil refinery/petrochemical refinery waste (e.g., oil field and methane seam brines); coal seam wastes (e.g., gas production brines and coal seam brine); paper processing waste; water softening waste brine (e.g., ion exchange effluent); silicon processing wastes; agricultural waste; metal finishing waste; high pH textile waste; and caustic sludge.

In some locations, a convenient source of cations for use in systems and methods of the invention is water (e.g., an aqueous solution including cations such as seawater or subterranean brine), which may vary depending upon the particular location at which the invention is practiced. Suitable aqueous solutions of cations that may be used include solutions including one or more divalent cations, e.g., alkaline earth metal cations such as $Ca^{2+}$ and $Mg^{2+}$. In some embodiments, the aqueous source of cations comprises alkaline earth metal cations. In some embodiments, the alkaline earth metal cations include calcium, magnesium, or a mixture thereof. In some embodiments, the aqueous solution of cations comprises calcium in amounts ranging from 50 to 50,000 ppm, 50 to 40,000 ppm, 50 to 20,000 ppm, 100 to 10,000 ppm, 200 to 5000 ppm, or 400 to 1000 ppm, or 10,000 to 50,000 ppm, or 20,000 to 50,000 ppm, or 20,000 to 30,000 ppm.

In some embodiments, mineral rich freshwater may be a convenient source of cations (e.g., cations of alkaline earth metals such as $Ca^{2+}$ and $Mg^{2+}$). Any number of suitable freshwater sources may be used, including freshwater sources ranging from sources relatively free of minerals to sources relatively rich in minerals. Mineral-rich freshwater sources may be naturally occurring, including any number of hard water sources, lakes, or inland seas. Some mineral-rich freshwater sources such as alkaline lakes or inland seas (e.g., Lake Van in Turkey) also provide a source of pH-modifying agents. Mineral-rich freshwater sources may also be anthropogenic. For example, a mineral-poor (soft) water may be contacted with a source of cations such as alkaline earth metal cations (e.g., $Ca^{2+}$, $Mg^{2+}$, etc.) to produce a mineral-rich water that is suitable for methods and systems described herein. Cations or precursors thereof (e.g., salts, minerals) may be added to freshwater (or any other type of water described herein) using any convenient protocol (e.g., addition of solids, suspensions, or solutions). In some embodiments, divalent cations selected from $Ca^{2+}$ and $Mg^{2+}$ are added to freshwater. In some embodiments, freshwater including $Ca^{2+}$ is combined with a magnesium silicates (e.g., olivine or serpentine), or products or processed forms thereof, yielding a solution including calcium and magnesium cations.

Many minerals provide sources of cations and, in addition, some minerals are sources of base. Divalent cation-containing minerals include mafic and ultramafic minerals such as olivine, serpentine, and other suitable minerals, which may be dissolved using any convenient protocol. In one embodiment, cations such as calcium may be provided for methods and compositions of this invention from feldspars such as anorthite. Cations may be obtained directly from mineral sources or from subterranean brines, high in calcium or other divalent cations. Other minerals such as wollastonite may also be used. Dissolution may be accelerated by increasing surface area, such as by milling by conventional means or by, for example, jet milling, as well as by use of, for example, ultrasonic techniques. In addition, mineral dissolution may be accelerated by exposure to acid or base.

Metal silicates (e.g., magnesium silicates) and other minerals including cations of interest may be dissolved, for example, in acid such as HCl (optionally from an electrochemical process) to produce, for example, magnesium and other metal cations for use in compositions of the invention. In some embodiments, magnesium silicates and other minerals may be digested or dissolved in an aqueous solution that has become acidic due to the addition of carbon dioxide and other components of waste gas (e.g., combustion gas). Alternatively, other metal species such as metal hydroxide (e.g., $Mg(OH)_2$, $Ca(OH)_2$) may be made available for use by dissolution of one or more metal silicates (e.g., olivine and serpentine) with aqueous alkali hydroxide (e.g., NaOH) or any other suitable caustic material. Any suitable concentration of aqueous alkali hydroxide or other caustic material may be used to decompose metal silicates, including highly concentrated and very dilute solutions. The concentration (by weight) of an alkali hydroxide (e.g., NaOH) in solution may be, for example, from 30% to 80% (w/w).

Precipitation Conditions

In some embodiments, the methods described herein include contacting the carbon dioxide charged water with the divalent cations under precipitation conditions that favor the formation of the cementitious composition comprising a metastable component selected from the group consisting of vaterite, amorphous calcium carbonate, and combination thereof. In some embodiments, the precipitation conditions favor the formation of more than 50 wt % vaterite or between 50-99 wt % vaterite in the cementitious composition. Accordingly, there are provided methods for forming a cement or concrete composition, by a) making the cementitious composition by contacting an industrial waste gas stream comprising carbon dioxide with a proton removing agent to form a carbon dioxide charged water; b) contacting the carbon dioxide charged water with divalent cations under one or more precipitation conditions that favor the formation of the cementitious composition comprising a metastable component selected from the group consisting of vaterite, amorphous calcium carbonate, and combination thereof; and c) combining the cementitious composition with a reinforcing material, to form a cement or concrete composition.

In some embodiments, the one or more precipitation conditions include, but not limited to, temperature, pH, residence time, proton removing agent, additive, ion ratio, rate of precipitation, mixing rate, form of agitation, presence of seed crystal, catalyst, membrane, or substrate, separation, drying, refining, or combination thereof. Accordingly, there are provided methods for forming a cement or concrete composition, by a) making the cementitious composition by contacting an industrial waste gas stream comprising carbon dioxide with a proton removing agent to form a carbon dioxide charged water; b) contacting the carbon dioxide charged water with divalent cations under one or more precipitation conditions that favor the formation of the cementitious composition comprising a metastable component selected from the group consisting of vaterite, amorphous calcium carbonate, and combination thereof wherein the one or more precipitation conditions include, but not limited to, temperature, pH, residence time, proton removing agent, additive, ion ratio, rate of precipitation, mixing rate, form of agitation, presence of seed crystal, catalyst, membrane, or substrate, separation, drying, refining, or combination thereof; and c) combining the cementitious composition with a reinforcing material, to form a cement or concrete composition.

Some of the precipitation conditions are described in commonly assigned U.S. Pat. Nos. 7,735,274, and 8,062,418, both of which are incorporated herein by reference in their entirety.

At precipitation step 20 (FIG. 3), carbonate compounds, which may be amorphous or crystalline, are precipitated. Precipitation conditions include those that change the physical environment of the water to produce the desired precipitate product. In some embodiments, the precipitation conditions include temperature of the aqueous solution, including adjustment the solution temperature to between 0° C. and 100° C., such as between 5° C. and 90° C., such as between 10° and 80° C., such as between 20° C. and 60° C., such as between 20° C. and 50° C.

The residence time of the precipitate in the reactor before the precipitate is removed from the solution, may vary. In some embodiments, the residence time of the precipitate in the solution is more than 5 seconds, or between 5 seconds-1 hour, or between 5 seconds-1 minute, or between 5 seconds to 20 seconds, or between 5 seconds to 30 seconds, or between 5 seconds to 40 seconds. Without being limited by any theory, it is contemplated that the residence time of the precipitate may affect the size of the particle. For example, a shorter residence time may give smaller size particles or more disperse particles whereas longer residence time may give agglomerated or larger size particles. In some embodiments, the residence time in the process of the invention may be used to make small size as well as large size particles in a single or multiple batches which may be separated or may remain mixed for later steps of the process. In some embodiments, the finely disperse particles may be processed further to give the composition of the invention. In some embodiments, the large or agglomerated particles may be processed to give the cementitious composition of the invention.

While the pH of the water may range from 7 to 14 during a given precipitation process, in certain embodiments the pH is raised to alkaline levels in order to drive the precipitation of carbonate compound as desired. In some embodiments, the pH is raised to a level which minimizes if not eliminates $CO_2$ gas generation production during precipitation. In these embodiments, the pH may be raised to 10 or higher, such as 11 or higher. In some embodiments, the one or more conditions or the precipitation conditions include contacting the saltwater or the divalent cation containing water with a proton removing agent. The proton removing agent may be any proton removing agent, as described herein, for example, but not limited to, oxide, hydroxide, such as sodium hydroxide, carbonate, coal ash, naturally occurring mineral, and combination thereof. In some embodiments, the one or more conditions or the precipitation conditions include contacting the saltwater or the divalent cation containing water to electrochemical conditions. Such electrochemical conditions have been described herein.

The nature of the precipitate may be affected by the pH of the precipitation process. In some embodiments, high pH may lead to rapid precipitation and agglomeration of the particles whereas lower pH or slow raise in the pH may lead to finer particles. Additives other than pH elevating agents may also be introduced into the water in order to influence the nature of the precipitate that is produced. As such, certain embodiments of the methods include providing an additive in water before or during the time when the water is subjected to the precipitation conditions. Certain calcium carbonate polymorphs can be favored by trace amounts of certain additives. For example, vaterite, an unstable or metastable polymorph of $CaCO_3$ which precipitates in a variety of different morphologies and converts rapidly to calcite, can be obtained at very high yields by including trace amounts of lanthanum as lanthanum chloride in a supersaturated solution of calcium carbonate. Other additives beside lanthanum that are of interest include, but are not limited to transition metals and the like. For instance, the addition of ferrous or ferric iron is known to favor the formation of disordered dolomite (protodolomite) where it would not form otherwise.

The nature of the precipitate can also be influenced by selection of appropriate major ion ratios. Major ion ratios also have influence of polymorph formation. For example, as the magnesium:calcium ratio in the water increases, aragonite may become the favored polymorph of calcium carbonate over low-magnesium calcite. At low magnesium:calcium ratios, low-magnesium calcite is the preferred polymorph. As such, a wide range of magnesium:calcium ratios can be employed, including, e.g., 100/1, 50/1, 20/1, 10/1, 5/1, 2/1, 1/1, 1/2, 1/5, 1/10, 1/20, 1/50, 1/100. In certain embodiments, the magnesium:calcium ratio is determined by the source of water employed in the precipitation process (e.g., seawater, brine, brackish water, fresh water), whereas in other embodiments, the magnesium:calcium ratio is adjusted to fall within a certain range.

Rate of precipitation may also have an effect on compound phase formation. The most rapid precipitation can be achieved by seeding the solution with a desired phase. Without seeding, rapid precipitation can be achieved by rapidly increasing the pH of the water, which results in more amorphous constituents. When silica is present, the more rapid the reaction rate, the more silica is incorporated with the carbonate precipitate. The higher the pH is, the more rapid the precipitation is and the more amorphous the precipitate is.

Accordingly, a set of precipitation conditions to produce a desired precipitate from a water include, in certain embodiments, the water's temperature and pH, and in some instances the concentrations of additives and ionic species in the water. Precipitation conditions may also include factors such as mixing rate, forms of agitation such as ultrasonics, and the presence of seed crystals, catalysts, membranes, or substrates. In some embodiments, precipitation conditions include supersaturated conditions, temperature, pH, and/or concentration gradients, or cycling or changing any of these parameters. The protocols employed to prepare carbonate compound precipitates according to the invention may be batch or continuous protocols. It will be appreciated that precipitation conditions may be different to produce a given precipitate in a continuous flow system compared to a batch system.

$CO_2$ charging and carbonate compound precipitation may occur in a continuous process or at separate steps. As such, charging and precipitation may occur in the same reactor of a system, e.g., as illustrated in FIG. 3 at step 20, according to certain embodiments of the invention. In yet other embodiments of the invention, these two steps may occur in separate reactors, such that the water is first charged with $CO_2$ in a charging reactor and the resultant $CO_2$ charged water is then subjected to precipitation conditions in a separate reactor.

In certain embodiments, the methods further include contacting the volume of water that is subjected to the mineral precipitation conditions with $CO_2$. Contact of the water with the $CO_2$ may occur before and/or during the time when the water is subjected to $CO_2$ precipitation conditions. Accordingly, embodiments of the invention include methods in which the volume of water is contacted with $CO_2$ prior to subjecting the volume of salt water to mineral precipitation conditions. Embodiments of the invention include methods in which the volume of salt water is contacted with the $CO_2$ while the volume of salt water is being subjected to carbonate compound precipitation conditions. Embodiments of the invention include methods in which the volume of water is contacted with the $CO_2$ both prior to subjecting the volume of salt water to carbonate compound precipitation conditions and while the volume of salt water is being subjected to carbonate compound precipitation conditions. In some embodiments, the same water may be cycled more than once, wherein a first cycle of precipitation removes primarily calcium carbonate and magnesium carbonate minerals, and leaves remaining alkaline water to which other divalent cations may be added, that can have more carbon dioxide cycled through it, precipitating more carbonate compounds.

The above described processes result in the production of a slurry of a carbonate containing precipitate and a mother liquor. Where desired, the compositions made up of the precipitate and the mother liquor may be stored for a period of time following precipitation and prior to further processing. For example, the composition may be stored for a period of time ranging from 1 to 1000 days or longer, such as 1 to 10 days or longer, at a temperature ranging from 1 to 40° C., such as 20 to 25° C.

Following production of the carbonate precipitate from the water, the resultant precipitated carbonate compound composition is separated from the mother liquor to produce separated carbonate compound precipitate product, as illustrated at step 40 of FIG. 3. The slurry components are separated. Embodiments may include treatment of the mother liquor, where the mother liquor may or may not be present in the same composition as the product. For example, where the mother liquor is to be returned to the ocean, the mother liquor may be contacted with a gaseous source of $CO_2$ in a manner sufficient to increase the concentration of carbonate ion present in the mother liquor. Contact may be conducted using any convenient protocol, such as those described above. In certain embodiments, the mother liquor has an alkaline pH, and contact with the $CO_2$ is carried out in a manner sufficient to reduce the pH to a range between 5 and 9, e.g., 6 and 8.5, including 7.5 to 8.2. In certain embodiments, the treated brine may be contacted with the $CO_2$, e.g., as described above, to sequester further $CO_2$. For example, where the mother liquor is to be returned to the ocean, the mother liquor may be contacted with the $CO_2$ in a manner sufficient to increase the concentration of carbonate ion present in the mother liquor. Contact may be conducted using any convenient protocol, such as those described above. In certain embodiments, the mother liquor has an alkaline pH, and contact with the $CO_2$ source is carried out in a manner sufficient to reduce the pH to a range between 5 and 9, e.g., 6 and 8.5, including 7.5 to 8.2.

The resultant mother liquor of the reaction may be disposed of using any convenient protocol. In certain embodiments, it may be sent to a tailings pond for disposal 42. In certain embodiments, it may be disposed of in a naturally occurring body of water, e.g., ocean, sea, lake or river. In certain embodiments, the mother liquor is returned to the source of feedwater for the methods of invention, e.g., an ocean or sea. Alternatively, the mother liquor may be further processed, e.g., subjected to desalination protocols, as described further in U.S. application Ser. No. 12/163,205, filed Jun. 27, 2008; the disclosure of which is herein incorporated by reference.

In certain embodiments, following production of the carbonate precipitate, the resultant product is separated from the mother liquor to produce separated carbonate composition. Separation of the product can be achieved using any convenient approach, including a mechanical approach, e.g., where bulk excess water is drained from the product, e.g., either by gravity alone or with the addition of vacuum, mechanical pressing, by filtering the product from the mother liquor to produce a filtrate, etc. Separation of bulk water produces, in certain embodiments, a wet, dewatered precipitate.

The resultant dewatered precipitate is then dried to produce a product, as illustrated at step 60 of FIG. 3. Drying can be achieved by air drying the filtrate. Where the filtrate is air dried, air drying may be at room or elevated temperature. In yet another embodiment, the precipitate is spray dried to dry the precipitate, where the liquid containing the precipitate is dried by feeding it through a hot gas (such as the gaseous waste stream from the power plant), e.g., where the liquid feed is pumped through an atomizer into a main drying chamber and a hot gas is passed as a co-current or counter-current to the atomizer direction. Depending on the particular drying protocol of the system, the drying station may include a filtration element, freeze drying structure, spray drying structure, etc.

Where desired, the dewatered precipitate product from the separation reactor 40 may be washed before drying, as illustrated at optional step 50 of FIG. 3. The precipitate may be washed with freshwater, e.g., to remove salts (such as NaCl) from the dewatered precipitate. Used wash water may be disposed of as convenient, e.g., by disposing of it in a tailings pond, etc. The precipitate may be rinsed with activators as described above.

At step 70, the dried precipitate is refined, e.g., to provide for desired physical characteristics, such as particle size, surface area, etc., or to add one or more components to the precipitate, to produce the cementitious composition 80. In certain embodiments, the precipitate product is refined (i.e., processed) in some manner prior to subsequent use. Refinement may include a variety of different protocols. In certain embodiments, the product is subjected to mechanical refinement, e.g., grinding, in order to obtain a product with desired physical properties, e.g., particle size, etc.

In some embodiments, the particles with different morphologies, such as fine or agglomerated, and/or the particles with different sizes may be mixed to make the cementitious compositions of the invention. For example, the cementitious composition of the invention may include a mix of fine disperse particles with larger agglomerated particles or the cementitious composition of the invention may include a mix of particles with different sizes, e.g., particles with sizes ranging between 0.1 micron to 100 micron. In some embodiments, the cementitious composition of the invention may be modulated by mixing the particles with different particle size, surface area, zeta potential, and/or morphologies.

The vaterite containing cementitious composition may be optionally activated by refining, milling, aging, and/or curing, e.g., to provide for desired physical characteristics, such as activation, particle size, surface area, zeta potential, etc. The vaterite containing cementitious composition may also be activated by adding an aragonite seed, inorganic additive or organic additive. Further, one or more components may be added to the composition, such as the reinforcing material and aggregate, or sand, or rocks etc., to produce the composition of the invention 90.

Method of Converting Vaterite to Aragonite

The compositions of the invention comprising the cementitious composition and the reinforcing material may be contacted with water when the cementitious compositions sets and hardens to form cement. In some embodiments, the composition of the invention after mixing in the water is poured into the molds designed to make one or more of the pre-formed building material. The composition is then allowed to set and harden into the pre-formed or pre-cast material.

Figure 8:
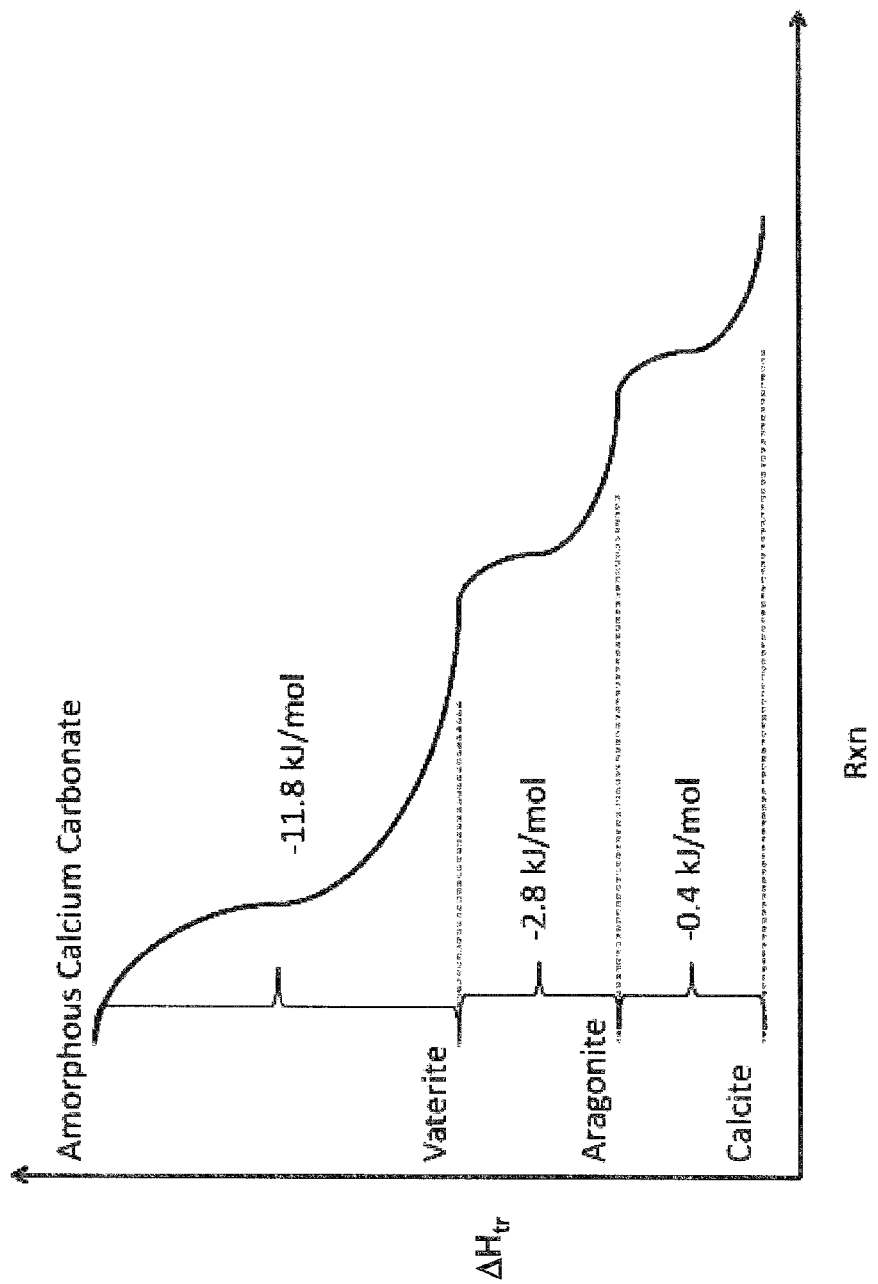
FIG. 8 illustrates a Gibbs free energy diagram of the transition from vaterite to aragonite.

The amorphous calcium carbonate (ACC) and/or vaterite present in the cementitious composition when come into contact with water, may precipitate and transform into one or more of its stable phases (aragonite and/or calcite). A thermodynamic driving force may exist for the transformation from unstable phases to more stable phases, as described by Ostwald in his Step Rule (Ostwald, W. *Zeitschrift fur Physikalische Chemie* 289 (1897)). For this reason, calcium carbonate phases transform in the order: ACC to vaterite, aragonite, and calcite where intermediate phases may or may not be present. For instance, ACC can transform to vaterite and may not transform to aragonite or calcite; or ACC can transform to vaterite and then directly to calcite, skipping the aragonite form; or alternatively, ACC can transform to vaterite and then to aragonite without transforming to calcite. In some embodiments, the vaterite containing cementitious compositions of the invention transform to aragonite after dissolution and reprecipitation. During this transformation, excesses of energy are released, as exhibited by FIG. 8. This intrinsic energy may be harnessed to create a strong aggregation tendency and surface interactions that may lead to agglomeration and cementing. It is to be understood that the values reported in FIG. 8 are well known in the art and may vary.

The transformation between calcium carbonate polymorphs may occur via solid-state transition or may be solution mediated. In some embodiments, the transformation is solution-mediated because it may require less energy than the thermally activated solid-state transition. The solution-mediated transformation is environmentally conscious and more applicable to a cementing application. Vaterite is metastable and the difference in thermodynamic stability of calcium carbonate polymorphs may be manifested as a difference in solubility, where the least stable phases are the most soluble (Ostwald, supra.). Therefore, vaterite may dissolve readily in solution and transform favorably towards a more stable polymorph: aragonite. The driving force for the formation of a particular calcium carbonate polymorph or combination of polymorphs is the change in Gibbs free energy from a supersaturated solution to equilibrium (Spanos & Koutsoukos *Journal of Crystal Growth* (1998) 191, 783-790).

In a polymorphic system like calcium carbonate, two kinetic processes may exist simultaneously in solution: dissolution of the metastable phase and growth of the stable phase (Kralj et al. *Journal of Crystal Growth* (1997) 177, 248-257). In some embodiments, the aragonite or calcite crystals may be growing while vaterite is undergoing dissolution in the aqueous medium.

In some embodiments, the composition of the invention, as prepared by the methods described herein, is treated with the aqueous medium under one or more suitable conditions. The aqueous medium includes, but is not limited to, fresh water optionally containing sodium chloride, calcium chloride, magnesium chloride, or combination thereof or aqueous medium may be brine. In some embodiments, aqueous medium is fresh water. In some embodiments, the one or more suitable conditions include, but are not limited to, temperature, pressure, time period for setting, a ratio of the aqueous medium to the composition, and combination thereof. The temperature may be related to the temperature of the aqueous medium. In some embodiments, the temperature is in a range of 0-110° C.; or 0-60° C.; or 0-40° C.; or 25-100° C.; or 25-50° C.; or 37-100° C.; or 37-60° C. In some embodiments, the pressure is atmospheric pressure or above atm. pressure. In some embodiments, the time period for setting the cement product is 30 min. to 48 hrs; or 30 min. to 24 hrs; or 30 min. to 12 hrs; or 30 min. to 8 hrs; or 30 min. to 4 hrs; or 30 min. to 2 hrs; 2 to 48 hrs; or 2 to 24 hrs; or 2 to 12 hrs; or 2 to 8 hrs; or 2 to 4 hrs; 5 to 48 hrs; or 5 to 24 hrs; or 5 to 12 hrs; or 5 to 8 hrs; or 5 to 4 hrs; or 5 to 2 hrs; 10 to 48 hrs; or 10 to 24 hrs; or 24 to 48 hrs.

In some embodiments, the ratio of the aqueous medium to the dry components or to the composition of the invention (aqueous medium:dry components or aqueous medium:composition of the invention) is 0.1-10; or 0.1-8; or 0.1-6; or 0.1-4; or 0.1-2; or 0.1-1; or 0.2-10; or 0.2-8; or 0.2-6; or 0.2-4; or 0.2-2; or 0.2-1; or 0.3-10; or 0.3-8; or 0.3-6; or 0.3-4; or 0.3-2; or 0.3-1; or 0.4-10; or 0.4-8; or 0.4-6; or 0.4-4; or 0.4-2; or 0.4-1; or 0.5-10; or 0.5-8; or 0.5-6; or 0.5-4; or 0.5-2; or 0.5-1; or 0.6-10; or 0.6-8; or 0.6-6; or 0.6-4; or 0.6-2; or 0.6-1; or 0.8-10; or 0.8-8; or 0.8-6; or 0.8-4; or 0.8-2; or 0.8-1; or 1-10; or 1-8; or 1-6; or 1-4; or 1-2; or 1:1; or 2:1; or 3:1.

In some embodiments, the composition may be rinsed with fresh water to remove halite or the chloride content from the composition. The chloride may be undesirable in some applications, for example, in aggregates intended for use in concrete since the chloride may have a tendency to corrode rebar. Further, the rinsing of the slurry or the composition with water may cause the vaterite in the composition to shift to more stable forms such as aragonite and result in the cemented material. For example, the cementing composition can be kept in the saltwater until before use and is rinsed with fresh water that may remove the halite from the composition and facilitate the formation of the cemented material.

In some embodiments, such rinsing may not be desirable as it may reduce the yield of the composition. In such embodiments, the precipitate may be washed with a solution having a low chloride concentration but high concentration of divalent cations (such as, calcium, magnesium, etc.). Such high concentration of the divalent ion may prevent the dissolution of the composition, thereby reducing the yield loss and the conversion to cemented material.

During the mixing of the composition with the aqueous medium, the composition may be subjected to high shear mixer. After mixing, the composition may be dewatered again and placed in pre-formed molds to make formed building materials. Alternatively, the composition may be mixed with water and is allowed to set. The composition sets over a period of days and is then placed in the oven for drying, e.g., at 40° C., or from 40° C.-60° C., or from 40° C.-50° C., or from 40° C.-100° C., or from 50° C.-60° C., or from 50° C.-80° C., or from 50° C.-100° C., or from 60° C.-80° C., or from 60° C.-100° C. The composition is then subjected to curing at high temperature, such as, from 50° C.-60° C., or from 50° C.-80° C., or from 50° C.-100° C., or from 60° C.-80° C., or from 60° C.-100° C., or 60° C., or 80° C.-100° C., in high humidity, such as, in 30%, or 40%, or 50%, or 60% humidity.

The cement product produced by the methods described above may be an aggregate or building material or a pre-cast material or a formed building material. These materials have been described herein.

C. Products

In one aspect, there are provided building materials comprising the cementitious composition of the invention and the reinforced material. In one aspect, there is provided a building material formed from the cementitious composition of the invention and the reinforced material. Examples of such structures or the building materials include, but are not limited to, building, driveway, foundation, kitchen slab, furniture, pavement, road, bridges, motorway, overpass, parking structure, brick, block, wall, footing for a gate, fence, or pole, and combination thereof. Since these structures or building materials comprise and/or are produced from the compositions of the invention, they may include markers or components that identify them as being obtained from carbon dioxide of fossil fuel origin ($\delta^{13}C$ value) and/or being obtained from water having trace amounts of various elements present in the initial salt water source, as described herein.

In one aspect, there are provided formed building materials comprising the cementitious composition of the invention and the reinforced material. In some embodiments, the formed building material is formed from the compositions of the invention. The formed building material may be a pre-cast building material, such as, a pre-cast concrete product. The formed building materials and the methods of making and using the formed building materials are described in U.S. application Ser. No. 12/571,398, filed Sep. 30, 2009, which is incorporated herein by reference in its entirety. The formed building materials of the invention may vary greatly and include materials shaped (e.g., molded, cast, cut, or otherwise produced) into man-made structures with defined physical shape, i.e., configuration. Formed building materials are distinct from amorphous building materials (e.g., powder, paste, slurry, etc.) that do not have a defined and stable shape, but instead conform to the container in which they are held, e.g., a bag or other container. Formed building materials are also distinct from irregularly or imprecisely formed materials (e.g., aggregate, bulk forms for disposal, etc.) in that formed building materials are produced according to specifications that allow for use of formed building materials in, for example, buildings. Formed building materials may be prepared in accordance with traditional manufacturing protocols for such structures, with the exception that the composition of the invention is employed in making such materials. In some embodiments, the formed building materials made from the composition of the invention have a compressive strength of at least 14 MPa; or between about 14-100 MPa; or between about 14-45 MPa; or the compressive strength of the composition of the invention after setting, and hardening, as described herein. In some embodiments, the formed building materials made from the composition of the invention have a $\delta^{13}C$ of less than −12‰; or less than −13‰; or less than −14‰; or less than −15‰; or from −15‰ to −80‰; or the $\delta^{13}C$ of the composition of the invention, as described herein.

In one aspect, there are provided methods to form formed building materials comprising mixing cementitious composition of the invention with a reinforcing material and adding water to the composition. The methods further comprise pouring the wet composition in a mold to form formed building material. In some embodiments, the wet composition includes less than 90% by wt solid material; or less than 80% by wt solid material; or less than 70% by wt solid material; or less than 60% by wt solid material; or less than 50% by wt solid material; or less than 40% by wt solid material; or less than 30% by wt solid material; or less than 20% by wt solid material; or less than 10% by wt solid material; or between 10-99% by wt solid material; or between 10-90% by wt solid material; or between 10-80% by wt solid material; or between 10-70% by wt solid material; or between 10-50% by wt solid material; or between 10-30% by wt solid material; or between 40-90% by wt solid material; or between 50-90% by wt solid material.

One example of the formed building materials is masonry units. Masonry units are formed building materials used in the construction of load-bearing and non-load-bearing structures that are generally assembled using mortar, grout, and the like. Exemplary masonry units formed from the compositions of the invention include bricks, blocks, and tiles. Bricks and blocks of the invention are polygonal structures possessing linear dimensions. Bricks are masonry units with dimensions (mm) not exceeding 337.5×225×112.5 (length×width×height). Any unit with dimensions (mm) between 337.5×225×112.5 to 2000×1000×500 (length×width×depth) is termed a "block." Structural units with dimensions (mm) exceeding 2000×1000×500 (length×width×depth) are termed "slabs." Tiles refer to masonry units that possess the same dimensions as bricks or blocks, but may vary considerably in shape, i.e., may not be polygonal (e.g., hacienda-style roof tiles).

One type of masonry unit provided by the invention is a brick, which refers to a structural unit of material used in masonry construction, generally laid using mortar. Bricks formed from the compositions of the invention are masonry units with dimensions (mm) not exceeding 337.5×225×112.5 (length×width×height). In some embodiments, the bricks may have lengths ranging from 175 to 300 mm, such as 200 to 250 mm, including 200 to 230 mm; widths ranging from 75 to 150 mm, such as 100 to 120 mm, including 100 to 110 mm; and heights ranging from 50 to 90 mm, such as 50 to 80 mm, including 55 to 75 mm. Bricks may vary in grade, class, color, texture, size, weight and can be solid, cellular, perforated, frogged, or hollow. Bricks formed from the compositions of the invention may include, but are not limited to, building brick, facing brick, load bearing brick, engineering brick, thin veneer brick, paving brick, glazed brick, firebox brick, chemical resistant brick, sewer and manhole brick, industrial floor brick, etc. The bricks may also vary in frost resistance (i.e., frost resistant, moderately frost resistant or non frost resistant), which relates to the durability of bricks in conditions where exposure to water may result in different levels of freezing and thawing. Frost resistant bricks are durable in conditions of constant exposure to water and freezing and thawing. Moderately frost resistant bricks are durable in conditions of sporadic exposure to water and freezing and thawing. Non-frost resistant bricks are not durable in conditions of exposure to water and freezing and thawing. These bricks are suitable only for internal use and are liable to damage by freezing and thawing except when protected by an impermeable cladding during construction. Bricks formed from the compositions of the invention may also vary in soluble salt content (i.e., low or normal). Percentage by mass of soluble ions in bricks with a low soluble salt content does not exceed 0.03% magnesium, 0.03% potassium, 0.03% sodium, and 0.5% sulfate. Percentage by mass of soluble ions in bricks with a normal salt content does not exceed 0.25% of magnesium, potassium, and sodium in total and sulfate content does not exceed 1.6%. The bricks may vary considerably in physical and mechanical properties. The compressive strength of bricks formed from the compositions of the invention may range, in certain instances, from 5 to 100 MPa; or 20-100 MPa; or 50-100 MPa; or 80-100 MPa; or 20-80 MPa; or 20-40 MPa; or 60-80 MPa.

The flexural strength of bricks formed from the compositions of the invention may vary, ranging from 0.5 to 10 MPa, including 2 to 7 MPa, such as 2 to 5 MPa. The maximum water absorption of bricks may vary, ranging from 5 to 25%, including 10 to 15%. Bricks formed from the compositions of the invention may also undergo moisture movement (expansion or contraction) due to the absorption or loss of water to its environment. The dimensional stability (i.e., linear shrinkage or expansion) due to moisture movement may vary, in certain instances ranging from 0.001 to 0.2%, including 0.05 to 0.1%. In some embodiments, the bricks may be used for paving a road. Bricks used to pave areas exposed to heavy traffic (e.g., pedestrian, vehicular, etc.) may have an abrasion resistance index ranging from 0.1 to 0.5, including 0.2 to 0.4, such as 0.3. In addition, bricks formed from the compositions of the invention may have a volume abrasion loss ranging from 1.0 to 4.0 $cm^3/cm^2$, including 1.5 to 2.5 $cm^3/cm^2$, or 2.0 $cm^3/cm^2$. The composition of the invention may be molded, extruded, or sculpted into the desired shape and size to form a brick. The shaped composition is then dried and further hardened by hydraulic pressure, autoclave or fired in a kiln at temperatures ranging between 900° to 1200° C., such as 900° to 1100° C. and including 1000° C.

Another type of masonry unit provided by the invention is blocks, (e.g., concrete, cement, foundation, etc.). Blocks are distinct from bricks based on their structural dimensions. Specifically, blocks exceed the dimensions (mm) of 337.5×225×112.5 (length×width×height). Blocks formed from the compositions of the invention may vary in color, texture, size, and weight and can be solid, cellular, and hollow or employ insulation (e.g., expanded polystyrene foam) in the block void volume. Blocks may be load-bearing, non-load-bearing or veneer (i.e., decorative) blocks. In some embodiments, the blocks may have lengths ranging from 300 to 500 mm, such as 350 to 450 mm, widths ranging from 150 to 250 mm, such as 180 to 215 mm and heights ranging from 100 to 250 mm, such as 150 to 200 mm. The blocks may also vary in faceshell thickness. In some instances, the blocks may have faceshell thicknesses ranging from 15 to 40 mm, including 20 to 30 mm, such as 25 mm. The blocks may also vary in web thickness. In some embodiments, the blocks may have web thicknesses ranging from 15 to 30 mm, including 15 to 25 mm, such as 20 mm. The blocks formed from the compositions of the invention may vary considerably in physical and mechanical properties. The compressive strength of blocks may vary, in certain instances ranging from 5 to 100 MPa, including 15 to 75 MPa, such as 20 to 40 MPa. The flexural strength of blocks formed from the compositions of the invention may also vary, ranging from 0.5 to 15 MPa, including 2 to 10 MPa, such as 4 to 6 MPa. The maximum water absorption of the blocks may vary, ranging from 7 to 20% by weight including 8 to 15%, such as 9 to 11%. Blocks formed from the compositions of the invention may also undergo moisture movement (expansion or contraction) due to the absorption or loss of water to its environment. Blocks may be Type I moisture-controlled units or Type II non-moisture-controlled units. The dimensional stability (i.e., linear shrinkage) of the blocks formed from the compositions of the invention may vary depending on their intended use and/or geographical location of use, in certain instances ranging from 0.02 to 0.15%, such as 0.03 to 0.05%. The composition of the invention may be molded, extruded, or sculpted into the desired shape and size to form a block. The shaped composition may be further compacted by roller compaction, hydraulic pressure, vibrational compaction, or resonant shock compaction. In some instances, the resultant composition may also be foamed using mechanically or chemically introduced gases prior to being shaped or while the composition is setting in order to form a lightweight concrete block. The composition is further cured in an environment with a controlled temperature and humidity.

Another type of building material provided by the invention is a tile. Tiles formed from the compositions of the invention refer to non-load-bearing building materials that are commonly employed on roofs and to pave exterior and interior floors of commercial and residential structures. Some examples where tiles may be employed include, but are not limited to, the roofs of commercial and residential buildings, decorative patios, bathrooms, saunas, kitchens, building foyer, driveways, pool decks, porches, walkways, sidewalks, and the like. Tiles may take on many forms depending on their intended use and/or intended geographical location of use, varying in shape, size, weight, and may be solid, webbed, cellular or hollow. Tiles formed from the compositions of the invention may vary in dimension, e.g., lengths ranging from 100 to 1000 mm, including 250 to 500 mm, such as 250 to 300 mm; widths ranging from 50 to 1000 mm, including 100 to 250 mm, such as 125 to 175 mm; and thickness ranging from 10 to 30 mm, including 15 to 25 mm, such as 15 to 20 mm. The compressive strengths of tiles formed from the compositions of the invention may also vary, in certain instances ranging from 5 to 75 MPa, including 15 to 40 MPa, such as 25 MPa. The flexural strength of tiles formed from the compositions of the invention may vary, ranging from 0.5 to 7.5 MPa, including 2 to 5 MPa, such as 2.5 MPa. The maximum water absorption of tiles may also vary, in certain instances ranging from 5 to 15%, including 7 to 12%. Tiles of the invention may also undergo moisture movement (expansion or contraction) due to the absorption or loss of water to its environment. The dimensional stability (i.e., linear shrinkage or expansion) due to moisture movement may vary, in certain instances ranging from 0.001 to 0.25%, including 0.025 to 0.075%, such as 0.05%. Tiles used to pave areas exposed to heavy traffic (e.g., pedestrian, vehicular, etc.) may have an abrasion resistance index that may vary considerably, ranging from 0.1 to 0.5, including 0.25. In addition, tiles may have a volume abrasion loss ranging from 1.0 to 4.0 $cm^3/cm^2$, including 1.5 to 3.0 $cm^3/cm^2$, such as, 2.7 $cm^3/cm^2$. Tiles may be polygonal, circular or take on any other desired shape.

As such, the composition of the invention may be molded or cast into the desired tile shape and size. The shaped composition may be further compacted by roller compaction, hydraulic pressure, vibrational compaction, or resonant shock compaction. The resultant composition may also be poured out into sheets or a roller may be used to form sheets of a desired thickness. The sheets are then cut to the desired dimensions of the tiles. In some instances, the resultant composition may also be foamed using mechanically or chemically introduced gases prior to being shaped or while the composition is setting in order to form a lightweight tile. The shaped composition is then allowed to set and further cured in an environment with a controlled temperature and humidity. Tiles may be further polished, colored, textured, shot blasted, inlaid with decorative components and the like.

Construction panels are formed building materials employed in a broad sense to refer to any non-load-bearing structural element that are characterized such that their length and width are substantially greater than their thickness. Exemplary construction panels formed from the compositions of the invention include cement boards, fiber-cement sidings, and drywall. Construction panels are polygonal structures with dimensions that vary greatly depending on their intended use. The dimensions of construction panels may range from 50 to 500 cm in length, including 100 to 300 cm, such as 250 cm; width ranging from 25 to 200 cm, including 75 to 150 cm, such as 100 cm; thickness ranging from 5 to 25 mm, including 7 to 20 mm, including 10 to 15 mm. Cement boards comprise construction panels conventionally prepared as a combination of cement and fiberglass and possess additional fiberglass reinforcement at both faces of the board. Fiber-cement sidings comprise construction panels conventionally prepared as a combination of cement, aggregate, interwoven cellulose, and/or polymeric fibers and possess a texture and flexibility that resembles wood. Drywall comprises construction panels conventionally prepared from gypsum plaster (i.e., semi-hydrous form of calcium sulfate), fibers (glass or paper) and is sandwiched between two sheets of outer material, e.g., paper or fiberglass mats.

One type of construction panel formed from the compositions of the invention is cement board. They are formed building materials where in some embodiments, are used as backer boards for ceramics that may be employed behind bathroom tiles, kitchen counters, backsplashes, etc. and may have lengths ranging from 100 to 200 cm, such as 125 to 175 cm, e.g., 150 to 160 cm; a breadth ranging from 75 to 100 cm, such as 80 to 100 cm, e.g., 90 to 95 cm, and a thickness ranging from 5 to 25 mm, e.g., 5 to 15 mm, including 5 to 10 mm. Cement boards of the invention may vary in physical and mechanical properties. In some embodiments, the flexural strength may vary, ranging between 1 to 7.5 MPa, including 2 to 6 MPa, such as 5 MPa. The compressive strengths may also vary, ranging from 5 to 50 MPa, including 10 to 30 MPa, such as 15 to 20 MPa. In some embodiments of the invention, cement boards may be employed in environments having extensive exposure to moisture (e.g., commercial saunas). The maximum water absorption of the cement boards of the invention may vary, ranging from 5 to 15% by weight, including 8 to 10%, such as 9%. Cement boards formed from the compositions of the invention may also undergo moisture movement (expansion or contraction) due to the absorption or loss of water to its environment. The dimensional stability (i.e., linear shrinkage or expansion) due to moisture movement may vary, in certain instances ranging from 0.035 to 0.1%, including 0.04 to 0.08%, such as 0.05 to 0.06%. The composition of the invention may be used to produce the desired shape and size to form a cement board. In addition, a variety of further components may be added to the cement boards which include, but are not limited to, plasticizers, foaming agents, accelerators, retarders and air entrainment additives. The composition is then poured out into sheet molds or a roller may be used to form sheets of a desired thickness. The shaped composition may be further compacted by roller compaction, hydraulic pressure, vibrational compaction, or resonant shock compaction. The sheets are then cut to the desired dimensions of the cement boards. In some instances, the resultant composition may also be foamed using mechanically or chemically introduced gases prior to being shaped or while the composition is setting in order to form a lightweight cement board. The shaped composition is then allowed to set and further cured in an environment with a controlled temperature and humidity. The cement boards formed from the compositions of the invention then may be covered in a fiberglass mat on both faces of the board. Where desired, the cement boards formed from the compositions of the invention may also be prepared using chemical admixtures such that they possess increased fire, water, and frost resistance as well as resistance to damage by bio-degradation and corrosion. The cement board may also be combined with components such as dispersed glass fibers, which may impart improved durability, increased flexural strength, and a smoother surface.

Another type of construction panel provided by the invention is fiber-cement siding. Fiber-cement sidings formed from the compositions of the invention are formed building materials used to cover the exterior or roofs of buildings and include, but are not limited to, building sheets, roof panels, ceiling panels, eternits, and the like. They may also find use as a substitute for timber fascias and barge boards in high fire areas. Fiber-cement sidings may have dimensions that vary, ranging from 200 to 400 cm in length, e.g., 250 cm and 50 to 150 cm in width, e.g., 100 cm and a thickness ranging from 4 to 20 mm, e.g., 5 to 15 mm, including 10 mm. Fiber-cement sidings formed from the compositions of the invention may possess physical and mechanical properties that vary. In some embodiments, the flexural strength may range between 0.5 to 5 MPa, including 1 to 3 MPa, such as 2 MPa. The compressive strengths may also vary, in some instances ranging from 2 to 25 MPa, including 10 to 15 MPa, such as 10 to 12 MPa. In some embodiments of the invention, fiber-cement sidings may be employed on buildings that are subject to varying weather conditions, in some embodiments ranging from extremely arid to wet (i.e., low to high levels of humidity). Accordingly, the maximum water absorption of the fiber-cement sidings of the invention may vary, ranging from 10 to 25% by mass, including 10 to 20%, such as 12 to 15%. The dimensional stability (i.e., linear shrinkage or expansion) due to moisture movement may vary, in certain instances ranging from 0.05 to 0.1%, including 0.07 to 0.09%. The composition of the invention may be used to produce the desired shape and size to form a fiber-cement siding. In addition, a variety of further components may be added to the fiber-cement sidings which include, but are not limited to, cellulose fibers, plasticizers, foaming agents, accelerators, retarders and air entrainment additives. The composition is then poured into sheet molds or a roller is used to form sheets of a desired thickness. The shaped composition may be further compacted by roller compaction, hydraulic pressure, vibrational compaction, or resonant shock compaction. The sheets are then cut to the desired dimensions of the fiber-cement sidings. In some instances, the resultant composition may also be foamed using mechanically or chemically introduced gases prior to being shaped or while the composition is setting in order to form a lightweight fiber-cement siding. The shaped composition is then allowed to set and further cured in an environment with a controlled temperature and humidity. The fiber-cement sidings of the invention may then be covered with a polymeric film, enamel or paint. Where desired, the fiber-cement sidings formed from the compositions of the invention may also be prepared using chemical admixtures such that they possess increased fire, water, and frost resistance as well as resistance to damage by bio-degradation and corrosion.

Another type of construction panel formed from the compositions of the invention is drywall. The term drywall refers to the commonly manufactured building material that is used to finish construction of interior walls and ceilings. In certain instances, drywall building materials are panels that are made of a paper liner wrapped around an inner core. The inner core of drywall of the invention will include at least some amount of the composition of the invention. The dimensions of the drywall building materials of the invention may vary, in certain instances ranging from 100 to 200 cm, such as 125 to 175 cm, e.g., 150 to 160 cm in length; ranging from 75 to 100 cm, such as 80 to 100 cm, e.g., 90 to 95 cm in breadth, and ranging from 5 to 50 mm, e.g., 5 to 30 mm, including 10 to 25 mm in thickness. Drywall provided by the invention may possess physical and mechanical properties that vary considerably, and may depend upon the amount of the conventional constituents of drywall preparation that are replaced with the composition of the invention. The flexural and compressive strengths of drywall provided by the invention are generally larger than conventional drywall prepared with gypsum plaster, which is known to be a soft construction material. In some embodiments, the flexural strength may range between 0.1 to 3 MPa, including 0.5 to 2 MPa, such as 1.5 MPa. The compressive strengths may also vary, in some instances ranging from 1 to 20 MPa, including 5 to 15 MPa, such as 8 to 10 MPa. The maximum water absorption of drywall of the invention may vary, ranging from 2 to 10% by mass, including 4 to 8%, such as 5%. In certain embodiments, the inner core will be analogous to a conventional drywall core which is made primarily from gypsum plaster (the semi-hydrous form of calcium sulfate ($CaSO_4 \cdot \frac{1}{2}H_2O$), with at least a portion of the gypsum component replaced with the composition of the invention. In addition, the core may include a variety of further components, such as, but not limited to, fibers (e.g., paper and/or fiberglass), plasticizers, foaming agents, accelerators, e.g., potash, retarders, e.g., EDTA or other chelators, various additives that increase mildew and fire resistance (e.g., fiberglass or vermiculite), and water. The portion of components replaced with the composition of the invention may vary, and in certain instances is 5% by weight or more, including 10% by weight or more, 25% by weight or more, 50% by weight or more, 75% by weight or more, 90% by weight or more, or even 100% by weight. In producing the drywall, the core components may be combined and the resultant composition sandwiched between two sheets of outer material, e.g., heavy paper or fiberglass mats. When the core sets and is dried in a large drying chamber, the sandwich becomes rigid and strong enough for use as a building material.

Another building material formed from the compositions of the invention is a conduit. Conduits are tubes or analogous structures configured to convey a gas or liquid, from one location to another. Conduits of the invention can include any of a number of different structures used in the conveyance of a liquid or gas that include, but are not limited to, pipes, culverts, box culverts, drainage channels and portals, inlet structures, intake towers, gate wells, outlet structures, and the like. Conduits of the invention may vary considerably in shape, which is generally determined by hydraulic design and installation conditions. Shapes of conduits of the invention may include, but are not limited to circular, rectangular, oblong, horseshoe, square, etc. Multiple cell configurations of conduits are also possible. Conduit design may vary depending on its intended use. As such, conduits formed from the compositions of the invention may have dimensions that vary considerably. Conduits may have outer diameters which range in length from 5 to 500 cm or longer, such as 10 to 300 cm, e.g., 25 to 250 cm. The wall thicknesses may vary considerably, ranging in certain instances from 0.5 to 25 cm or thicker, such as 1 to 15 cm, e.g., 1 to 10 cm. In certain embodiments, conduits may be designed in order to support high internal pressure from water flow within the conduit. In yet other embodiments, conduits formed from the compositions of the invention may be designed to support high external loadings (e.g., earth loads, surface surcharge loads, vehicle loads, external hydrostatic pressures, etc.). Accordingly, the compressive strength of the walls of conduits of the invention may also vary, depending on the size and intended use of the conduit, in some instances ranging, from 5 to 75 MPa, such as 10 to 50 MPa, e.g., 15 to 40 MPa. Where desired, the conduits may be employed with various coatings or liners (e.g., polymeric), and may be configured for easy joining with each other to produce long conveyance structures made up of multiple conduits of the invention. In producing conduits of the invention, the composition after combining with water is poured into a mold in order to form the desired conduit shape and size. The shaped composition may be further compacted by roller compaction, hydraulic pressure, vibrational compaction, or resonant shock compaction. In some instances, the resultant composition may also be foamed using mechanically or chemically introduced gases prior to being shaped or while the composition is setting in order to form a lightweight conduit structure. The shaped composition is further allowed to set and is cured in an environment with a controlled temperature and humidity. In addition, the conduits of the invention may include a variety of further components, such as, but not limited to, plasticizers, foaming agents, accelerators, retarders and air entrainment additives. Where desired, the further components may include chemical admixtures such that the conduits of the invention possess increased resistance to damage by bio-degradation, frost, water, fire and corrosion. In some embodiments, the conduits formed from the compositions of the invention may employ structural support components such as, but not limited to, cables, wires and mesh composed of steel, polymeric materials, ductile iron, aluminum or plastic.

Another building material formed from the compositions of the invention is basins. The term basin may include any configured container used to hold a liquid, such as water. As such, a basin may include, but is not limited to structures such as wells, collection boxes, sanitary manholes, septic tanks, catch basins, grease traps/separators, storm drain collection reservoirs, etc. Basins may vary in shape, size, and volume capacity. Basins may be rectangular, circular, spherical, or any other shape depending on its intended use. In some embodiments, basins may possess a greater width than depth, becoming smaller toward the bottom. The dimensions of the basin may vary depending on the intended use of the structure (e.g., from holding a few gallons of liquid to several hundred or several thousand or more gallons of liquid). The wall thicknesses may vary considerably, ranging in certain instances from 0.5 to 25 cm or thicker, such as 1 to 15 cm, e.g., 1 to 10 cm. Accordingly, the compressive strength may also vary considerably, depending on the size and intended use of the basin, in some instances ranging, from 5 to 60 MPa, such as 10 to 50 MPa, e.g., 15 to 40 MPa. In some embodiments, the basin may be designed to support high external loadings (e.g., earth loads, surface surcharge loads, vehicle loads, etc.). In certain other embodiments, the basins may be employed with various coatings or liners (e.g., polymeric), and may be configured so that they may be combined with conveyance elements (e.g., drainage pipe). In other embodiments, basins may be configured so that they may be connected to other basins so that they may form a connected series of basins. In producing basins, the composition after combining with water may be poured into a mold to form the desired basin shape and size. The shaped composition may be further compacted by roller compaction, hydraulic pressure, vibrational compaction, or resonant shock compaction. The basins may also be prepared by pouring the composition into sheet molds and the basins further assembled by combining the sheets together to form basins with varying dimensions (e.g., polygonal basins, rhomboidal basins, etc.). In some instances, the resultant composition may also be foamed using mechanically or chemically introduced gases prior to being shaped or while the composition is setting in order to form a lightweight basin structure. The shaped composition is further allowed to set and is cured in an environment with a controlled temperature and humidity. In addition, the basins formed from the compositions of the invention may include a variety of further components, such as, but not limited to, plasticizers, foaming agents, accelerators, retarders and air entrainment additives. Where desired, the further components may include chemical admixtures such that the basins of the invention possess increased resistance to damage by bio-degradation, frost, water, fire and corrosion. In some embodiments, the basins of the invention may employ structural support components such as, but not limited to, cables, wires and mesh composed of steel, polymeric materials, ductile iron, aluminum or plastic.

Another building material formed from the compositions of the invention is a beam, which, in a broad sense, refers to a horizontal load-bearing structure possessing large flexural and compressive strengths. Beams may be rectangular cross-shaped, C-channel, L-section edge beams, I-beams, spandrel beams, H-beams, possess an inverted T-design, etc. Beams of the invention may also be horizontal load-bearing units, which include, but are not limited to joists, lintels, archways and cantilevers. Beams generally have a much longer length than their longest cross-sectional dimension, where the length of the beam may be 5-fold or more, 10-fold or more, 25-fold or more, longer than the longest cross-sectional dimension. Beams formed from the compositions of the invention may vary in their mechanical and physical properties. For example, unreinforced concrete beams may possess flexural capacities that vary, ranging from 2 to 25 MPa, including 5 to 15 MPa, such as 7 to 12 MPa and compressive strengths that range from 10 to 75 MPa, including 20 to 60 MPa, such as 40 MPa. Structurally reinforced concrete beams may possess considerably larger flexural capacities, ranging from 15 to 75 MPa, including as 25 to 50 MPa, such as 30 to 40 MPa and compressive strengths that range from 35 to 150 MPa, including 50 to 125 MPa, such as 75 to 100 MPa. The beams formed from the compositions of the invention may be internal or external, and may be symmetrically loaded or asymmetrically loaded. In some embodiments, beams may be composite, wherein it acts compositely with other structural units by the introduction of appropriate interface shear mechanisms. In other embodiments, beams may be non-composite, wherein it utilizes the properties of the basic beam alone. In producing beams of the invention, the composition of the invention after mixing with water may be poured into a beam mold or cast around a correlated steel reinforcing beam structure (e.g., steel rebar). In some embodiments, the steel reinforcement is pretensioned prior to casting the composition around the steel framework. In other embodiments, beams of the invention may be cast with a steel reinforcing cage that is mechanically anchored to the concrete beam. The beams of the invention may also employ additional structural support components such as, but not limited to cables, wires and mesh composed of steel, ductile iron, polymeric fibers, aluminum or plastic. The structural support components may be employed parallel, perpendicular, or at some other angle to the carried load. The molded or casted composition may be further compacted by roller compaction, hydraulic pressure, vibrational compaction, or resonant shock compaction. The composition is further allowed to set and is cured in an environment with a controlled temperature and humidity. In addition, the beams of the invention may include a variety of further components, such as but not limited to, plasticizers, foaming agents, accelerators, retarders and air entrainment additives. Where desired, the further components may include chemical admixtures such that the beams of the invention possess increased resistance to damage by bio-degradation, frost, water, fire and corrosion.

Another building material formed from the compositions of the invention is a column, which, in a broad sense, refers to a vertical load-bearing structure that carries loads chiefly through axial compression and includes structural elements such as compression members. Other vertical compression members of the invention may include, but are not limited to, pillars, piers, pedestals, or posts. Columns formed from the compositions of the invention may be rigid, upright supports, composed of relatively few pieces. Columns may also be decorative pillars having a cylindrical or polygonal, smooth or fluted, tapered or straight shaft with a capital and usually a base, among other configurations. The capital and base of the column may have a similar shape as the column or may be different. Any combination of shapes for the capital and base on a column are possible. Polygonal columns formed from the compositions of the invention possess a width that is not more than four times its thickness. Columns formed from the compositions of the invention may be constructed such that they are solid, hollow (e.g., decorative columns), reinforcement filled, or any combination thereof. Columns can be short columns (i.e., columns where strength is governed by construction components and the geometry of its cross section) or slender columns (i.e., cross-sectional dimensions that are less than 5 times its length). The dimensions of the column may vary greatly depending on the intended use of the structure, e.g., from being less than a single story high, to several stories high or more, and having a corresponding width. Columns may vary in their mechanical and physical properties.

Properties such as compressive and flexural strengths may vary depending on the design and intended use of the column. For example, unreinforced concrete columns may possess flexural strengths that range from 2 to 20 MPa, including 5 to 15 MPa, such as 7 to 12 MPa and compressive strengths that range from 10 to 100 MPa, including 25 to 75 MPa, such as 50 MPa. Structurally reinforced concrete columns of the invention may possess considerably larger flexural strengths, ranging from 15 to 50 MPa, including 20 to 40 MPa, such as 25 to 35 MPa and compressive strengths that range from 25 to 200 MPa, including 50 to 150 MPa, such as 75 to 125 MPa. In some embodiments, columns may be composite, wherein it may act compositely with other structural units by the introduction of interfacial shear mechanisms. In other embodiments, columns may be non-composite, wherein it utilizes the properties of the basic column alone. In producing columns of the invention, the composition after combination with water may be poured into a column form or cast around a correlated steel reinforcing column structure (e.g., steel rebar). In some embodiments, the steel reinforcement is pre-tensioned prior to casting the composition around the steel framework. In other embodiments, columns of the invention may be cast with a steel reinforcing cage that is mechanically anchored to the concrete column. The columns of the invention may also employ additional structural support components such as, but not limited to, cables, wires and mesh composed of steel, ductile iron, polymeric fibers, aluminum or plastic. The structural support components may be employed parallel, perpendicular, or at some other angle to the carried load. The molded or casted composition may be further compacted by roller compaction, hydraulic pressure, vibrational compaction, or resonant shock compaction. The composition is further allowed to set and is cured in an environment with a controlled temperature and humidity. In addition, the columns of the invention may include a variety of additional components, such as but not limited to, plasticizers, foaming agents, accelerators, retarders and air entrainment additives. Where desired, these additional components may include chemical admixtures such that the columns of the invention possess increased resistance to damage by bio-degradation, frost, water, fire and corrosion.

Another building material formed from the compositions of the invention is a concrete slab. Concrete slabs are those building materials used in the construction of prefabricated foundations, floors and wall panels. In some instances, a concrete slab may be employed as a floor unit (e.g., hollow plank unit or double tee design). In other instances, a precast concrete slab may be a shallow precast plank used as a foundation for in-situ concrete formwork. Wall panels are, in a broad sense, vertical load-bearing members of a building that are polygonal and possess a width that is more than four times its thickness. Precast concrete foundation, floors and wall panels may vary considerably in dimension depending on the intended use of the precast concrete slab (e.g., one or two story building). As such, precast concrete slabs may have dimensions which range from 1 to 10 m in length or longer, including 3 to 8 m, such as 5 to 6 m; height that ranges from 1 to 10 m or taller, including 4 to 10 m, such as 4 to 5 m; and a thickness that may range from 0.005 to 0.25 m or thicker, including 0.1 to 0.2 m such as 0.1 to 0.15 m. Formed building materials such as slabs, and structures made therefrom, may be thicker than corresponding structures that lack components of the composition of the invention. In addition, structures made from amorphous building materials formed from the composition of the invention may be thicker than corresponding structures that are not formed from the composition of the invention.

In some embodiments, thickness of formed building materials or related structures is increased by 1.5 fold or more, 2-fold or more, or 5-fold or more. Concrete slabs formed from the compositions of the invention may vary in their mechanical and physical properties depending on their intended use. For example, a prefabricated slab that is employed in a floor unit may possess larger flexural strengths and lesser compressive strengths than a slab that is employed as a load-bearing wall. For example, unreinforced concrete slabs may possess flexural strengths that vary, ranging from 2 to 25 MPa, including 5 to 15 MPa, such as 7 to 12 MPa and compressive strengths that range from 10 to 100 MPa, including 25 to 75 MPa, such as 50 MPa. Structurally reinforced concrete slabs of the invention may possess considerably larger flexural strengths, ranging from 15 to 50 MPa, including 20 to 40 MPa, such as 25 to 35 MPa and compressive strengths that range from 25 to 200 MPa, including 50 to 150 MPa, such as 75 to 125 MPa. In producing concrete slabs, the composition after combination with water may be poured into a slab mold or cast around a correlated steel reinforcing structure (e.g., steel rebar). In some embodiments, the steel reinforcement is pretensioned prior to casting the composition around the steel framework. In other embodiments, slabs of the invention may be cast with a steel reinforcing cage that is mechanically anchored to the concrete slab. In some embodiments, the concrete slabs of the invention may improve its structural capacity by casting a second, supportive concrete layer that is mechanically anchored to the previously precast concrete slab. The slabs formed from the compositions of the invention may also employ additional structural support components such as, but not limited to, cables, wires and mesh composed of steel, ductile iron, polymeric fibers, aluminum or plastic. The structural support components may be employed parallel, perpendicular, or at some other angle to the carried load.

The molded or casted composition may be further compacted by roller compaction, hydraulic pressure, vibrational compaction, or resonant shock compaction. The composition is further allowed to set and is cured in an environment with a controlled temperature and humidity. In addition, the slabs of the invention may include a variety of further components, such as but not limited to, plasticizers, foaming agents, accelerators, retarders and air entrainment additives. Where desired, the further components may include chemical admixtures such that the slabs formed from the compositions of the invention possess increased resistance to damage by bio-degradation, frost, water, fire and corrosion.

Another building material formed from the compositions of the invention is an acoustic barrier, which refers to a structure used as a barrier for the attenuation or absorption of sound. As such, an acoustic barrier may include, but is not limited to, structures such as acoustical panels, reflective barriers, absorptive barriers, reactive barriers, etc. Acoustic barriers formed from the compositions of the invention may widely vary in size and shape. Acoustic barriers may be polygonal, circular, or any other shape depending on its intended use. Acoustic barrier may be employed in the attenuation of sound from highways, roadways, bridges, industrial facilities, power plants, loading docks, public transportation stations, military facilities, gun ranges, housing complexes, entertainment venues (e.g., stadiums, concert halls) and the like. Acoustic barriers may also be employed for sound insulation for the interior of homes, music studios, movie theaters, classrooms, etc. The acoustic barriers formed from the compositions of the invention may have dimensions that vary greatly depending on its intended use, ranging from 0.5 to 10 m in length or longer, e.g., 5 m and 0.1 to 10 m in height/width or wider, e.g., 5 m and a thickness ranging from 10 to 100 cm, or thicker e.g., 25 to 50 cm, including 40 cm. Where desired, the acoustic barrier may be employed with various coatings or liners (e.g., polymeric), and may be configured for easy joining with each other or pillars separating additional acoustic barriers to produce long acoustic barrier structures made up of multiple acoustic barriers of the invention. In some embodiments, acoustic barriers formed from the compositions of the invention may employ sound absorptive material (e.g., wood shavings, textile fibers, glass wool, rock wool, polymeric foam, vermiculite, etc.) in addition to a structurally reinforcing framework. In some embodiments, acoustic barriers may be used as noise-reduction barriers in an outdoor environment (e.g., along a highway, near an airport, etc.) and may be employed with structural support components (e.g., columns, posts, beams, etc.). In producing acoustic barriers of the invention, the composition of the invention after combination with water is poured into a mold to form the desired acoustic barrier shape and size. Also the composition may be poured out into a sheet mold or a roller may be used to form sheets of a desired thickness. The shaped composition may be further compacted by roller compaction, hydraulic pressure, vibrational compaction, or resonant shock compaction. The sheets are then cut to the desired dimensions of the acoustic barriers. In some instances, the resultant composition may also be foamed using mechanically or chemically introduced gases prior to being shaped or while the composition is setting in order to form a lightweight acoustic panel structure. The shaped composition is further allowed to set and is cured in an environment with a controlled temperature and humidity. In addition, the acoustic barriers of the invention may include a variety of further components, such as but not limited to, plasticizers, foaming agents, accelerators, retarders and air entrainment additives. Where desired, the further components may include chemical admixtures such that they possess increased resistance to damage by bio-degradation, frost, water, fire and corrosion. In some embodiments, the acoustic barriers of the invention may employ structural support components such as, but not limited to, cables, wires and mesh composed of steel, ductile iron, polymeric fibers, aluminum or plastic.

Another building material formed from the compositions of the invention is an insulation material, which refers to a material used to attenuate or inhibit the conduction of heat. Insulation may also include those materials that reduce or inhibit radiant transmission of heat. Insulation material may consist of one or more of the following constituents: a cementitious forming material, a dispersing agent, an air entraining agent, inert densifying particulate, a mixture of ionic and non-ionic surfactants, plasticizers, accelerators, lightweight aggregate, organic and inorganic binding agents and glass particles. In certain embodiments of the invention, an amount of cementitious forming material may be replaced by the above described composition of the invention. Binding compositions for the insulation material of the invention include a component selected from the group consisting of carbides, Gypsum powder, Blakite, nitrides, calcium carbonate, oxides, titanates, sulfides, zinc selenide, zinc telluride, inorganic siloxane compound and their mixtures thereof. In certain embodiments of the invention, an amount of the binding composition may be replaced by the above described composition of the invention. Where desired, insulation material of the invention may also be prepared using a chemical admixture or any other convenient protocol such that they are resistant to damage by termites, insects, bacteria, fungus. Etc. Insulation materials of the invention may be prepared using any convenient protocol such that they are freeze/thaw, rain and fire resistant. Insulation material of the invention may be prepared in accordance with traditional manufacturing protocols for such materials, with the exception that the composition of the invention is employed. In producing the insulation materials of the invention, an amount of the composition of the invention may be combined with water and other components of the insulation material, which may include, but are not limited to a dispersing agent, an air entraining agent, inert densifying particulate, a mixture of ionic and non-ionic surfactants, plasticizers, accelerators, lightweight aggregate, organic and inorganic binding agents and glass particles. The resultant insulation material may then be molded into the desired shape (e.g., wall panel) or poured into the void space of concrete masonry units, flooring units, roof decks or cast around pipes, conduits and basins.

In some embodiments, the formed building material such as pre-cast concrete products include, but are not limited to, bunker silo; cattle feed bunk; cattle grid; agricultural fencing; H-bunks; J-bunks; livestock slats; livestock watering troughs; architectural panel walls; cladding (brick); building trim; foundation; floors, including slab on grade; walls; double wall precast sandwich panel; aqueducts; mechanically stabilized earth panels; box culverts; 3-sided culverts; bridge systems; RR crossings; RR ties; sound walls/barriers; Jersey barriers; tunnel segments; reinforced concrete box; utillity protection structure; hand holes; hollowcore product; light pole base; meter box; panel vault; pull box; telecom structure; transformer pad; transformer vault; trench; utility vault; utility pole; controlled environment vaults; underground vault; mausoleum; grave stone; coffin; haz mat storage container; detention vaults; catch basins; manholes; aeration system; distribution box; dosing tank; dry well; grease interceptor; leaching pit; sand-oil/oil-water interceptor; septic tank; water/sewage storage tank; wetwells; fire cisterns; floating dock; underwater infrastructure; decking; railing; sea walls;

roofing tiles; pavers; community retaining wall; res. retaining wall; modular block systems; and segmental retaining walls.

In one aspect, there are provided ceramic compositions comprising the cementitious composition of the invention and the reinforced material. Conventionally ceramic material is prepared by action of heat and subsequent cooling of an inorganic solid. Ceramic material typically is a strong material however, it is brittle in nature. The ceramic composition of the invention does not require high heating and cooling steps. Further, the ceramic composition of the invention is strong and non-brittle. The reinforced material in the ceramic composition of the invention imparts fracture toughness to the material such that the material is not brittle. The ceramic composition of the invention is also strong due to strong bond formed after cementation. The ceramic composition of the invention may be used to make formed building materials such as tiles or materials that mimic synthetic marble or limestone. The ceramic composition of the invention may be coated with materials such as epoxy coating to provide glossy and smooth surface.

In some embodiments, the composition is used for non-cementitious products such as, but not limited to, paper product, polymer product, lubricant, adhesive, rubber product, chalk, asphalt product, paint, abrasive for paint removal, personal care product, cosmetic, cleaning product, personal hygiene product, ingestible product, agricultural product, soil amendment product, pesticide, environmental remediation product, and combination thereof. Such use of calcium carbonate containing compositions in non-cementitious products is described in U.S. Pat. No. 7,829,053, issued Nov. 9, 2010, which is incorporated herein by reference in its entirety.

D. Systems

In some embodiments, the invention provides systems configured to perform the methods of the invention. In some embodiments, a system that includes a concrete producing station that is configured to accept the cementitious composition of the invention is provided. The cement producing station may be a mixing tank, pipe or a conduit. In some such embodiments, a reinforcing material source is provided which provides reinforcing material to the system. In such embodiments, the system accepts concrete from the concrete producing station and reinforcing material from the reinforcing material source and produces a concrete composition suitable for structural building applications. In some embodiments, the system includes an aggregate source that is connected to the cement producing station. In some embodiments, the aggregate source provides aggregate to the cement producing station in which the aggregate includes at least 80 wt % carbonate mineral and has a $\delta^{13}C$ value less than $-10‰$.

In some embodiments, the cement producing station is configured to produce the cementitious composition using carbon dioxide from a carbon dioxide source, alkaline solution from an alkali source, and divalent cations from a divalent cation source. Such sources have been described herein. In some embodiments, the system further includes an alkali source operably connected to the cement producing station configured to electrochemically produce the alkaline solution The following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Various modifications of the invention in addition to those described herein will become apparent to those skilled in the art from the foregoing description and accompanying figures. Such modifications fall within the scope of the appended claims. Efforts have been made to ensure accuracy with respect to numbers used (e.g. amounts, temperature, etc.) but some experimental errors and deviations should be accounted for. Unless indicated otherwise, parts are parts by weight, molecular weight is weight average molecular weight, temperature is in degrees Centigrade, and pressure is at or near atmospheric.

EXAMPLES

Example 1

Figure 9:
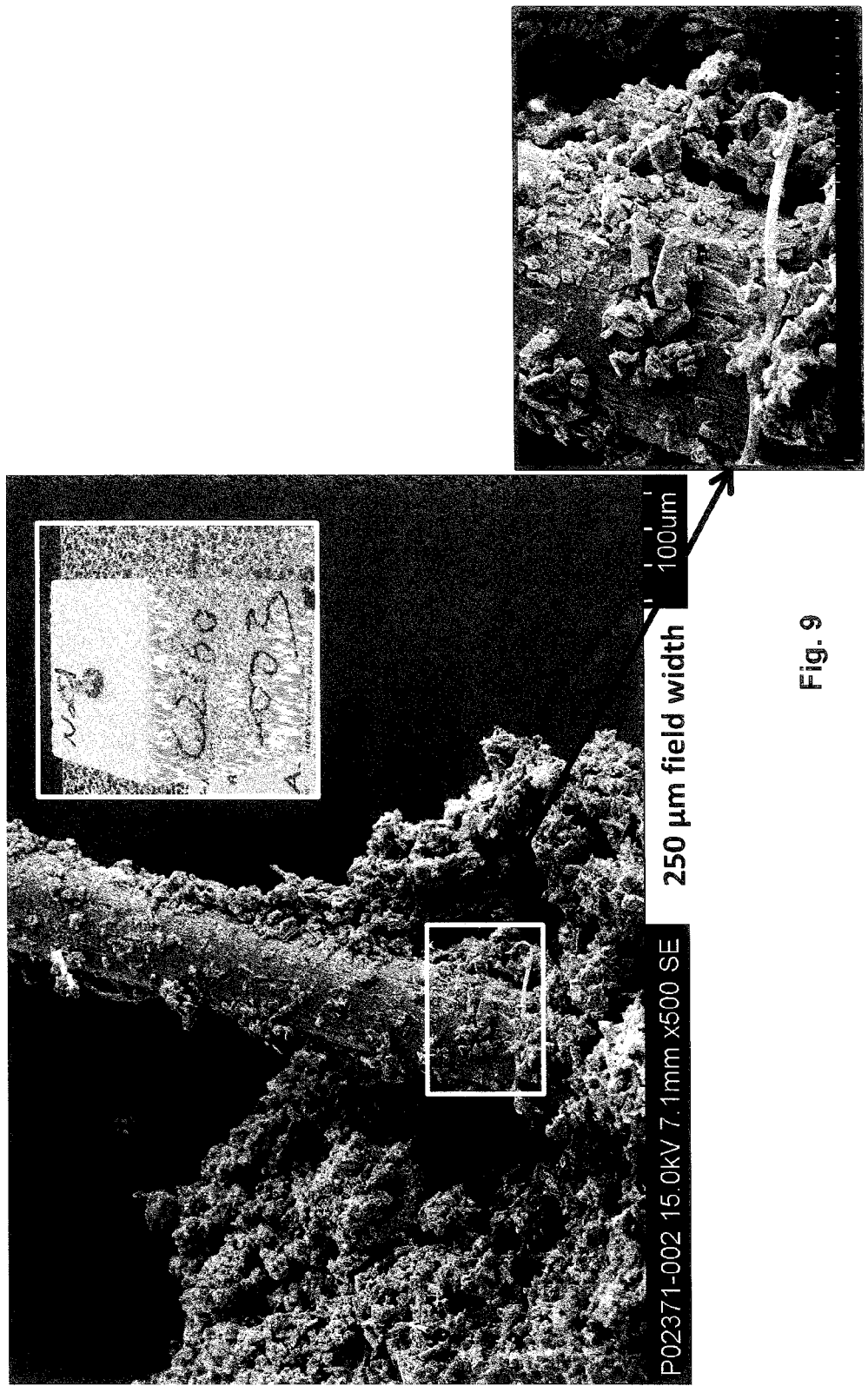
FIG. 9 illustrates Scanning Electron Image (SEM image) of the composition, as described in Example 1.

In this experiment, the effect of fiber on the properties of the cementitious composition of the invention, was studied. The calcium carbonate composition was made by absorbing carbon dioxide from flue gas in sodium hydroxide solution which solution was then treated with calcium chloride to form calcium carbonate precipitate. The precipitate was dewatered and dried to form the calcium carbonate composition. In one sample, a paste of calcium carbonate composition with 0.5% polyvinyl alcohol fiber (100% calcium carbonate composition +0.5% fiber (polyvinyl alcohol fibers (PVA RECS7) from Nycon)) was prepared by adding water to the composition. In another sample, a mortar containing 23% calcium carbonate composition, 77% sand, and 0.5% fiber was prepared by adding water to the mixed composition. The paste and the mortar were then allowed to set. FIG. 9 is a SEM image of the set paste and illustrates that the fiber bonded well with the surrounding matrix and the crystals were formed on the fiber. The inset in the figure shows a cube made from the paste of the composition containing fiber. A nail could be screwed into the cube without cracking the cube showing the fracture/impact toughness. The experiment demonstrates that the fiber can improve the mechanical properties of the composition of the invention such as, fracture/impact toughness, flexural strength, acid/abrasion resistance, and durability. The compressive strength of the set composition (for both paste and mortar) was found to be comparable to the compressive strength of the set composition without the fiber illustrating that the fiber did not negatively affect the compressive strength of the composition.

Example 2

In this experiment, the compositions containing reinforced material and the carbonate composition were formed and the effect of the reinforced material on the properties of the cementitious composition of the invention, were studied.

Calcium Carbonate Cement Production

The calcium carbonate cement was produced by a process, Mineralization by Aqueous Precipitation (MAP) process. In the MAP process, raw flue gas from a natural gas power plant containing $CO_2$ was contacted with an aqueous alkaline solution in an absorber, forming a carbonated solution. The carbonated solution was then contacted with an aqueous $CaCl_2$ solution with $NaSO_4$ added as a stabilizer, resulting in the precipitation of metastable $CaCO_3$ containing vaterite, which was subsequently dewatered and dried yielding the final cement powder. Characterization of the cement power in terms of mineralogy, composition, particle morphology and distribution are shown in Tables 1-3 and FIG. 10.

TABLE 1

Phase composition of the carbonate cement

| Phase | Amount in Sample (weight %) |
|---|---|
| Vaterite | 83 |
| Calcite | 17 |

TABLE 2

Chemical composition of the carbonate cement

| Oxide | Amount in Sample (weight %) |
|---|---|
| $SiO_2$ | 0.2 |
| CaO | 54.5 |
| MgO | 0.4 |
| SrO | 0.1 |
| $SO_3$ | 0.5 |
| LOI* | 44.3 |
| Moisture | 0.9 |

*LOI is mass lost on ignition to 950° C.

TABLE 3

Mean particle size (PS) and standard deviation (STD) of the carbonate cement

| Mean PS | 21.4 μm |
|---|---|
| STD | 7.4 μm |

Fiber-Reinforced Calcium Carbonate Cement Sample Preparation

The formulations were made in the forms of paste (100% cement) with different vol % and types of microfiber addition. The 8 mm PVA fiber was obtained from Nycon-PVA RECS15; the 19 mm PVA fiber was obtained from Nycon-PVA RFS400; the 30 mm PVA fiber was obtained from Nycon-PVA RF4000; and the 19 mm polypropylene fiber was obtained from Nycon-ProCon-M. The materials were mixed with $MgCl_2$ solution at water-to-cement ratio of 0.4 in a Hobart mixer for 5 mins. The mixed materials were then cast into 3×3×11 in beams and then cured in a 60° C., 100% RH chamber for 1 day. At 1 day of reaction, the test beams had set with about 45% of the vaterite contained in the cement transformed to aragonite. The test beams were then demolded and cured in $MgCl_2$ solution bath at 60° C. for 6 days. At 7 day of reaction, the majority of the vaterite contained in the cement had transformed to aragonite and the test beams were dried in a 100° C. oven for 24 hours and stored at a 40° C. oven until testing. The fiber-reinforced calcium carbonate cement formulations are listed in Table 4.

For compressive strength testing, following protocol was followed. The formulations were in the forms of paste (100% cement) with different vol % and types of microfiber addition (Table 4). The materials were mixed with $MgCl_2$ solution at a water-to-cement 0.4 in a Hobart mixer for 5 mins. The mixed materials were then cast into 2×2×2 in cubes and 3×3×11 in beams and then cured in a 60 C, 100% RH chamber for 1 day. Compressive strength testing was performed on the fiber-reinforced calcium carbonate cement formulations following ASTM C 109, which measured the compressive strength of the test cubes through loading device at a controlled loading rate (200-400 lbs/sec). Compressive strength was tested at 1 and 7 days. The test cubes were dried in a 100° C. oven for 24 hours before testing.

TABLE 4

Fiber-reinforced calcium carbonate cement formulations

| Fiber Type | Fiber Length | Fiber Dosage | Compressive strength (psi) 1 D | 7 D |
|---|---|---|---|---|
| Cement only | N/A | N/A | 3700 | 3900 |
| Polyvinyl Alcohol | 8 mm | 0.5 vol % | 3200 | 3200 |
| Polyvinyl Alcohol | 8 mm | 1 vol % | 3200 | 3500 |
| Polyvinyl Alcohol | 19 mm | 0.5 vol % | 3200 | 3400 |
| Polyvinyl Alcohol | 19 mm | 1 vol % | 3100 | 3150 |
| Polyvinyl Alcohol | 30 mm | 0.5 vol % | 3500 | 3500 |
| Polyvinyl Alcohol | 30 mm | 1 vol % | 3000 | 3100 |
| Hybrid PVA fiber | 0.53% 30 mm, 0.33% 19 mm, 0.13% 8 mm | 0.5 vol % | 2900 | 2500 |
| Hybrid PVA fiber | 0.8% 30 mm, 0.5% 19 mm, 0.2% 8 mm | 1 vol % | 2800 | 2900 |
| Polypropylene fiber | 19 mm | 0.5 vol % | 3000 | 3500 |
| Polypropylene fiber | 19 mm | 1 vol % | 3300 | 3700 |

Fiber-Reinforced Calcium Carbonate Cement Sample Testing

Flexural properties testing is performed on the fiber-reinforced calcium carbonate cement formulations loosely following ASTM C 1609, which measures flexural strength of the test beams through third-point loading at constant crosshead motion (0.001 in./sec) with a deflection measuring and recording device.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method for forming a cement or concrete composition, comprising:
    combining a cementitious composition wherein the cementitious composition comprises a metastable component selected from the group consisting of vaterite, amorphous calcium carbonate, and combination thereof, with a reinforcing material wherein the reinforcing material is selected from the group consisting of aluminum, glass fiber, carbon fiber, ceramics, polymer, grass, grass product, wood product, fiber-reinforced plastic, epoxy coated rebar, titanium cladding treated rebar, chrome plated/coated rebar, nickel plated/coated rebar, cobalt-chromium coated rebar, polycarbonate reinforcing members, polycarbonate fiber, poly(vinyl chloride) (PVC) reinforcing members, PVC fiber, polypropylene, cellulose, polyvinyl alcohol, bamboo, and combination thereof, to form a cement or concrete composition; and
    contacting the cement composition or the concrete composition with water to cause dissolution-reprecipitation of vaterite to aragonite wherein the composition after contact with water has a wet paste pH of less than 12, and setting and hardening wherein aragonitic crystals are formed on the reinforced material.

2. The method of claim 1, further comprising making the cementitious composition by contacting an industrial waste gas stream comprising carbon dioxide with an alkaline solution to form a carbon dioxide charged water; and contacting the carbon dioxide charged water with divalent cations to form the cementitious composition.

3. The method of claim 2, wherein the contacting of the carbon dioxide charged water with the divalent cations is under precipitation conditions that favor the formation of the cementitious composition comprising a metastable component selected from the group consisting of vaterite, amorphous calcium carbonate, and combination thereof wherein the precipitation conditions comprises residence time of the composition in solution of between 5 seconds-1 hour, pH of the solution between 6-8.5, temperature of the solution between 20-50° C., or combination thereof.

4. The method of claim 3, wherein the precipitation conditions favor the formation of more than 50 wt % vaterite in the cementitious composition.

5. The method of claim 2, further comprising obtaining the alkaline solution using an electrochemical method.

6. The method of claim 1, wherein the cementitious composition has a $\delta^{13}C$ value of less than −12.0‰.

7. The method of claim 1, wherein the cementitious composition after setting and hardening has a compressive strength of between 14-35 MPa.

8. The method of claim 1, wherein the cementitious composition is a particulate composition with an average particle size of 0.1-100 microns.

9. The method of claim 1, wherein the cementitious composition is combined with between 0.1-10 wt % reinforced material.

10. The method of claim 1, wherein the reinforced material is in a shape of bars or rebars, wires, threads, grids, plates, fibers, metal meshes, cages, whiskers, or combinations thereof.

11. The method of claim 1, wherein the composition after setting and hardening forms the formed building material selected from the group consisting of masonry unit, brick, blocks, tile, construction panel, conduit, basin, beam, column, slab, acoustic barrier, insulation material, and combination thereof.

* * * * *